US010832219B2

(12) United States Patent
Jersin et al.

(10) Patent No.: US 10,832,219 B2
(45) Date of Patent: *Nov. 10, 2020

(54) USING FEEDBACK TO CREATE AND MODIFY CANDIDATE STREAMS

(71) Applicant: Microsoft Technology Licensing, LLC, Redmond, WA (US)

(72) Inventors: John Robert Jersin, San Francisco, CA (US); Alexis Blevins Baird, San Francisco, CA (US); Erik Eugene Buchanan, Mountain View, CA (US); Benjamin John McCann, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 15/942,361

(22) Filed: Mar. 30, 2018

(65) Prior Publication Data

US 2019/0197180 A1 Jun. 27, 2019

Related U.S. Application Data

(60) Provisional application No. 62/609,910, filed on Dec. 22, 2017.

(51) Int. Cl.
*G06F 16/24* (2019.01)
*G06Q 10/10* (2012.01)
(Continued)

(52) U.S. Cl.
CPC ... *G06Q 10/1053* (2013.01); *G06F 16/24578* (2019.01); *G06F 16/285* (2019.01);
(Continued)

(58) Field of Classification Search
CPC .................................................. G06F 16/24578
(Continued)

(56) References Cited

U.S. PATENT DOCUMENTS 8,195,657 B1 6/2012 Dellovo
9,811,569 B2 11/2017 Posse et al.
(Continued)

OTHER PUBLICATIONS

"Non Final Office Action Issued in U.S. Appl. No. 15/942,352", dated Jan. 29, 2020, 23 Pages.
(Continued)

*Primary Examiner* — Baoquoc N To
(74) *Attorney, Agent, or Firm* — Schwegman Lundberg & Woessner, P.A.

(57) ABSTRACT

Techniques for dynamically altering weights to re-weight attributes of an ordering model based on feedback in a streaming environment are described. In an embodiment, a system accesses, based on a candidate stream definition comprising a role including a title, one or more stream-related information sources, and extracts attributes from the sources. Additionally, the system inputs the attributes to a combined ordering model that is trained by a machine learning algorithm to output ordering scores for member profiles of an online system (e.g., hosting a social networking service). The combined ordering model includes weights assigned to the attributes. Moreover, the system orders, based on the ordering scores, the profiles. Furthermore, the system presents, on a display, of top-ordered profiles. Then, the system accesses feedback regarding the top-ordered profiles and dynamically trains the weights assigned to each of the attributes to alter the weights assigned to the attributes based on the feedback.

20 Claims, 20 Drawing Sheets

(51) Int. Cl.

| | |
|---|---|
| *G06Q 10/06* | (2012.01) |
| *G06Q 50/00* | (2012.01) |
| *G06F 16/9535* | (2019.01) |
| *G06F 16/9032* | (2019.01) |
| *G06F 16/28* | (2019.01) |
| *G06N 20/00* | (2019.01) |
| *G06F 16/2457* | (2019.01) |
| *G06F 16/635* | (2019.01) |
| *G06F 16/735* | (2019.01) |
| *H04L 12/58* | (2006.01) |
| *H04L 29/08* | (2006.01) |
| *G06N 7/00* | (2006.01) |
| *G06F 16/182* | (2019.01) |

(52) U.S. Cl.
CPC .......... *G06F 16/635* (2019.01); *G06F 16/735* (2019.01); *G06F 16/9032* (2019.01); *G06F 16/90324* (2019.01); *G06F 16/9535* (2019.01); *G06N 7/005* (2013.01); *G06N 20/00* (2019.01); *G06Q 10/063112* (2013.01); *G06Q 50/01* (2013.01); *H04L 51/02* (2013.01); *H04L 67/306* (2013.01); *G06F 16/1834* (2019.01)

(58) Field of Classification Search
USPC ........................................................ 707/734
See application file for complete search history.

(56) References Cited

U.S. PATENT DOCUMENTS

| | | |
|---|---|---|
| 2003/0182171 A1 | 9/2003 | Vianello |
| 2005/0080657 A1 | 4/2005 | Crow et al. |
| 2006/0229896 A1 | 10/2006 | Rosen et al. |
| 2008/0243604 A1 | 10/2008 | Rohan et al. |
| 2010/0114691 A1 | 5/2010 | Wu et al. |
| 2011/0276358 A1 | 11/2011 | Sutton |
| 2012/0179617 A1 | 7/2012 | Adams et al. |
| 2014/0046862 A1 | 2/2014 | Weingarten et al. |
| 2014/0067703 A1 | 3/2014 | Baeck et al. |
| 2014/0077703 A1 | 3/2014 | Chen et al. |
| 2014/0180770 A1 | 6/2014 | Baeck et al. |
| 2015/0127565 A1 | 5/2015 | Chevalier et al. |
| 2016/0005001 A1 | 1/2016 | Muhammedali et al. |
| 2016/0034400 A1* | 2/2016 | Dale .................. G06F 12/0862 711/122 |
| 2016/0132909 A1 | 5/2016 | Guidi et al. |
| 2016/0140506 A1 | 5/2016 | Kostelnik et al. |
| 2016/0188607 A1* | 6/2016 | Rubinstein ............. G06Q 50/01 707/734 |
| 2016/0196534 A1 | 7/2016 | Jarrett et al. |
| 2017/0024701 A1 | 1/2017 | Tang et al. |
| 2017/0091194 A1 | 3/2017 | Spiegel |
| 2017/0154311 A1 | 6/2017 | Lewis et al. |
| 2017/0193394 A1 | 7/2017 | Fang |
| 2017/0221006 A1 | 8/2017 | Kenthapadi et al. |
| 2017/0286865 A1 | 10/2017 | Fang et al. |
| 2018/0130024 A1 | 5/2018 | Fang et al. |
| 2018/0268373 A1 | 9/2018 | Bheemavarapu et al. |
| 2019/0197192 A1 | 6/2019 | Jersin et al. |
| 2019/0197485 A1 | 6/2019 | Jersin et al. |
| 2019/0197486 A1 | 6/2019 | Jersin et al. |
| 2019/0197487 A1 | 6/2019 | Jersin et al. |

OTHER PUBLICATIONS

"Non Final Office Action Issued in U.S. Appl. No. 15/942,375", dated Dec. 23, 2019, 19 Pages.

"Non Final Office Action Issued in U.S. Appl. No. 15/942,383", dated Feb. 21, 2020, 33 Pages.

Dishman, Lydia, "Why the Hiring Process Takes Longer than Ever", Retrieved From: https://www.fastcompany.com/3048421/why-the-hiring-process-takes-longer-than-ever, Jul. 13, 2015, 4 Pages.

Maurer, Roy, "Lever Study Shows 1 in 100 Candidates is Hired", Retrieved From: https://www.shrm.org/resourcesandtools/hr-topics/talent-acquisition/pages/lever-study-candidates-hired.aspx, Oct. 27, 2016, 3 Pages.

Rendle, Steffen, "Factorization Machines", In Proceedings of IEEE 10th International Conference on Data Mining, Dec. 13, 2010, 6 Pages.

"Final Office Action Issued in U.S. Appl. No. 15/942,375", dated Jun. 22, 2020, 22 Pages.

"Non Final Office Action Issued in U.S. Appl. No. 15/942,389", dated Jun. 5, 2020, 21 Pages.

* cited by examiner

USING FEEDBACK TO CREATE AND MODIFY CANDIDATE STREAMS

PRIORITY CLAIM

This application claims the benefit of priority to U.S. Provisional Patent Application No. 62/609,910 entitled "Creating and Modifying Job Candidate Search Streams", [reference number 902004-US-PSP (3080.G98PRV)] filed on Dec. 22, 2017, which is incorporated herein by reference in its entirety.

TECHNICAL FIELD

The present disclosure generally relates to computer technology for solving technical challenges in determining query attributes (e.g., locations, skills, positions, job titles, industries, years of experience and other query terms) for search queries. More specifically, the present disclosure relates to creating a stream of candidates based on attributes such as locations and titles, which may be suggested to a user, and refining the stream based on user feedback. The disclosure also relates to generating communications such as messages and alerts related to the stream.

BACKGROUND

The rise of the Internet has occasioned two disparate phenomena: the increase in the presence of social networks, with their corresponding member profiles visible to large numbers of people, and the increase in use of social networks for job searches, by applicants, employers, social referrals, and recruiters. Employers and recruiters attempting to connect candidates and employers, or refer them to a suitable position (e.g., job title), often perform searches on social networks to identify candidates who have relevant qualifications that make them good candidates for whatever job opening the employers or recruiters are attempting to fill. The employers or recruiters then can contact these candidates to see if they are interested in applying for the job opening.

Traditional querying of social networks for candidates involves the employer or recruiter entering one or more search terms to manually create a query. A key challenge in a search for candidates (e.g., talent search) is to translate the criteria of a hiring position into a search query that leads to desired candidates. To fulfill this goal, the searcher typically needs to understand which skills are typically required for the position (e.g., job title), what are the alternatives, which companies are likely to have such candidates, which schools the candidates are most likely to graduate from, etc. Moreover, this knowledge varies over time. Furthermore, some attributes, such as the culture of a company, are not easily entered into a search box as query terms. As a result, it is not surprising that even for experienced recruiters, many search trials are often required in order to obtain an appropriate query that meets the recruiters' search intent. Additionally, small business owners do not have the time to navigate through and review large numbers of candidates.

BRIEF DESCRIPTION OF THE DRAWINGS

Some embodiments of the technology are illustrated, by way of example and not limitation, in the figures of the accompanying drawings.

FIG. 17 is a screen capture illustrating a first screen of a user interface for performing a suggested candidate-based search, in accordance with an example embodiment.

FIG. 18 is a screen capture illustrating a second screen of the user interface for performing a stream refinement question-based search, in accordance with an example embodiment.

DETAILED DESCRIPTION

Figure 1:
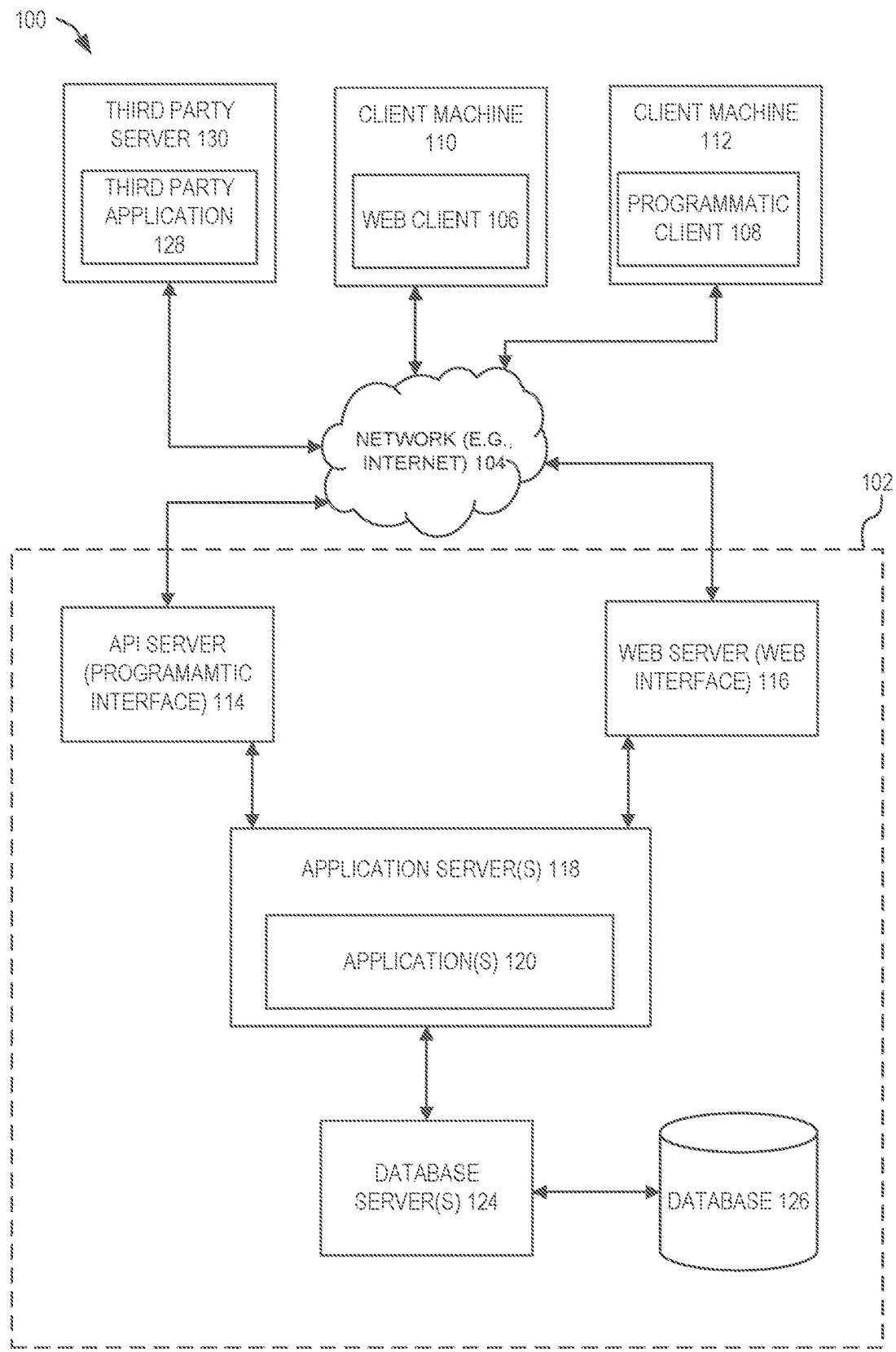
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Techniques for recommending candidate search streams (i.e., suggested streams) to recruiters are disclosed herein. In an example, job titles are suggested by presenting the titles to a user of a recruiting tool (e.g., a recruiter or hiring manager). Based on a variety of features, a system can suggest a position or job title that a recruiter may want to fill. For example, a hiring manager at a small-but-growing Internet company may want to hire a head of human resources (HR). Such suggested job titles may be used to create candidate search streams comprising recommended candidates for the job titles. Some embodiments create streams of suggested candidates based on predicted positions for which a recruiter may be hiring.

In some embodiments, a role or stream may consist of three attributes: title, location, and company. To suggest a stream for the user to create, certain embodiments suggest values for these attributes. No suggestion needs to be generated for organization (e.g., company) since some embodiments may simply use the company that the hiring manager is employed by. The logic for suggesting a position (e.g., a job title or role) is described herein. The location suggestion is more straight forward than a job title or position. Some embodiments suggest a role, stream, or position for a hiring search rather than just a job title.

To suggest a position for a hiring search (e.g., a job candidate search), certain embodiments first find similar organizations and companies. Certain embodiments can accomplish this in two ways. The first is to use a factorization machine to conduct collaborative filtering. In this method, companies are deemed similar if there is a flow of human capital between the companies or related companies. The other way is to consider directly where a company's employees have worked in the past. Once some similar companies have been identified, an embodiment can consider common titles held by employees at those companies and draw suggestions (e.g., suggested job titles) from this set of titles. A goal of both methods is to suggest the most common titles, but also maintain diversity amongst the positions suggested (e.g., avoid suggesting only titles in the sales department by also suggest positions in marketing, accounting IT, and other departments). In order to do this, an embodiment may model each of the titles as a particle in space and run a physics simulation in which there is an attractive force driven by how often a title occurs and a repulsive force driven by how similar a title is to other titles.

Example techniques for using such a physics simulation and a factorization machine are described in U.S. patent application Ser. No. 15/827,350, entitled "MACHINE LEARNING TO PREDICT NUMERICAL OUTCOMES IN A MATRIX-DEFINED PROBLEM SPACE", filed on Nov. 30, 2017, which is incorporated herein by reference in its entirety. The referenced document describes techniques for using a physics simulation to suggest answers for areas of expertise stream refinement questions. The referenced document also describes Factorization machines (FMs) and their extension, field-aware factorization machines (FFMs), which have a broad range of applications for machine learning tasks including regression, classification, collaborative filtering, search ranking, and recommendation. The referenced document further describes a scalable implementation of the FFM learning model that runs on a standard Spark/Hadoop cluster. The referenced document also describes a prediction algorithm that runs in linear time for models with higher order interactions of rank three or greater, and further describes the basic components of the FFM, including feature engineering and negative sampling, sparse matrix transposition, a training data and model co-partitioning strategy, and a computational graph-inspired training algorithm. In the referenced document, one distributed training algorithm and system optimizations enable some aspects to train FFM models at high speed and scale on commodity hardware using off-the-shelf big data processing frameworks such as Hadoop and Spark.

The above-referenced document additionally describes Factorization machines (FMs) that model interactions between features (e.g., attributes) using factorized parameters. Field-aware factorization machines (FFMs) are a subset of factorization machines that are used, for example, in recommender systems, including job candidate recommendation systems. FMs and FFMs may be used in machine learning tasks, such as regression, classification, collaborative filtering, search ranking, and recommendation. Some implementations of the technology described herein leverage FFMs to provide a prediction algorithm that runs in linear time. The training algorithm and system optimizations described herein enable training of the FFM models at high speed and at a large scale. Thus, FFMs based on large datasets and large parameter spaces may be trained. In some embodiments, FMs may be a model class that combines the advantages of Support Vector Machines (SVMs) with factorization models. Like SVMs, FMs are a general predictor working with any real valued feature vector. In contrast to SVMs, FMs model all interactions between features using factorized parameters. Thus, they are able to estimate interactions even in problems with huge sparsity (like recommender systems) where SVMs fail. FMs are class of models which generalize Tensor Factorization models and polynomial kernel regression models. FMs uniquely combine the generality and expressive power of prior approaches (e.g., SVMs) with the ability to learn from sparse datasets using factorization (e.g., SVD++). FFMs extend FMs to also model effects of different interaction types, defined by fields.

For a large professional networking or employee-finding service, a production-level machine learning system may have a number of operational goals, such as scale. Large-scale distributed systems are needed to adequately process data of millions of professional network members. The referenced document describes how the FFM model extends the FM model with information about groups (called fields) of features. In some embodiments, a latent space with more than two dimensions (e.g., three, four, or five dimensions) may be used. To generate this mapping, latent vectors learned by a factorization machine trained on examples of <Current Title, Skills> tuples are extracted from a data store. In some examples, the data store stores member profiles from a professional networking service (see, e.g., the profile database 218 of FIG. 2). According to some examples described in the referenced document, a server extracts training examples from the data store, where each training example includes a <current title, skills> tuple. The server trains a factorization machine, and latent vectors learned by the factorization machine may be viewed as a mapping of titles to the latent space and a mapping of skills to the latent space. In other words, for each title, there is a vector that numerically represents the title. For each skill, there is a vector that numerically represents the skill.

By using titles that similar companies have hired people for, embodiments can produce a list of suggested titles. Then, the physics simulation discussed above and described in the above-referenced document can be applied to produce the most important titles (e.g., the most needed titles) while also ensuring that the few options of titles presented are different. In this way, embodiments avoid the issue of presenting closely-related or synonymous titles such as, for example "Software Engineer" and "Software Developer" at the same time. That is, embodiments improve the efficiency of suggesting titles to a user by filtering out titles that are semantically identical or duplicative.

In addition to what is described in the referenced document, certain embodiments include deciding to ask a stream refinement question to improve a candidate stream and incorporating the answer into the relevance for which candidate is suggested next in the stream.

Embodiments can suggest positions based on a hiring organization's size, location, and existing titles—including titles that differ from each other, but have overlapping areas of expertise. Such embodiments can predict feature values using a factorization machine that is configured to find a related entity for a given entity. For instance, a factorization machine may be used to find similar companies for a given hiring organization. Embodiments suggest positions that may be different from each other. For instance, some embodiments suggest locations where an organization should hire based on where the organization has offices and where similar organizations have offices, apart from specific job titles. Also, for example, embodiments suggest broader positions beyond just job titles related to one area of expertise. According to such examples, in addition to suggesting software-related job titles such as software engineer, software developer and related or synonymous titles, a system can additionally suggest non-software positions based on accessing title data from similar companies and different, non-software groups and divisions at the hiring company.

Some embodiments create streams of suggested candidates (i.e., suggested streams) based on predicted positions for which a recruiter may be hiring. In certain embodiments, positions or job titles may be predicted based on criteria, such as, for example, past hiring activity, organization (e.g., company) size, a currently logged-in user's job title (i.e., the title of a current user of a recruiting tool), competitors' hiring activity, industry hiring activity, recent candidate searches, recent member profiles viewed, recent member profiles prospected, and job searches by candidates who have engaged with the user's company page (e.g., the organization page or company page of the currently logged-in user).

To suggest a location, an embodiment first generates a list of all the places a company has employees (generally a few offices, but may include knowledge such as whether this company has remote workers). Then, the embodiment can use a simple rule based logic. The embodiment can utilize the language of the selected title to determine which office locations are in countries with that language. Then, the embodiment can display a small list of top suggestions to the user. This list can be sorted according to number of people in the corresponding department in each office (e.g., if this job is for an Accountant and most accounting staff are in Los Angeles then suggest Los Angeles first). If the department is small or this is the first hire in the department, an embodiment can use office size most likely place to hire a new employee would be the headquarters).

According to an embodiment, a system learns attributes of recent hires as compared to the rest of a population of candidates. In certain examples, the attributes can include a combination of title and location (e.g., a candidate's job title and geographic location). The geographic location can be, for example, a metropolitan area, such as a city, a county, a town, a province, or any other municipality. Also, for example, the geographic location may be a postal code, a larger area such as a country, or may specify that the candidate can be a remote worker.

Techniques for returning candidates to recruiters based on recruiter feedback are disclosed herein. In an example, candidate feedback is received by presenting a stream of candidates to a user of a recruiting tool (e.g., a recruiter or hiring manager). Based on recruiter feedback, a system can revise the stream to include additional candidates and to filter out other candidates. For instance, based on explicit feedback such as, for example, a user rating (e.g., acceptance, deferral, or rejection), a user-specified job title, and a user-specified location, an intelligent matching system can return potential candidates to a user of the system (e.g., a recruiter or hiring manager). Also, for example, based on implicit user feedback, such as similar company matching, user dwell time on a candidate, candidate member profile sections viewed, and a number of revisits to a saved candidate profile, the intelligent matching system can revise a stream of suggested candidates that are returned to the user.

An example system recommends potential candidates to users, such as, for example, users of a recruiting tool. The system stores the employment history (titles and positions held with dates and descriptions), location, educational history, industry, and skills of members of a social networking service. The system uses explicit (specified job title, location, positively-rated candidates, etc.) and implicit user input (features of positively-rated candidates, similar company/organization matching, data about past hiring activity, etc.) to return potential candidates to a user (e.g., a hiring manager or a recruiter).

Techniques for query inference based on explicit (specified job title, location, etc.) and implicit user feedback (features of positively rated candidates, similar company matching, etc.) are also disclosed herein. In an example, a system returns potential, suggested candidates as a candidate stream based on executing an inferred query generated by a query builder. In some embodiments, a candidate stream is presented to a user (e.g., a recruiter) as a series of potential candidates which the user may then rate as a good fit or not a good fit (e.g., explicit feedback). Based on this explicit feedback, the user may then be shown different candidates or asked for further input on the stream.

Example embodiments provide systems and methods for using feedback to create and modify a search query, where the search query is a candidate query in an intelligent matching context. According to these embodiments, intelligent matching allows a user, such as, for example, a recruiter or hiring manager, to create a stream from a minimal set of attributes. As used herein, in certain embodiments, the terms 'intelligent matches' and 'intelligent matching' refers to systems and methods that offer intelligent candidate suggestions to users such as, for example, recruiters, hiring managers, and small business owners. For example, a recommendation system oilers such intelligent candidate suggestions while accounting for users' personal preferences and immediate interactions with the recommendation system. Intelligent matching enables such users to review and select relevant candidates from a candidate stream without having to navigate or review a large list of irrelevant candidates. For instance, intelligent matching can provide a user with intelligent suggestions automatically selected from a candidate stream or flow of candidates for a position to be filled without requiring the user to manually move through a list of thousands of candidates. In the intelligent matching context, such a candidate stream can be created based on minimal initial contributions or inputs from users such as small business owners and hiring managers. For example, embodiments may use a recruiter tool to build a candidate stream with the only required input into the tool being a job title and location.

Instead of requiring large amounts of explicit user input, intelligent matching techniques infer query criteria with attributes and information derived from the user's company or organization, job titles, positions, job descriptions, other companies or organizations in similar industries, data about recent hires, and the like. Among many attributes or factors that can contribute to the criteria for including members of a social networking service in a stream of candidates, embodiments use a standardized job title and location to start a stream, which may be suggested to the user, as well as the user's current company. In certain embodiments, the social networking service is an online professional network. As a user is fed a stream of candidates, the user can assess the candidates' fit for the role. This interaction information can be fed back into a relevance engine that includes logic for determining which candidates end up in a stream. In this way, intelligent matching techniques continue to improve the stream.

In an example embodiment, a system is provided whereby candidate features for a query are evaluated (e.g., weighed and re-weighed) based on a mixture of explicit and implicit feedback. The feedback can include user feedback for candidates in a given stream. The user can be, for example, a recruiter or hiring manager reviewing candidates in a stream of candidates presented to the user. Explicit feedback can include acceptance, deferral, or rejection of a presented candidate by a user (e.g., recruiter feedback). Explicit feedback can also include a user's interest or disinterest in member profile attributes (i.e., urns) and may be used to identify ranking and recall limitations of previously displayed member profiles and to devise reformulation schemes for candidate query facets and query term weighting (QTW). For instance, starting with a set of suggested candidates for a candidate search (i.e., suggested candidates for a given title, location) specified by the stream, an embodiment represents a candidate profile as a bag of urns. In this example, an urn is an identifier for a standardized value of an entity type associated with a member profile, where an entity type represents an attribute or feature of the member's profile (e.g., skills, education, experience, current and past organizations). For example, member profiles can be represented by urns, where the urns can include urns for skills (e.g., C++ programming experience) and other urns for company or organization names (e.g., names of current and former employers). Implicit feedback can include measured metrics such as dwell time, profile sections viewed, and number of revisits to a saved candidate profile.

In certain embodiments, a candidate stream collects two types of explicit feedback. The first type of explicit feedback includes signals from a user such as acceptance, deferral, or rejection of a candidate shown or presented to the user (e.g., a recruiter). The second type of explicit feedback includes member urns that are similar or dissimilar to urns of a desired hire. If the explicit feedback includes many negative responses, an embodiment can prompt the user to ask the user what about the profiles returned is disliked. An embodiment may also allow the user to highlight or select sections of the profile that were particularly liked or disliked in order to provide targeted explicit feedback at any time.

In some embodiments, implicit feedback can be measured in part by using log data from a recruiting tool to measure an amount of items in a member profile a user has reviewed or seen (e.g., a number of profile sections viewed). In an example, such log data from a recruiting product can be used to determine if a user is interested in a particular skill set, seniority or tenure in a position, seniority or tenure at an organization, and other implicit feedback that can be determined from log data. In another example, log data from an intelligent matching product may be used to determine if a user of the intelligent matching product is interested in a particular skill set, seniority or tenure in a position, seniority or tenure at an organization, and other implicit feedback that can be determined from intelligent matching log data.

Embodiments incorporate the above-noted types of explicit and implicit feedback signals into a single weighted scheme of signals. In additional or alternative embodiments, the explicit member urns feedback may be used to identify ranking and recall limitations of previously displayed member profiles and to devise reformulation schemes for query facets and query term weighting (QTW). The approach does not require displaying a query for editing by the user. Instead, the user's query can be tuned automatically behind the scenes. For example, query facets and QTW may be used to automatically reformulate and tune an inferred query based on a mixture of explicit and implicit feedback as the user is looking for candidates, and reviews, selects, defers, or rejects candidates in a candidate stream.

The above-noted types of explicit and implicit feedback can be used to promote and demote candidates by re-weighting candidate features (e.g., inferred query criteria). That is, values assigned to weights corresponding to candidate features (e.g., desired hire features) can be re-calculated or re-weighted. Some feedback can conflict with other feedback. For instance, seniority feedback can indicate that a user wants a candidate with long seniority at a start-up company, but relatively shorter seniority at a larger organization (e.g., a Fortune 500 company).

In an example, a system returns potential, suggested candidates as a candidate stream based on executing an inferred query generated by a query builder. In some embodiments, a candidate stream is presented to a user (e.g., a recruiter) as a series of potential candidates which the user may then rate as a good fit or not a good fit (e.g., explicit feedback). Based on this explicit feedback, the user may then be shown different candidates or asked for further input on the stream.

A user can use a recruiting tool to move or navigate through a candidate stream. For example, as a stream engine returns each candidate to the user, the user can provide feedback to rate the candidate in one of a discrete number of ways. Non-limiting examples of the feedback include acceptance (e.g., Yes—interested in candidate, deferral (e.g., maybe later) and rejection (e.g., No—not interested).

Techniques for soliciting and using feedback to modify a candidate stream are disclosed. In some embodiments, a user (e.g., a hiring manager or recruiter) can be presented with a series of potential, suggested candidates which the user provides feedback on (e.g., by rating candidates as a good fit or not a good fit). Based on this feedback, an embodiment shows the user different candidates or prompts the user for further input on the stream.

Some embodiments present a user (e.g., a hiring manager or recruiter) with a series of potential candidates (e.g., a candidate stream) in order to solicit feedback. In certain embodiments, the feedback includes user ratings of the candidates. For example, the user may rate candidates in the stream as a good fit or not a good fit for a position the user is seeking to fill. Also for, example, the user may rate candidates in the stream as a good fit or not a good fit for an organization (e.g., a company) the user is recruiting on behalf of. Based on such feedback, the user may be shown different candidates or additional feedback may be solicited. For instance, when the user repeatedly assigns negative ratings to candidates in the stream (e.g., by rejecting them or rating them as not a good fit), the user may be asked for further input on the stream in order to improve the stream. In an example, the user may be asked which attribute of the last rated candidate was displeasing (e.g., location, title, company, seniority, industry, and the like).

Certain embodiments return candidates to users such as recruiters or hiring managers based on solicited feedback. In an example, user feedback is solicited and received by presenting a stream of candidates to a user of a recruiting tool (e.g., an intelligent matching tool or product). Based on received feedback, a system can revise the stream to include additional candidates and to filter out other candidates. For instance, based on explicit feedback such as, for example, a user rating (e.g., acceptance, deferral, or rejection), a user-specified job title, and a user-specified location, an intelligent matching system can return potential candidates to a user of the system (e.g., a recruiter or hiring manager). Also, for example, based on implicit user feedback, such as user dwell time on a candidate, candidate member profile sections viewed, and a number of revisits to a saved candidate profile, the intelligent matching system can revise a stream of suggested candidates that are returned to the user.

Certain embodiments include a semi-automated message builder or generator. For instance, once a user chooses to reach out to a candidate, the semi-automated message builder may semi-automatically generate a message that is optimized for a high response rate and personalized based on the recipient's member profile information, the user's profile information, and the position being hired for. For example, techniques for automatically generating a message on behalf of a recruiter or job applicant are disclosed. In one example, a message generated for a recruiter can include information about the recruiter, job posting, and organization (e.g., company) that is relevant to the job candidate. In another example, a message generated for the job applicant may include information about the job applicant (e.g., job experience, skills, connections, education, industry, certifications, and other candidate-based features) that is relevant for a specific job posting.

Some embodiments include a message alert system that can send alerts to notify a user (e.g., a hiring manager) of events that may spur the user to take actions in the recruiting tool. For example, the alerts may include notifications and emails such as 'There are X new candidates for you to review.' In additional or alternative embodiments, alerts and notifications that are sent at other possible stages of recruiting trigger user reengagement with the recruiting tool. For instance, alerts may be sent when no candidate streams exist, when relevant candidates have not yet been messaged by the user (e.g., no LinkedIn InMail messages sent to qualified, suggested candidates), and when interested candidates have not been responded to (e.g., when no reply has been sent to accepting recipients of LinkedIn InMail messages).

Embodiments pertain to recruiting, but the techniques could be applied in a variety of settings—not just in employment candidate search and intelligent matches contexts. The technology is described herein in the professional networking, employment candidate search, and intelligent matches contexts. However, the technology described herein may be useful in other contexts also. For example, the technology described herein may be useful in any other search context. In some embodiments, the technology described herein may be applied to a search for a mate in a dating service or a search for a new friend in a friend-finding service.

Intelligent matching allows a user, such as, for example, a recruiter or hiring manager, to create a candidate stream from a minimal set of attributes. Intelligent matching recommends candidates to a user of a recruiting tool (e.g., a recruiter or hiring manager), while accounting for the user's personal preferences and user interactions with the tool. In some embodiments, suggested titles can be used to build a candidate stream for a recruiter based on predicted positions (e.g., titles) for which a recruiter may be hiring. For example, the suggested stream may include candidates that are suggested to the user based on the predicted positions.

Example techniques for predicting values for features (e.g., locations, titles and other features) are described in U.S. patent application Ser. Nos. 15/827,289 and 15/827,350 entitled "PREDICTING FEATURE VALUES IN A MATRIX" and "MACHINE LEARNING TO PREDICT NUMERICAL OUTCOMES IN A MATRIX-DEFINED PROBLEM SPACE", respectively, both filed on Nov. 30, 2017, which are incorporated herein by reference in their entireties. The referenced documents describe techniques for predicting numerical outcomes in a matrix-defined problem space where the numerical outcomes may include any outcomes that may be expressed numerically, such as Boolean outcomes, integer outcomes or any other outcomes that are capable of being expressed with number(s). The referenced documents also describe a control server that stores (or is coupled with a data repository that stores) a matrix with multiple dimensions, where one of the dimensions represents features, such as employers, job titles, universities attended, and the like, and another one of the dimensions represents entities, such as individuals or employees. The control server separates the matrix into multiple submatrices along a first dimension (e.g. features). The referenced documents further describe techniques for title recommendation and company recommendation. For title recommendation, the referenced document describes techniques that train a model over each member's titles (rather than companies) in his/her work history (e.g., members of a social networking service). Title recommendation seeks to find a cause-effect relationship between job history and future jobs, whereas title similarity is non-temporal in nature.

In an example embodiment, a system is provided whereby a stream of candidates is created from a minimal set of attributes, such as, for example, a combination of title and geographic location. As used herein, the terms 'stream of candidates' and 'candidate stream' generally refer to sets of candidates that can be presented or displayed to a user. The user can be a user of an intelligent matches recruiting tool or a user of a program that accesses an application programming interface (API). For example, the user can be a recruiter or a hiring manager that interacts with a recruiting tool to view and review a stream of candidates being considered for a position or job. Member profiles for a set of candidate profiles can be represented as document vectors, and urns for job titles (e.g., positions), skills, previous companies, educational institutions, seniority, years of experience and industries to hire from, can be determined. In additional or alternative embodiments, derived latent features based on member profiles and hiring companies can be used to predict a position (e.g., a job title) for which a recruiter or hiring manager may be hiring.

Embodiments can personalize results in a stream by modifying query term weights. Techniques for QTW to weigh query-based features are described in U.S. patent application Ser. No. 15/845,477 filed on Dec. 18, 2017, entitled "QUERY TERM WEIGHTING", which is hereby incorporated by reference in its entirety. The referenced document describes weighting parameters in a query that includes multiple parameters to address the problem in the computer arts of identifying relevant records in a data repository for responding to a search query from a user of a client device. The referenced document further describes a system wherein a server receives, from a client device, a search query for employment candidates, where the search query includes a set of parameters and each parameter in the set of parameters has a weight. The referenced document also describes that the server generates, from a data repository storing records associated with professionals, a first set of search results based on the set of parameters and the weights of the parameters in the set. The server transmits, to the client device, the first set of search results. The server receives, from the client device, a response to search result(s) from the first set of search results. The search result(s) associated with a set of factors. The factor(s) in the set may correspond to any parameters, for example, skills, work experience, education, years of experience, seniority, pedigree, and industry. The response indicates a level of interest in the search result(s). For example, the response may indicate that the user of the client device is interested in the search result(s), is not interested in the search result(s), or has ignored the search result(s). The server adjusts the parameters in the set of parameters or adjusts the weights of the parameters based on the response to the search result(s). The server provides an output based on the adjusted parameters or the adjusted weights.

In accordance with an embodiment, a weight may be associated with each query term which may be either an urn or free text. For example, a search may be conducted with query term weights {Java: 0.9, HTML: 0.4, CSS: 0:3} to indicate that the skills Java, HTML, and Cascading Style Sheets (CSS) are relevant to the position, but that java is relatively more important than HTML and CSS. Query term weights may be initialized to include query terms known before the sourcing process begins. For instance, the system may include a query term weight corresponding to the hiring manager's industry and the skills mentioned in the job posting. Query term weights may be adjusted in response to the answers given to stream refinement questions.

In some embodiments, there are four types of stream refinement questions that may be asked, and attributes may be extracted from answers to these questions. The first type of stream refinement question that may be asked is regarding areas of expertise (e.g., what skill sets are most important?). An area of expertise is typically higher level than individual skills. For example, skills might be CSS, HTML, and JavaScript, whereas the corresponding area of expertise might be web development. A second type of refinement question that may be asked is regarding a user's ideal candidate (e.g., do you know someone that would be a good fit for this job so that we can find similar people?), A third type of refinement question that may be asked is regarding organizations (e.g., what types of companies would you like to hire from?). A fourth type of refinement question that may be asked is regarding keywords (e.g., are there any keywords that are relevant to this job?). The system may extract attributes from answers to one or more of these types of stream refinement questions.

According to certain embodiments, the system may provide suggested answers for each stream refinement question. For instance, for an ideal candidate question, the system may present to the user three connections that may be a good fit for the job or allow the user to type an answer. Example processes for suggesting answers for questions are described in U.S. patent application Ser. No. 15/827,350, entitled "MACHINE LEARNING TO PREDICT NUMERICAL OUTCOMES IN A MATRIX-DEFINED PROBLEM SPACE", filed on Nov. 30, 2017, which is incorporated herein by reference in its entirety. The referenced document describes techniques for using a physics simulation to suggest answers for areas of expertise stream refinement questions. The referenced document also describes an example where five iterations are performed before the physics simulation of the forces is stopped. In the refenced document, after the simulation of the forces is completed, the sampled points are remapped to areas of expertise. The referenced document describes presenting the three areas of expertise closest to a title after the simulation to a user that can then specify which, if any, of the areas of expertise are applicable to the title. In addition to what is described in the referenced document, certain embodiments include deciding to ask a stream refinement question to improve a candidate stream and incorporating the answer into the relevance for which candidate is suggested next in the stream.

In an example embodiment, the system may ask the user which of three areas of expertise is most relevant to the position and adjust the query term weights based upon the answer. Positive feedback about a candidate may increase the weights of the query terms appearing on that profile while negative feedback may decrease the weights of the query terms appearing on that profile. In some embodiments, the user may select attributes of a profile that are particularly of interest to them. When attributes are selected the query term weights of those attributes may be adjusted while the query term weights related to the other attributes of the profile may not be adjusted. A flowchart for an example method for QTW is provided in FIG. 16, which is described below.

Embodiments exploit correlations between certain attributes of member profiles and other attributes. One such correlation is the correlation between a member's title and the member's skills. For example, within member profile data, there exists a strong correlation between title and skills (e.g., a title+skills correlation). Such a title+skills correlation can be used as a model for ordering candidates. Example techniques for ordering candidates are described in U.S. patent application Ser. No. 15/827,337, entitled "RANKING JOB CANDIDATE SEARCH RESULTS", filed on Nov. 30, 2017, which is incorporated herein by reference in its entirety. The referenced document describes techniques for predicting numerical outcomes in a matrix-defined problem space, where the numerical outcomes may include any outcomes that may be expressed numerically, such as Boolean outcomes, integer outcomes or any other outcomes that are capable of being expressed with number(s). The referenced document also describes techniques for solving the problem of ordering job candidates when multiple candidates are available for an opening at a business. In one example, a server receives, from a client device, a request for job candidates for an employment position, the request comprising search criteria. The server generates, based on the request, a set of job candidates for the employment position. The server provides, to the client device, a prompt for ordering the set of job candidates. The server receives, from the client device, a response to the prompt. The server orders the set of job candidates based on the received response. The server provides, for display at the client device, an output based on the ordered set of job candidates. Some advantages and improvements include the ability to order job candidates based on feedback from the client device and the provision of prompts for this feedback.

Query facets may be generated as part of the inferred search query. As a first step towards generating a bootstrap query for intelligent matches, an embodiment includes similar titles. Additional facet values increase the recall set at the cost of increased computation. In an embodiment, additional facets may be added or removed to target a specific recall set size. For example, if a given query which includes only titles is returning 26,000 candidates, but only 6,400 candidates can be scored in time to return a response to the user without incurring high latency, then additional facets may be added to lower the size of the recall set. Also, for example, if a query is returning only 150 candidates for a given title, then additional similar titles may be included since the current query is below the 6,400 candidate limit. Techniques for expanding queries to return additional results (e.g., suggested candidates) by adding additional facets are further described in U.S. patent application Ser. No. 15/922,732, entitled "QUERY EXPANSION", filed on Mar. 15, 2018, which is incorporated herein by reference in its entirety.

In an example embodiment, a system is provided whereby, given attributes from a set of input recent hires, a search query is built capturing the key information in the candidates' profiles. The query is then used to retrieve and/or order results. In this manner, a user (e.g., a searcher) may list one or several examples of good candidates for a given position. For instance, hiring managers or recruiters can utilize profiles of existing members of the team to which the position pertains. In this new paradigm, instead of specifying a complex query capturing the position requirements, the searcher can simply pick out a small set of recent hires for the position. The system then builds a query automatically extracted from the input candidates and searches for result candidates based on this built query.

In some example embodiments, the query terms of an automatically constructed query can also be presented to the searcher, which helps explain why a certain result shows up in a search ordering, making the system more transparent to the searcher. Further, the searcher can then interact with the system and have control over the results by modifying the initial query. Some example embodiments may additionally show the query term weights to the searcher and the searcher interact with and control the weights. Other example embodiments may not show the query term weights to the searcher, but may show only those query terms with the highest weights.

Some embodiments present a candidate stream to a recruiter that includes candidates selected based on qualifications, positions held, interests, cultural fit with the recruiter's organization, seniority, skills, and other criteria. In some embodiments, the recruiter is shown a variety of candidates early in a calibration process in order to solicit the recruiter's feedback about which types of candidates are a good or bad fit for a position the recruiter is seeking to fill. In examples, this may be accomplished by finding clusters, such as, but not limited to, skills clusters, in a vector space. For instance, the feedback may include the recruiter's stream interactions (e.g., candidate views, selections and other interactions with candidate profiles presented as part of the stream). In other examples, QTW is used to assign weights to terms of a candidate search query, and skills clusters are not needed.

In accordance with certain embodiments, a candidate stream includes suggested candidates based on comparing member profile attributes to features of a job opening. The comparison may compare attributes and features such as, but not limited to, geography, industry, job role, job description text, member profile text, hiring organization size (e.g., company size), required skills, desired skills, education (e.g., schools, degrees, and certifications), experience (e.g., previous and current employers), group memberships, a member's interactions with the hiring organization's website (e.g., company page interactions), past job searches by a member, past searches by the hiring organization, and interactions with feed items.

According to some embodiments, a recruiting tool outputs a candidate stream that includes candidate suggestions and a model strength. In some such embodiments, the model strength communicates to a user of the tool the model calibration. For example, the tool may prompt the user to review a certain number of additional candidates (e.g., five more candidates) in order to improve the recommendations in the stream. An example model used by the tool seeks to identify ideal candidates, by taking as input member IDs of recent hires and/or member IDs of previously suggested candidates, accessing member profiles for those member IDs, and then extracting member attributes from the profiles. Example member attributes include skills, education, job titles held, seniority, and other attributes. After extracting the attributes, the model generates a candidate search query based on the attributes, and then performs a search using the generated query.

In accordance with certain embodiments, a candidate stream primarily includes candidates that are not among the example, input member IDs provided, That is, a recruiting tool may seek to create a suggested candidate stream that primarily excludes member IDs of recent hires and member IDs of suggested candidates that were previously reviewed by a user (e.g., a recruiter). However, in some cases, it may be desirable to include certain re-surface candidates in the stream. For example, it may be desirable to include previously suggested candidates that a recruiter deferred or skipped rather than accepting or rejecting outright. In this example, recruiter feedback received at the tool for a candidate can include acceptance, deferral, or rejection of a presented candidate by a user (e.g., recruiter feedback), and highly-ranked candidates that were deferred or skipped may be included as re-surface candidates in a subsequent candidate stream. Embodiments may use candidate scores, such as, for example, expertise scores and/or skill reputation scores, in combination with a machine learning model to determine how often, or in what circumstances, to include such re-surface candidates in a suggested candidate stream.

In some example embodiments, machine-learning programs (MLP), also referred to as machine-learning algorithms, models, or tools, are utilized to perform operations associated with searches, such as job candidate searches. Machine learning is a field of study that gives computers the ability to learn without being explicitly programmed. Machine learning explores the study and construction of algorithms, also referred to herein as tools and machine learning models, that may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring candidate skills and job candidates.

Some embodiments seek to predict, job changes by predicting how likely each candidate in a stream is to be moving to a new job in the near future. Some such embodiment predicts a percentage probability that a given candidate will change jobs within the next K months (e.g., 3 months, 6 months, or a year). Some of these embodiments predict job changes based on candidate attributes such as, but not limited to, time at current position, periodicity of job changes at previous positions, career length (taking into consideration that early-career people tend to change jobs more often), platform interactions (e.g., member interactions indicating a job search is underway), month of year (taking into consideration that job changes in some industries and fields are more often during certain seasons, quarters, and months of the year), upcoming current position anniversaries (e.g., stock vesting schedules, retirement plan match schedules, bonus pay out schedules), company-specific seasonal patterns (e.g., a company's annual bonus pay out may be a known date on which many people leave), and industry- or title-specific patterns (e.g., a time of year when most people in a job title change jobs).

Certain embodiments also seek to predict geographic moves of candidates so that those candidates can be considered for inclusion in a stream. For example, these embodiments may predict how likely each candidate is to geographically move from their current location to a location of a job opening. In this example, the candidate that is likely to move should match the organization's candidate queries for that job even if that candidate's current location does not match the job location. Additional or alternative embodiments also seek to predict how likely each candidate is to move to multiple, specific areas (e.g., more than one geographic region, metropolitan area, or city). For instance, these embodiments may predict that there is a 20% chance that a given candidate will move to the San Francisco Bay Area in the next K months, and a 5% chance the candidate will move to the Greater Los Angeles Area in the next K months. Some of these embodiments predict geographic moves based on the candidate attributes described above with reference to predicting job changes. Additional or alternative embodiments also predict geographic moves based on candidate attributes such as, but not limited to, the candidate's past locations (e.g., geographic locations where the candidate has lived, worked, or studied) and the candidate's frequency or periodicity of previous moves.

Certain embodiments also seek to promote active job seekers higher in the stream. Users on a professional social network may be asked to identify themselves as candidates open to new opportunities. An open candidate may also specify that they prefer to work in a certain industry, geographic region, or field.

Some embodiments determine a job description strength and company description strength by extracting features of the job and company from the job and company descriptions. The description strength and company description strength are used to predict higher response rates and positive acceptance rates to a job posting. The strength values are based on comparing a bag of words to words in the descriptions, length of the descriptions, and comparing the descriptions to other job and company descriptions in the same industry or field. The feature extraction can be based on performing job description parsing to parse key features out of a job description. Such key features may include title, location, and skills.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An API server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third-party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device. In some embodiments, the networked system 102 may comprise functional components of a social networking service.

Figure 2:
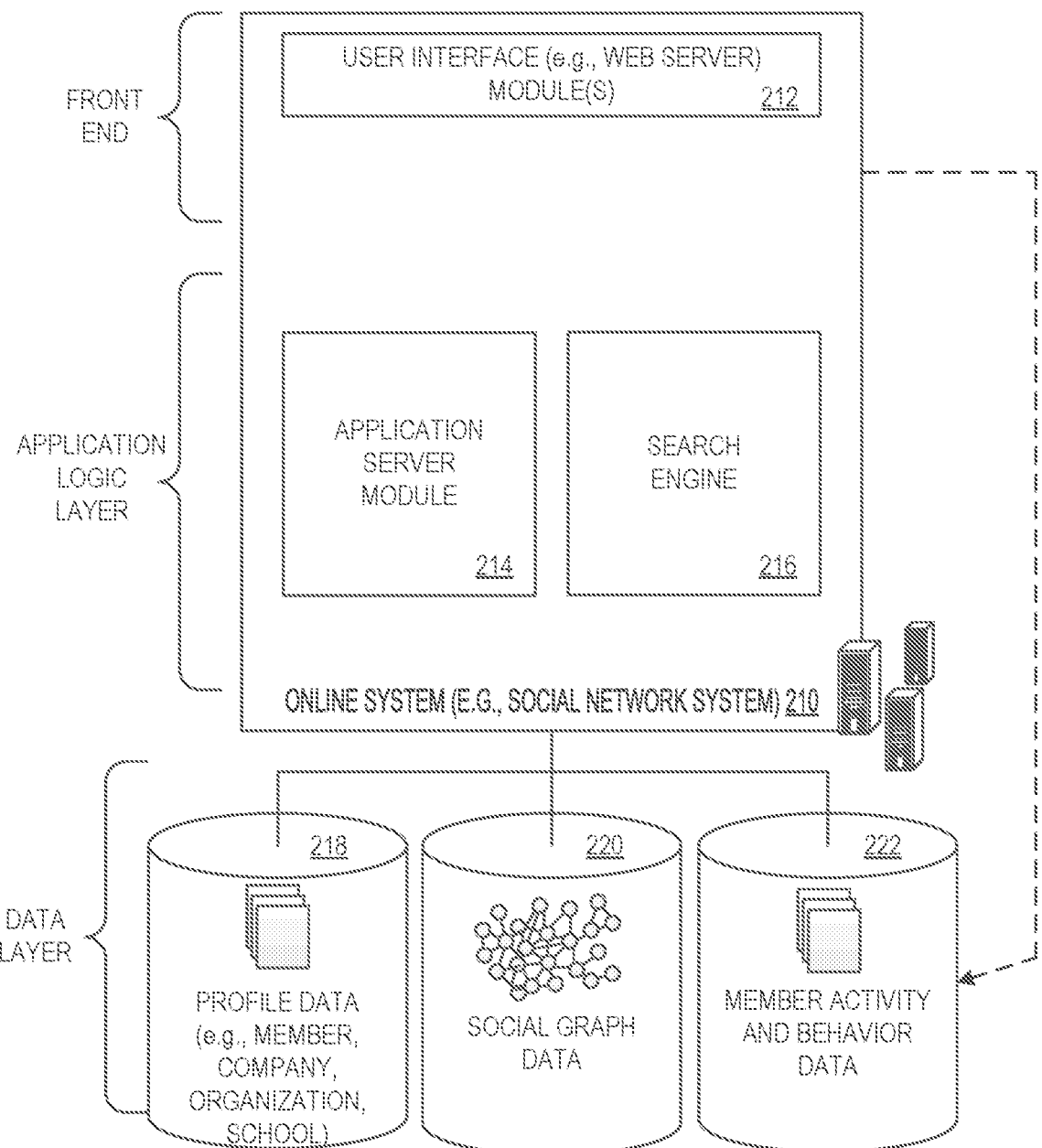
FIG. 2 is a block diagram showing the functional components of a social networking service, including a data processing block referred to herein as a search engine, for use in generating and providing search results for a search query, consistent with some embodiments of the present disclosure.

FIG. 2 is a block diagram illustrating components of an online system 210 (e.g., a social network system hosting a social networking service), according to some example embodiments. The online system 210 is an example of the networked system 102 of FIG. 1. In certain embodiments, the online system 210 may be implemented as a social network system. As illustrated in FIG. 2, the functional components of a social network system may include a data processing block referred to herein as a search engine 216, for use in generating and providing search results for a search query, consistent with some embodiments of the present disclosure, in some embodiments, the search engine 216 may reside on the application server(s) 118 in FIG. 1. However, it is contemplated that other configurations are also within the scope of the present disclosure.

As shown in FIG. 2, a front end may comprise a user interface module or block (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection functionality is provided by the online system 210 to detect various interactions that members have with different applications 120, services, and content presented. As shown in FIG. 2, upon detecting a particular interaction, such as a member interaction, the online system 210 logs the interaction, including the type of interaction and any metadata relating to the interaction, in a member activity and behavior database 222.

An application logic layer may include the search engine 216 and one or more various application server module(s) 214 which, in conjunction with the user interface module(s) 212, generate various user interfaces (e.g., web pages) with data retrieved from various data sources in a data layer. In some embodiments, individual application server module(s) 214 are used to implement the functionality associated with various applications 120 and/or services provided by the social networking service. Member interaction detection happens inside the user interface module(s) 212, the application server module(s) 214, and the search engine 216, each of which can fire tracking events in the online system 210. That is, upon detecting a particular member interaction, any of the user interface module(s) 212, the application server module(s) 214, and the search engine 216, can log the interaction, including the type of interaction and any metadata relating to the interaction, in a member activity and behavior database 222.

As shown in FIG. 2, the data layer may include several databases, such as a profile database 218 for storing profile data, including both member profile data and profile data for various organizations (e.g., companies, research institutes, government organizations, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A 'connection' may constitute a bilateral agreement by the members, such that both members acknowledge the establishment of the connection. Similarly, in some embodiments, a member may elect to 'follow' another member. In contrast to establishing a connection, 'following' another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member who is being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and Objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 shown in FIG. 1. However, other configurations are also within the scope of the present disclosure.

Although not shown, in some embodiments, the online system 210 provides an API block via which applications 120 and services can access various data and services provided or maintained by the social networking service. For example, using an API, an application may be able to request and/or receive one or more candidate selections. Such applications 120 may be browser-based applications 120, or may be operating system specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the candidate selections available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
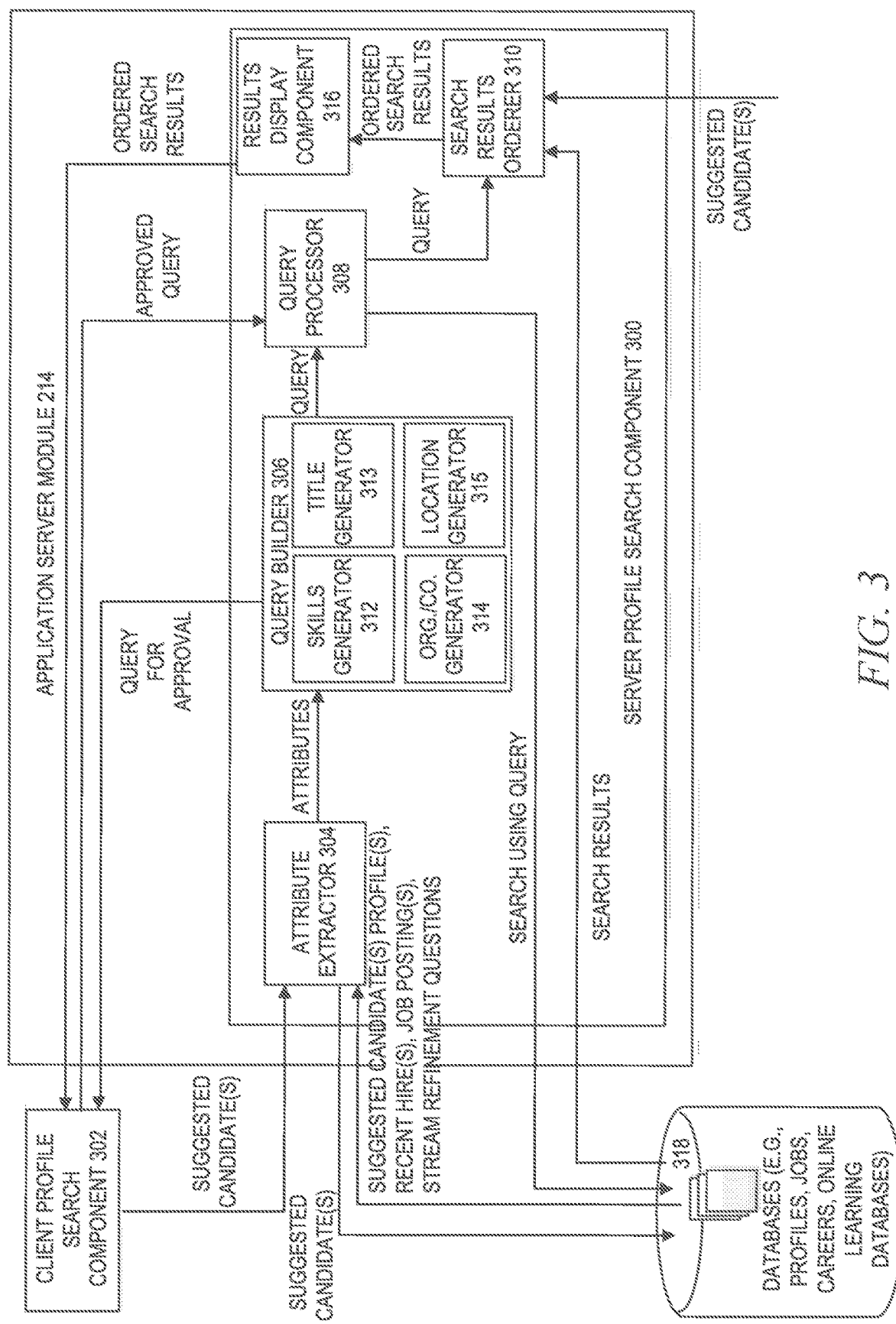
FIG. 3 is a block diagram illustrating an application server block of FIG. 2 in more detail, in accordance with an example embodiment.

FIG. 3 is a block diagram illustrating the application server block or module 214 of FIG. 2 in more detail. While in many embodiments, the application server module 214 will contain many subcomponents used to perform various different actions within the online system 210, in FIG. 3 only those components that are relevant to the present disclosure are depicted. Here, a server profile search component 300 works in conjunction with a client profile search component 302 to perform one or more searches on member profiles stored in, for example, the profile database 218 of FIG. 2. The server profile search component 300 may be, for example, part of a larger software service that provides various functionality to employers or recruiters. The client profile search component 302 may include a user interface and may be located on a client device. For example, the client profile search component 302 may be located on a searcher's mobile device or desktop/laptop computer. In some example embodiments, the client profile search component 302 may itself be, or may be a part of, a stand-alone software application on the client device. In other example embodiments, the client profile search component 302 is a web page and/or web scripts that are executed inside a web browser on the client device. Regardless, the client profile search component 302 is designed to accept input from the searcher and to provide visual output to the searcher.

In an example embodiment, the input from the client profile search component 302 includes an identification of one or more suggested candidates for a job opening. This identification may be accomplished in many ways. In some example embodiments, the input may be an explicit identification of one or more member profiles stored in the profile database 218. This explicit identification may be determined by the searcher, for example, browsing or otherwise locating specific suggested candidate profiles that the searcher feels match a position the searcher is currently seeking to fill. For example, the searcher may know the identity of individuals on a team in which the open position is available, and may navigate to and select the profiles associated with those team individuals. In another example embodiment, the searcher may create one or more hypothetical 'suggested candidate' profiles and use those as the input. In another example embodiment, the searcher may browse or search profiles in the profile database 218 using traditional browsing or searching techniques. In some example embodiments, the explicit identification may be provided by the job poster.

The server profile search component 300 may contain an attribute extractor 304. The attribute extractor 304 may be implemented as a system component or block that is configured to extract one or more attributes from one or more profiles of one or more suggested candidates (i.e., one or more suggested candidate member profiles). For instance, the attribute extractor 304 may be configured to extract raw attributes, including, for example, skills, companies, titles, schools, industries, etc., from the profiles of the one or more suggested candidates. These raw attributes are then passed to a query builder 306. In additional or alternative embodiments, the attribute extractor 304 is configured to extract additional attributes from a job posting, stream refinement questions, recent hire documents, a user's member profile (e.g., a recruiter's LinkedIn profile), a hiring organization's web page (e.g., a company page), and other information sources. For instance, the attribute extractor 304 may be configured to extract attributes from a fully-fledged job posting with a textual description of the job requirements and fields specifying numerous attributes such as industry, full-time vs part-time, salary range, seniority level, and education requirements. In some embodiments the job posting is retrieved from one of the databases 318 (e.g., the jobs database shown in the example of FIG. 3).

The databases 318 may include separate databases, such as the profile database 218, the social graph database 220, and the member activity and behavior database 222 described above with reference to FIG. 2, in addition to a jobs database, a careers database, and an online learning database. For example, candidate member profiles, recent hire documents, and recruiter profiles may be accessed by using a profile service to retrieve records from the profile database 218. Also, for example, stream refinement questions and answers to such questions used by the attribute extractor 304 may be accessed using an online learning service and retrieved from an online learning database. Further, for example job postings used by the attribute extractor 304 may be accessed using a jobs service to retrieve job posting data from a jobs database. Additionally, an organization page of the hiring organization (e.g., a company page of a hiring company) may be accessed via careers services that query a careers database.

The system of FIG. 3 can use a subset of the above-noted databases and information sources as data inputs. However, increasing the number of inputs provided to the attribute extractor 304 increases the accuracy of attributes passed to the query builder 306.

The query builder 306 may be implemented as a system component or block that is configured to aggregate the raw attributes across the input candidates, expand them to similar attributes, and then select the top attributes that most closely represent the suggested candidates. In example embodiments, for each attribute type, the query builder 306 aggregates the raw attributes across the input candidates, expands them to similar attributes, and finally selects the top attributes that most closely represent the suggested candidates.

After a candidate query is generated, in an example embodiment, the generated query may be shown to the searcher via the client profile search component 302 and the searcher may have the opportunity to edit the generated query. This may include adding or removing some attributes, such as skills and companies, to or from the query. As part of this operation, a query processor 308 may perform a search on the query and present raw results to the searcher via the client profile search component 302. These raw results may be useful to the searcher in determining how to edit the generated query.

According to certain embodiments, a recruiting tool generates a series of questions and presents them to a tool user, such as a recruiter or hiring manager, in order to generate a candidate query or to to edit a generated query. For instance, an interface of the tool can prompt the user with questions to determine how senior of a candidate the user needs for a position, whether a college degree is required for the position, and whether the user wants a generalist or an expert for the position. The recruiting tool may analyze outcomes (e.g., user responses and hires) to determine which questions asked of users (e.g., hiring managers) best improve the outcomes. A user such as a hiring manager may only have bandwidth to answer a certain number of questions, and the most valuable question(s) may vary by position (e.g., job title).

In some example embodiments, stream refinement questions are presented in an interface to a searcher in order to refine a candidate query. For instance, responses to refinement questions received from the searcher can be used to refine a generated query. In another example embodiment, a machine learning model is trained to make 'smart suggestions' to the searcher as to how to modify the generated query. The model may be trained to output suggestions based on any number of different facets, such as job title, position, company or organization (e.g., a firm, corporation, university, government agency, or other entity), industry, location, school, and skill.

Some embodiments ask the user to provide the most relevant area of expertise. For example, if the user enters the title "Software Engineer" the user may be asked whether "Frontend Development", "Backend Development", or "Machine Learning" is most relevant to the role being filled with the option to enter an area of expertise not mentioned. Some embodiments ask the user what type of company they most would like to hire from with three example companies given with the option to choose a company not listed. Some embodiments ask the user which of their connections on a professional network would be the best fit for the role being filled.

Embodiments may ask the user a refinement question prompting for additional input if the stream they have selected or entered is underspecified or if additional information would improve results. E.g. if the user specified the title "Architect", the system may determine a vague title has been entered that could refer to either a Software Architect or Building Architect and the asking of a stream refinement question would be triggered.

Usage data can be gathered regarding actions taken by searchers when presented with a suggestion, including (1) adding the suggestion, (2) deleting the suggestion, or (3) ignoring the suggestion. Intuitively, if a searcher adds a suggestion, it is probably a desired one, and thus can be considered a positive training sample. If the searcher deletes the suggestion, it is probably not a desired one, and thus can be considered a negative training sample. For ignored suggestions, if the suggestion is positioned lower than an added suggestion (e.g., 'Santa Clara University' is positioned lower than added 'University of California, Santa Cruz'), then it is not certain whether the suggestion was really ignored by searchers or useless in the setting of the query. Thus, this data can be ignored. If, however, the ignored suggestion is positioned higher than an added suggestion, it can be treated as a negative training sample. In some embodiments, there may be more than one added suggestion. For example, an ignored suggestion could be positioned both higher and lower than (i.e., between) added suggestions.

After the query is modified, the query processor 308 may refresh the search results. A search results ordering system 310 may act to order the search results, taking into account both the query (including potentially the generated query and the modified generated query) and the input suggested candidates when ordering the search results.

Referring back to the query builder 306, given the raw attributes from the profiles of the suggested candidates, the query builder 306 generates a query containing skills, organizations (e.g., companies), job titles, geographic locations, etc., that best represents the suggested candidates. As shown in FIG. 3, the query builder 306 may comprise a skills generator 312, a title generator 313, an organization generator 314, and a location generator 315. The title generator 313 is designed to generate job titles and roles to be added to the generated query. The organization generator 314 is designed to generate organizations (e.g., companies) to be added to the generated query. The location generator 315 is designed to generate geographic locations (e.g., cities, metropolitan areas) to be added to the generated query. In additional or alternative embodiments, generators for additional attributes can exist within the query builder 306 for other attribute types. For example, an education generator (not shown) can be used to generate educational attributes (e.g., degrees, educational institutions, certifications) for a query. Also, for example, the query builder 306 may further comprise a years of experience generator (not shown), a seniority generator (not shown), and an industry generator (not shown). For instance, an industry generator can be used to generate industries to be added to the generated query based on profile attributes of the suggested candidates and organization attributes.

The skills generator 312 is designed to generate skills to be added to the generated query. The social networking service may allow members to add skills to their profiles. Typical examples of skills that, for example, an information technology (IT) recruiter might search could be 'search,' 'information retrieval,' 'machine learning,' etc. Members may also endorse skills of other members in their network by, for example, asserting that the member does indeed have the specified skills. Thus, skills may be an important part of members' profiles that showcase their professional expertise. A technical challenge encountered, however, is that suggested candidates may not explicitly list all of the skills they have on their profiles. Additionally, some of their skills may not be relevant to their core expertise. For example, an IT professional may list 'nonprofit fundraising' as a skill.

To overcome these challenges, expertise scores for the suggested candidate may be estimated based on explicit skills (skills the suggested candidate has explicitly listed in a member profile or resume) as well as implicit skills (skills the suggested candidate is likely to have, but has not explicitly linked).

Certain embodiments determine a candidate's skill strength by determining the candidate's strongest skills. These embodiments determine a given candidate's skill strength based on member profile attributes such as, but not limited to, numbers of endorsements for skills, inferences based on related skills (e.g., if a candidate knows Enterprise JavaBeans/EJB, JUnit, Eclipse, and Java 2. Platform, Enterprise Edition (J2EE), then an inference may be made that the candidate has strong Java skills), the member's profile text, and the member's interactions with a social networking service (e.g., an online professional network), and an expertise score. Examples of how expertise scores can be calculated are described below with reference to FIGS. 9 and 10.

In some embodiments, probabilities of occurrences of clusters of skills may be determined for suggested candidates. The suggested candidates can be conceptualized as a training dataset used to determine probabilities of occurrences of skills amongst suggested candidates for a given organization. In an example, such skills possessed by suggested candidates may be correlated with titles (e.g., software developer or software engineer). For instance, for a given title, (e.g., software developer) and its related titles (e.g., software engineer), skills can be clustered. For the given title, clusters of the skills may follow a power law distribution, with few of the skills being highly prevalent (i.e., having relatively higher probabilities of occurrences) amongst the population of suggested candidates, followed by a heavy tail of less prevalent skills with lower probabilities of occurrences.

Some embodiments may identify distributions of numbers of unique explicit skills observed among suggested candidates. For example, on a per member basis, the average number of explicit skills for a member may be identified, and the distribution may show that about 50% of the member profiles have more than a certain number of skills (e.g., 20 skills). In an embodiment, a skill reputation score can be used to identify relevant and important skills amongst those associated with a member's profile and a given title. In an embodiment, a user interface can present coverage of regional data for a given title identifier (title ID) in standardized data.

Certain embodiments determine a probability of hire score based on hiring patterns for similar jobs, industries, and organizations (e.g., similar companies). The probability of hire score may be calculated based on how many profiles need to be reviewed and messages (e.g., Linkedin InMail messages) sent in order to have a high likelihood of a successful hire. This score may then be presented to a user with calls to action about reviewing more profiles and sending more messages. Some embodiments determine a hire likelihood as a percentage chance of filling a given job opening (e.g., an open role or position) in a certain time frame. Some of these embodiments determine, based on member profile attributes and features of the open position, the probability percentage of filling the position in the next 30 days. According to these embodiments, the role features can include one or more of a title (e.g., job title or position), geography (e.g., geographic region or city where the job is located), industry, organization size (e.g., hiring company size), job role, historical average for the hiring entity (e.g., company, department, or hiring manager), activity on platform, and candidate scores (e.g., expertise scores or skill reputation scores) of candidates next up in a suggested candidate stream.

Example Intelligent Matches System

Figure 4:
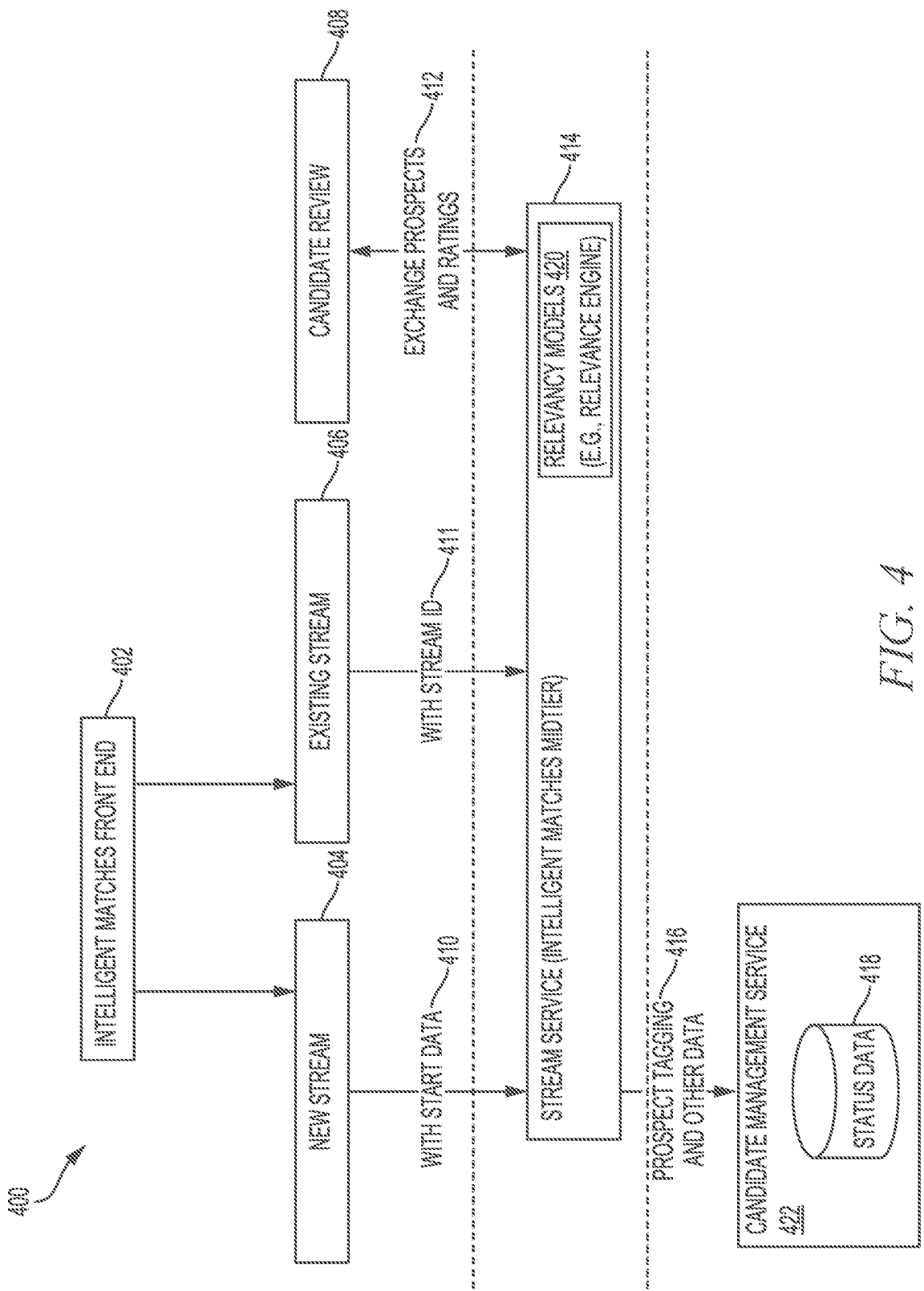
FIG. 4 is a block diagram illustrating an intelligent matches system, in accordance with an embodiment.

FIG. 4 is a block diagram illustrating an intelligent matches system 400, in accordance with an embodiment. As shown, the intelligent matches system 400 includes an intelligent matches front end 402 that can be used to view a new candidate stream 404, an existing candidate stream 406, and to perform candidate review 408 via a stream service 414 that includes relevancy models 420 as a component contained within the stream service 414. In the example illustrated in FIG. 4, the relevancy models 420 can include a relevance engine.

As shown, the intelligent matches system 400 also includes a candidate management service 422 between the stream service 414 and status data 418. In the example of FIG. 4, the candidate management service 422 includes a database that is configured to store the status data 418. As depicted in FIG. 4, the candidate management service 422 can receive prospect tagging and other status data 416 from the stream service 414. The stream service 414 can receive start data 410 (e.g., a title and location for a new candidate search) for the new candidate stream 404, a stream identifier (stream ID) 411 for the existing candidate stream 406, and exchange prospects and ratings data 412 resulting from the candidate review 408.

The intelligent matches system 400 can automatically create a generated and evolving candidate search query for the new candidate stream 404, while also allowing optional customization. For example, the search query can use explicit query parameters and filters (e.g. a 'software engineer' job title parameter). The search query can also infer implicit or soft parameters, and ordering indicators. For instance, the intelligent matches system 400 may order candidates in the new candidate stream 404 or the existing candidate stream 406 by titles, but not filter candidates based on prior titles, inferred skills, and other attributes.

The intelligent matches system 400 can create the new candidate stream 404 for a new role (e.g., a new job opening or new position). The new candidate stream 404 can be created based on basic information, such as, for example, the new role's title and location, together with an optional job description. The new candidate stream 404 can also be created or tuned based on the user selecting example candidates. In additional or alternative embodiments, the new candidate stream 404 can be based at least in part on candidate queries from recent searches that are automatically accessed by the intelligent matches system 400.

The intelligent matches system 400 can be accessed via the intelligent matches front end 402 by a user such as a recruiter, small business owner, or a hiring manager. The intelligent matches system 400 is able to create the new candidate stream 404 with a flow of candidates based on minimal initial contributions and inputs. For example, the intelligent matches system 400 infers criteria with information derived from the hiring manager's organization (e.g., company), job descriptions, other organizations and companies in similar industries, and feedback supplied by the hiring manager. At the very base level, only a standardized job title and location are required to start the new candidate stream 404.

As the user is fed a constant stream of candidates from the new candidate stream 404, the user is assessing each one of the candidates as part of the candidate review 408. The interaction information regarding prospects and ratings data 412, is passed to the stream service 414 so that the prospects and ratings data 412 can be fed back into the relevancy models 420. As note above and shown in FIG. 4, the relevancy models 420 may include a relevance engine. The relevance engine can include a logic backend that determines which candidates end up in a new candidate stream 404 or an existing candidate stream 406 in order to continue to improve the stream.

The new candidate stream 404 can be based on suggested streams (described below), after the user starts by creating the new candidate stream 404 from a standardized job title and location combination. In the event that the user has a company that is standardized, and the intelligent matches system 400 has data on the company, the stream service 414 can also implicitly leverage the company's industry and other metadata to improve the immediate quality of the new candidate stream 404 and the existing candidate stream 406.

In some embodiments, for each new candidate stream 404 created by the intelligent matches system 400, a standardized title (e.g., job title for the position to be filled) and location are required to frame the position. The stream service 414 may use suggested titles and locations to automatically broaden the search. That is, the title and location used to frame the new candidate stream 404 are the job title the candidate will have and the location where they will be working, as opposed to current titles of candidates. Embodiments may use typeahead endpoints to allow the user to enter standardized values for both of these fields (e.g., title and location). If the user's standardized company contains information about that company, the intelligent matches system 400 can personalize the new candidate stream 404 based on this information. Beneficially, this enables the intelligent matches system 400 to immediately improve the relevancy models 420 instead of needing to wait for additional indicators. The standardized company can be derived from their contract settings (e.g., settings for the user's contract granting access to the intelligent matches system 400) or from the user's member profile, with the latter being riskier for correctly determining the current position. There may be a situation where the intelligent matches system 400 incorporates some additional questions after the initial creation of the new candidate stream 404 to better frame the stream. However, the intelligent matches system 400 seeks to keep these as low impact as possible, since a goal of the intelligent matches process is to keep it simple for the user to get started with sourcing candidates. For example, if a user is hiring an accountant, an additional question may be 'is it a requirement that they're a CPA?'

In addition to information that the intelligent matches system 400 infers, there are interstitial stream refinement questions that might be presented to the user to help target a new candidate stream 404 and/or an existing candidate stream 406 even further. Examples of such interstitial refinement questions may include 'how senior of a candidate are you looking for?' and 'When do you want them to start?' These questions may be asked throughout the rating process performed as part of the candidate review 408 and will vary based on the demands of the relevancy models 420. As with the initial questions that could be presented, these interstitial refinement questions may be based on how much success the rating flow via the stream service 414 is having at returning quality candidates to the existing candidate stream 406. That success is measured by the amount of positive ratings a user provides during the candidate review 408. Embodiments may use this information to send an initial payload as a POST into an API layer of an application. The API will forward a request in one part: by sending a new request into the stream service 414 (which may include a stream engine) in order to identify the creation of the new candidate stream 404. This leverages the same endpoint as resuming an existing candidate stream 406, just with the addition of a stream ID 411. The stream service 414 may then call create a new project and associate it with the newly created stream. There can be additional query data included if any of the aforementioned questions are asked.

Example endpoints that can be used by the intelligent matches system 400 are provided in Table 1 below, Table 1 provides example endpoint names, but the actual resource names are not provided in Table 1 for brevity.

TABLE 1

Example Endpoints

| Endpoint | Schema | Description | Return |
| --- | --- | --- | --- |
| fetchProspect | streamId [ Urn ] | Get the next prospect in a stream | A fully decorated prospect |
| fetchUserStreams | contractId [ long ] start [ int ] count [ int ] | Fetch all of the streams on a specific contract for this user. | A list of title, location and stream id to be displayed. |
| fetchSuggestedStreams | contractId [ long ] start [ int ] count [ int ] | Fetch all the Suggested streams for a given contract | A list of title/ Location combinations for a suggested stream |

Following the creation of the new candidate stream 404, the user is dropped into a sourcing flow where they will start to receive candidates one at a time from the stream 404. Action is required on a candidate in order to move on to the next candidate. The current candidate for each stream is tracked, allowing the user to return to where they left off at any point.

Moving through a candidate stream is performed as part of the candidate review 408. In some embodiments, as the stream service 414 returns each candidate to the user (as part of the exchange of prospects and ratings data 412), the user needs to rate the candidate in one of at least three (or possibly more) ways:

1. Yes (INTERESTED)
2. Maybe Later (DEFERRED)
3. No (NOT INTERESTED)

In additional or alternative embodiments, there are a wide variety of actions that can be taken against a candidate in a new candidate stream 404 or an existing candidate stream 406. Only one of these may have a clear defined action. For example, there may be three statuses as noted above where 1. Interested indicates that the user is interested in this candidate right now and wants to reach out to them immediately, 2. Deferred indicates that the user is not ready to make a decision on this candidate right now, but they may wish to revisit the candidacy at another time, and 3. Not Interested indicates that the user is not and will not be interested in this candidate. Also, a deferred rating or status adds a candidate to the database storing status data 418 with a skipped or deferred tag. This means they can be re-exposed later by the relevancy models 420.

In some embodiments, the intelligent matches system 400 presents top results (e.g., top-ranked candidates) from the new candidate stream 404 or the existing candidate stream 406 one at a time, prompting the user to provide a rating or action for each candidate. Then, after X candidates have been presented, the intelligent matches system 400 may prompt the user to provide feedback on top inferred search criteria. In this way, the intelligent matches system 400 ensures that it is targeting candidates well enough to match the user's hiring needs, and also ensures that the search criteria is expanded and tuned as needed to avoid running out of results (e.g., candidates).

In certain embodiments, the result stream from the new candidate stream 404 or the existing candidate stream 406 may never end, and the intelligent matches system 400 does not require the user to proactively create search criteria. The intelligent matches system 400 gives clear expectations and motivations to the user with rewards and status (e.g., alerting the user that sending 50 messages will lead to a 30% chance of a hire within 60 days).

In some embodiments, the database storing status data 418 has a plurality of database tables, which include a related titles table mapping job titles to their related titles, and a streams table. An example schema for the streams table is provided below. In additional or alternative embodiments, job titles related to a given job title may be retrieved from a data store or algorithm that maps the given job title to its related titles.

Example Schema Overview for Streams Table:

```
CREATE TABLE 'streams' (
    'STREAM_ID' NUMBER unsigned NOT NULL
        AUTO_INCREMENT,
    'PROJECT_ID' NUMBER DEFAULT NOT NULL,
    'CONTRACT_ID' NUMBER DEFAULT NOT NULL,
    'SEARCH_QUERY_ID' NUMBER DEFAULT NULL,
    'TITLE_URN' VARCHAR(100 BYTE) DEFAULT NULL,
    'REGION_ID' VARCHAR(100 BYTE) DEFAULT NULL,
    'LAST_MODIFIED' TIMESTAMP DEFAULT SYSTIMESTAMP,
    'DATE_CREATED' TIMESTAMP DEFAULT NOT NULL,
    PRIMARY KEY ('STREAM_ID'),
    KEY 'CONTRACT_ID' ('CONTRACT_ID')
)
```

When the exchange of prospects and ratings data 412 indicates a user is not interested, the user is explicitly not interested in this candidate. There may be any number of factors behind this, but the underlying message is that the user does not want to be shown this candidate again. When the exchange of prospects and ratings data 412 indicates a user is interested, the user is interested in contacting this candidate, and the intelligent matches system 400 may either prompt the user to send a message (e.g., a LinkedIn InMail message) right from a review screen used for the candidate review 408, or the intelligent matches system 400 may add the candidate to a list to be reached out to later.

In additional or alternative embodiments, the exchange of prospects and ratings data 412 setup could be reorganized into multiple ratings, where different ratings align with some of the three above-noted base indicators. For example, a five star rating system could be used where four or five stars means the user is interested in a candidate. These ratings are then passed back to the stream service 414 as part of the exchange of prospects and ratings data 412.

The status data 418 can be embodied as a database configured to store system statuses that are not directly visible to the user but are used to bucket prospects (i.e., candidates). As prospects are presented to the user to rate as part of the candidate review 408, they may be added to a prospects table in the database storing status data 418 and tied to a specific recruiting project. The database storing status data 418 may include a list of system statuses to include statuses (e.g., automated_good, automated_bad, etc.) so that the intelligent matches system 400 can tag specific prospects with a system status. In an embodiment, three separate statuses may be used, but these can be expanded to additional candidate actions.

An existing candidate stream 406 may be resumed or started from a home screen of the intelligent matches front end 402 where a review endpoint is hit. This endpoint returns the next candidate ID (i.e., prospect ID) and associates with that specific stream 406. If it is a suggested new candidate stream 404, a create call is made by the intelligent matches front end 402 first. If it is a current stream 406 that is being resumed, then the intelligent matches front end 402 goes directly to the review endpoint.

With each candidate rating in the candidate review 408, the following actions may be taken:

1. The stream service 414 receives the candidate, the project, and the rating. This allows the intelligent matches midtier of the stream service 414 to send prospect tagging and other data 416 to the database storing status data 418 in order to update the tagging table (used to track the candidate's rating within a specific project). This also enables the intelligent matches tnidtier of the stream service 414 to make a call to the relevancy models 420 (e.g., the relevance engine backend) to pass along the rating information.

2. For web-to-API purposes, a posting call will return a success response and the same review endpoint from before will be hit, where the review endpoint returns a fully decorated profile (e.g., fully updated or populated member profile) for the next stream. The API andles all profile decoration via a rest call to an identity super block.

The candidates are stored in the project for several reasons. One reason is that such storage (e.g., in a relational database storing status data 418) provides a record of yes/no/deferred feedback that can be accessed by the relevancy models 420 (e.g., the relevance engine). The existing stream 406 may expose previously rated candidates back to the user if the training data flags a candidate as a potential rematch. That is, a pipeline of candidates for the existing stream 406 may include previously ranted candidates that can be subsequently re-presented to a user. For instance, the recruiter may defer rating numerous candidates in the existing stream 406 while benchmarking the talent pool for their open role and may decide to rate a candidate that is presented to the recruiter again. Another reason is to allow the user to upgrade their contract to access the intelligent matches system 400 to a full recruiter contract at any given time and have all their candidates stored in projects correlated to each existing candidate stream 406.

Example techniques for analyzing pipelined data are further described in U.S. patent application Ser. No. 15/941,501, entitled "SYSTEMS AND METHODS FOR ANALYZING PIPELINED DATA", filed Mar. 30, 2018, which is incorporated herein by reference in its entirety. The referenced document describes methods for analyzing a pipeline of data in order to estimate or predict a value of interaction between new or unseen parties based on prior interactions between other parties. In embodiments, the parties may be a hiring organization (e.g., a hiring company seeking to fill a position), similar organizations, and candidates, and analysis of pipelined data can be used to predict a value of a hiring interaction between the hiring organization and certain candidates in a pipeline of candidates.

There is value in analyzing pipelined data to provide computational scoring on a pool of unengaged potential parties (e.g., a hiring organization and a potential job candidate) since there are almost always many magnitudes more of them than engaged parties (e.g., a company and a current employee of the company). For example, based on an organization's history of interviewing, making offers to, and hiring candidates for the organization (e.g., company), embodiments analyze that data in order to suggest potential candidates who would be most valuable for the organization to engage. In one example context, this would mean somebody who would ultimately get hired, but a system could also target a metric of people who "get hired then produce a greater than 80/100 performance score within first year of employment" as a goal state in an interaction pipeline.

In additional embodiments, the intelligent matches system 400 allows existing recruiters to add intelligent matching as a feature to their user account. This means supporting the ability to create new intelligent matches candidate streams 404 from their existing projects. Since existing projects and recruiter's accounts are closely tied, the intelligent matches system 400 is able to make some inferences about the candidates that already exist in that recruiter's projects. For example, if the recruiter has a project with 25 candidates that have been contacted, the intelligent matches system 400 can assume they would be tagged with the same 'automated_good' status just as if they went through intelligent matches. This allows the intelligent matches system 400 to perform an easy mapping when it comes to creating new streams 404 from a user's existing projects.

Resuming an existing candidate stream 406 may be an entry point on a homepage of the intelligent matches front end 402 to pick up the existing candidate stream 406. It references the stream ID 411 and uses the same review endpoint that grabs additional candidates to direct the user back into the existing candidate stream 406.

A new candidate stream 404 or an existing candidate stream 406 is essentially never ending. Whether the relevancy models 420 associated with the stream are updated offline or new candidates are re-exposed, unless explicitly deleted by the user, there should be relevant candidates available for that stream at any time.

Figure 8:
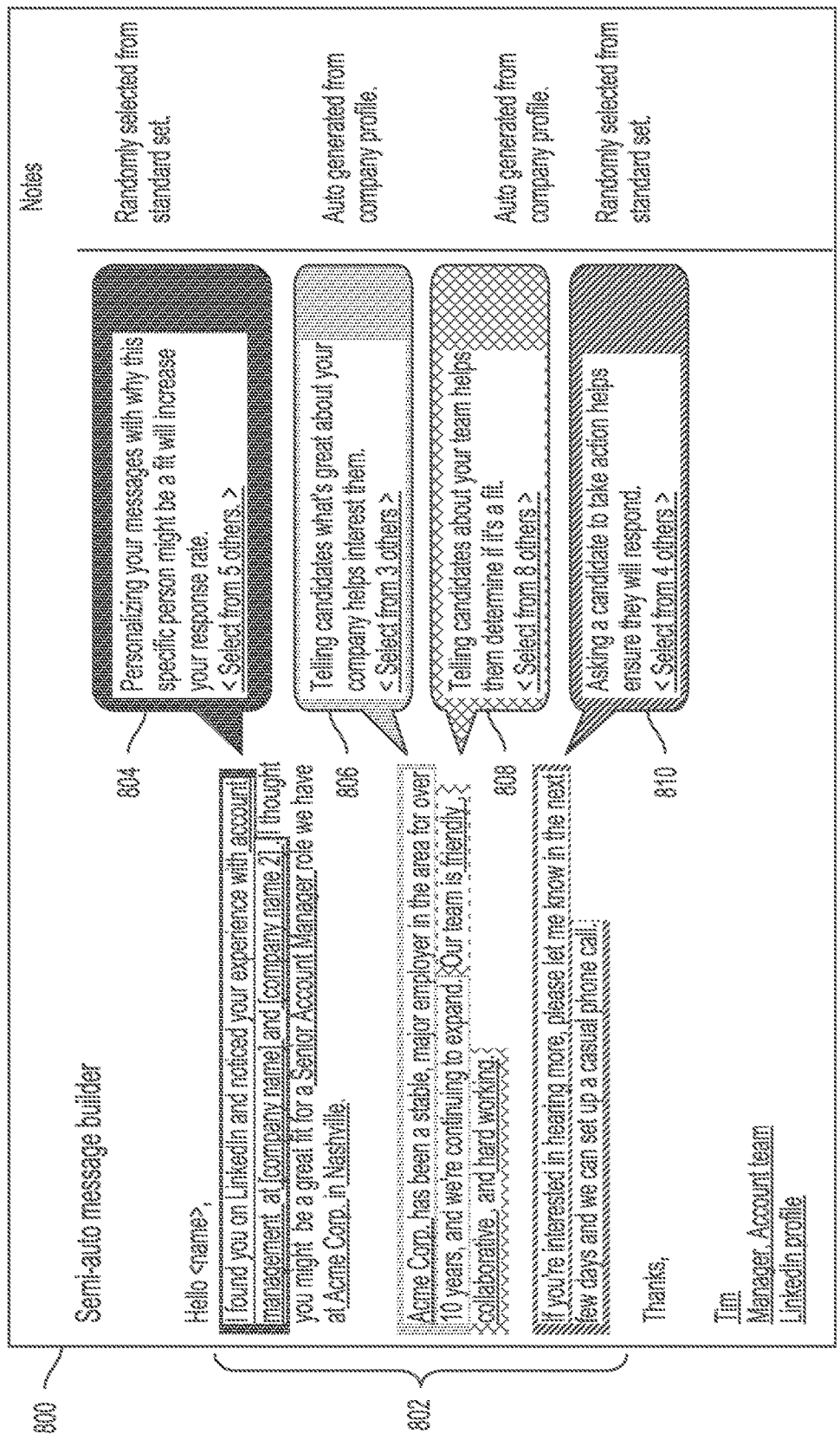
FIG. 8 is a screen capture illustrating a user interface for a semi-automatic message builder, in accordance with an example embodiment.

Actions on candidates may include sending messages such as, for example, LinkedIn InMail messages. The intelligent matches system 400 may include a semi-automatic message builder (as shown in FIG. 8) that reduces time required to generate a well-crafted message to each candidate. For example, upon indicating or selecting that a user is interested in a candidate, the user may be prompted with a dialog to send an InMail message. As described below with reference to FIG. 8, the intelligent matches system 400 may prepopulate a template that has been best picked for this position so that the user can put little to no time in writing or reviewing the message before sending the message (e.g., a LinkedIn InMail message).

As shown in FIG. 4, the stream service 414 may include an intelligent matches midtier service. The stream service 414 powers the actual logic behind which candidates are sent back to the user. The midtier stream service 414 may interface with multiple relevancy models 420. For example, when a new candidate stream 404 is created and the base information is just title and location, a relevancy backend could take the company's job descriptions into account to extract skills, keywords or other industry influencing factors. To add more context, one of the influencing factors on the existing candidate stream 406 may be previous ratings of candidates that are returned via the exchange of prospects and ratings data 412. Those candidates' profiles and ratings can be analyzed to extract metadata that would help frame the next result set.

The midtier service of the stream service 414 may make a call into the relevancy models 420 (e.g., the relevance engine), which then returns a structured query. This query may be used as the base of all new streams 404 created for the user. The structure query is then executed from the stream service 414, returning a set of candidates to work from. The candidates are passed back into one of the relevancy models 420 (e.g., the relevance engine) to be sorted and scored based on a specific relevancy model associated with the existing candidate stream 406. This one of the relevancy models 420 can contain information as basic as a standardized job title(s) and location(s), company trends, industry hiring trends and previous candidate rankings. The relevance engine then returns a single candidate to be decorated (e.g., updated) by an API. The stream service 414 may also have a component that processes data offline when it is too costly to execute at runtime.

One example of this is resurfacing candidates that may have been previously deferred by a user. The process of including different factors to formulate a candidate pool for an existing candidate stream 406 may include pulling all the IDs from a project, decorating the member profiles, and deciding if they were worth being rated again. This process may get more expensive as more candidates are rated and added to the associated project. For a situation like this, an embodiment can fall back on scrubbing out (i.e., supressing) any previously-rated candidate IDs at runtime to prevent duplicates and have an offline job to determine if there are candidates in the project that worth being evaluated a second time. These candidates would then be flagged for a second evaluation for the next time the existing candidate stream 406 is picked up. Beneficially, this will make the eventual call that much leaner. This is because, as a final step, the intelligent matches system 400 de-duplicates against the project and then checks a re-evaluation pool for any candidates eligible to be reviewed again. This is much less computationally costly than decorating all profiles (e.g., fetching all relevance information pertaining to the profiles) in the project and determining if they pass a ML model that qualifies them to be re-evaluated.

The preceding examples discuss what the stream service 414 can do with candidates and how candidate features and other factors may be weighted. There may be different levels of evaluation that go into creating a final talent pool, but the above-noted examples frame a reference for how the stream service 414 can interpret requests and how there may be different levels of influence on the pool of candidates.

Example User Interfaces

Figure 5:
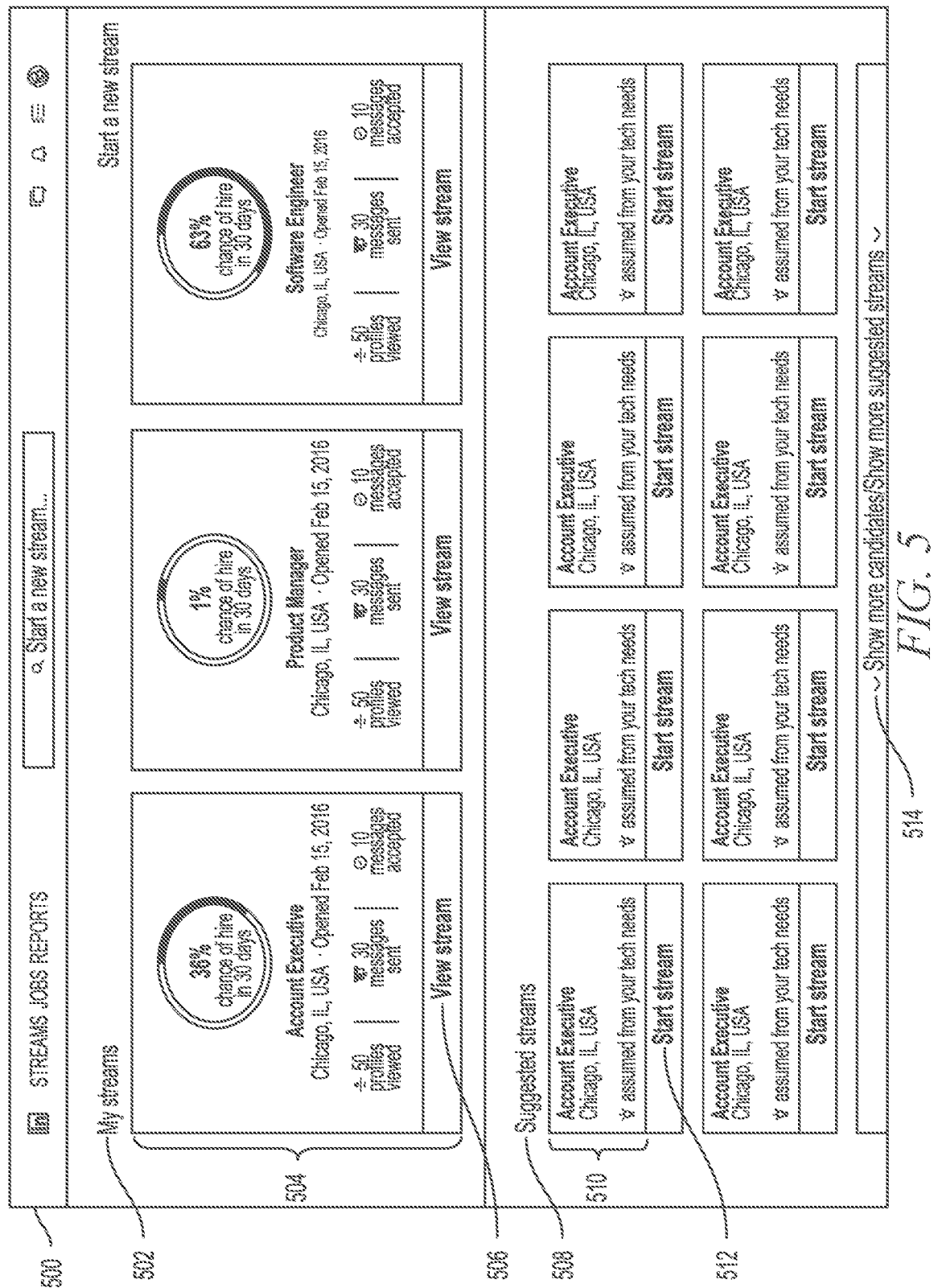
FIG. 5 is a screen capture illustrating a first screen of a user interface for editing and displaying suggested candidate streams, in accordance with an example embodiment.

FIG. 5 is a screen capture illustrating a first screen of a user interface for editing and displaying suggested candidate streams, in accordance with an example embodiment. As shown, the first screen of the user interface includes a command bar 500 with menus, buttons, links, and dialog boxes that can be used to select existing streams, view and edit jobs, view reports, and start new streams. The first screen of the user interface also includes a my streams' link 502 that is selectable to display the user's existing streams 504.

As shown in FIG. 5, for each existing stream 504, the user interface can display the job title, probability of hire score (e.g., percentage chance of hire in the next 30 days in the example of FIG. 5), number of profiles viewed, number of messages sent, and number of messages accepted. In addition, for each existing stream 504, the user interface includes a view stream button 506 that is selectable to display the stream. In response to accessing or receiving a selection of the view stream button 506, a second screen of the user interface as illustrated in FIG. 6 (described below), is displayed.

With continued reference to FIG. 5, the first screen of the user interface further includes a suggested streams pane 508 that displays a set of suggested streams 510. For each suggested stream 510 in the suggested streams pane 508, a suggested job title and a location is displayed. As shown, the suggested streams 510 may be suggested based on the user's technical needs. Also, for each suggested stream 510, the user can select a 'start stream' button 512 to create a new stream based on the suggested stream 510. Lastly; the first screen of the user interface also includes a 'show more candidates' pull down 514 that is selectable to display additional candidates. As shown in FIG. 5, in alternative or additional embodiments, the pull down 514 is also selectable to display additional suggested streams.

Figure 6:
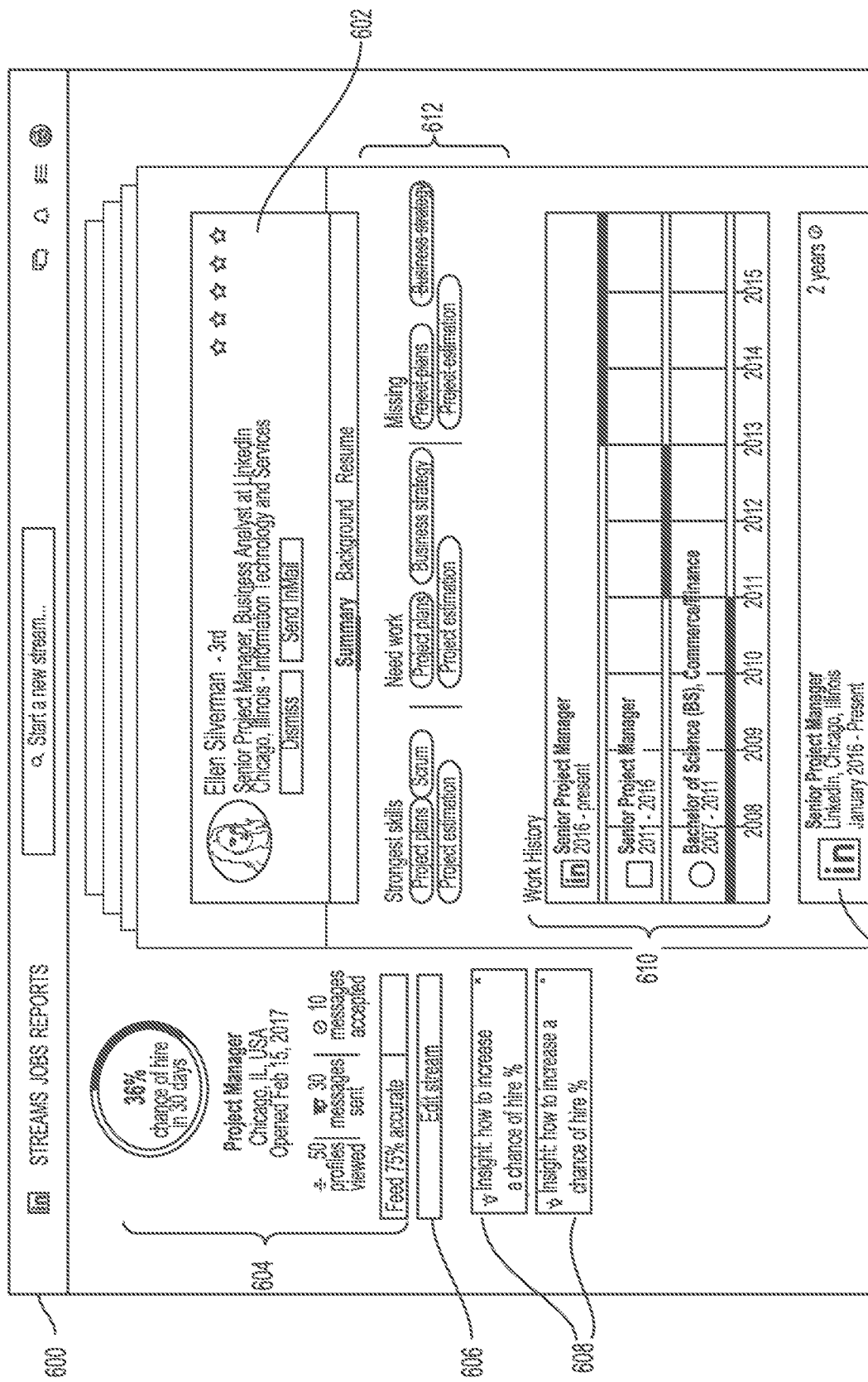
FIG. 6 is a screen capture illustrating a second screen of a user interface for editing and displaying suggested candidate streams, in accordance with an example embodiment.

FIG. 6 is a screen capture illustrating a second screen of a user interface for editing and displaying suggested candidate streams, in accordance with an example embodiment. In particular, the second screen shown in FIG. 6 is a user interface for editing a candidate stream and reviewing and rating candidates in the stream, in accordance with an example embodiment. As shown, the second screen of the user interface includes a command bar 600 with menus, buttons, links; and dialog boxes that can be used to select existing streams, view and edit jobs, view reports, and start a new stream. The second screen of the user interface also includes a candidate window 602 that displays the name, current job, and location information for a candidate. The candidate window 602 also includes user interface elements that the user can select to rate the candidate (e.g., by selecting a 1-5 star rating in the example of FIG. 6), dismiss the candidate, send a message to the candidate (e.g., a LinkedIn InMail message as shown in FIG. 6), display a candidate summary 612, display the candidate's background information, and display the candidate's resume.

As depicted in FIG. 6, stream information 604 for an existing stream includes the job title, probability of hire score (e.g., percentage chance of hire in the next 30 days in the example of FIG. 6), number of profiles viewed, number of messages sent, number of messages accepted, and a feed accuracy score (e.g., a percentage of the stream feed that is deemed to be accurate as shown in FIG. 6). In FIG. 6, the stream information 604 corresponds to an existing stream that includes the candidate represented in the candidate window 602. The user interface includes an 'edit stream' button 606 that is selectable to edit the stream. In response to accessing or receiving a selection of the 'edit stream' button 606, a third screen of the user interface as illustrated in FIG. 7 (described below) is displayed.

With continued reference to FIG. 6, the second screen of the user interface further includes insight buttons 608 that are selectable to display insights to the user for ways to increase a chance of hire percentage (e.g., a probability of filling the job opening indicated in the stream information 604). In the example of FIG. 6, the insight buttons 608 are selectable to display insights for how to increase a chance of hire percentage.

Below the candidate window 602, the candidate summary 612 displays keywords representing the candidate's strongest skills, skills that need work, and missing skills. Below the candidate summary 612, the candidate's work history 610 is displayed as a timeline of the candidate's current and prior positions held. Below the work history 610, the second screen of the user interface also presents a current position window 614 that displays the candidate's current title, employer, and time in the current position.

Figure 7:
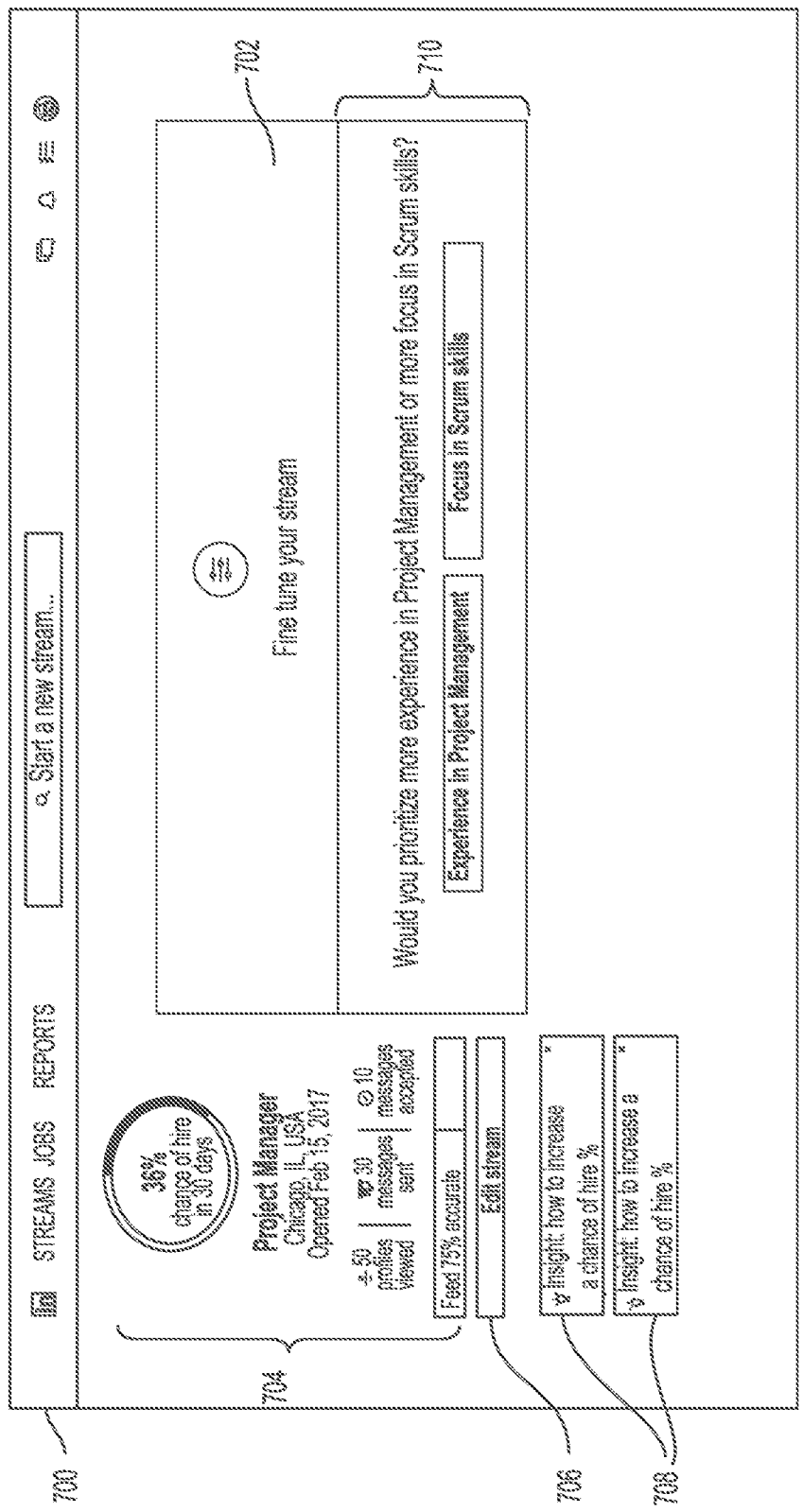
FIG. 7 is a screen capture illustrating a third screen of a user interface for editing and displaying suggested candidate streams, in accordance with an example embodiment.

FIG. 7 is a screen capture illustrating a third screen of a user interface for editing suggested candidate streams, in accordance with an example embodiment. In particular, the third screen shown in FIG. 7 is a user interface for editing a candidate stream, in accordance with an example embodiment. As shown, the third screen of the user interface includes a command bar 700 with menus, buttons, links, and dialog boxes that can be used to select existing streams, view and edit jobs, view reports, and start a new stream.

The third screen of the user interface also includes an 'edit stream' button 706 that is selectable to edit the stream. In response to accessing or receiving a selection of the 'edit stream' button 706, a stream editing window 702 is displayed. As shown, the stream editing window 702 includes buttons 710 that the user can select to prioritize difference skills (e.g., project management or scrum skills in the example of FIG. 7).

As depicted in FIG. 7, stream information 704 for the existing stream that is being edited includes the job title, probability of hire score (e.g., percentage chance of hire in the next 30 days in the example of FIG. 7), date when the position was opened, number of profiles viewed, number of messages sent, number of messages accepted, and a teed accuracy score (e.g., a percentage of the stream feed that is deemed to be accurate as shown in FIG. 7).

With continued reference to FIG. 7, the third screen of the user interface additionally includes insight buttons 708 that are selectable to display insights to the user for ways to increase a chance of hire percentage (e.g., a probability of filling the job opening indicated in the stream information 704). As shown in FIG. 7, the insight buttons 708 are selectable to display insights for how to increase a chance of hire percentage.

FIG. 8 is a screen capture illustrating a user interface for a semi-automatic message builder 800, in accordance with an example embodiment. The interface for the semi-automatic message builder 800 may be presented once a user of a recruiting tool (e.g., a recruiter or hiring manager) chooses to reach out to a candidate. The semi-automatic message builder 800 can then be used to semi-automatically generate a message body 802 that is optimized via selections of the suggested message features 804, 806, 808, and 810 for a high response rate and personalized based on the recipient member's profile information, the user's profile information, and the position being hired for.

As shown, the message builder 800 is a semi-automated message template used to create a message (e.g., a LinkedIn InMail message) that includes a message body 802 to be sent to a member of an online system (e.g., a social network system hosting a social networking service). The message builder 800 suggests features 804, 806, 808, and 810 of message templates that are predicted to garner higher response (e.g., higher positive acceptance) rates from members who receive the message. In some embodiments, the suggested message features 804, 806, 808, and 810 can be included in the message body 802 based on user selections. The suggested features 804, 806, 808, and 810 may be determined based on analysis of the message length, comparisons with industry messages, and A/B testing of messages. Additionally, the message builder 800 may use default templates to build a message body 802 which can be AB tested to improve message effectiveness (e.g., increase message acceptance rates).

In the example of FIG. 8, notes 812 indicate that the suggested feature 804 provides suggestions for personalizing the message with text that is randomly selected from a standard set of message personalization text. The personalization text in feature 804 suggests that indicating why a specific person might be a fit will increase the response rate to the message. As shown, the suggested feature 806 suggests text telling candidates what is great about the hiring organization. In the example of FIG. 8, the suggested feature 808 suggests including text in the message body 802 that tells candidates about the team to help candidates determine if the team is a good fit for them. As indicated in the notes 812, the features 806 and 808 can be automatically generated from the organization's profile. With continued reference to FIG. 8, the suggested feature 810 suggests text to ask a candidate to take action in order to help ensure that the candidate will respond to the message. As shown in the notes 812 the suggested feature 810 can include text that is randomly selected from a standard set of message personalization text.

In some embodiments, the message builder 800 can provide a one-click message send experience for a recruiter user, and provide automated follow-up to sent messages. For example, one-click messaging is provided wherein the user may press a button indicating interest in a candidate. Upon pressing the button, a message will be sent to the candidate and the next candidate will be shown. The message may be sent every time interest is indicated and is not shown on the screen in order to reduce the amount of time it takes to review and message a single candidate. Also, for example, the message builder 800 can create default messages, while also al lowing customization when one or more of the suggested message features 804, 806, 808, and 810 are selected. The message builder 800 avoids the hurdle of proactive message creation, while also ensuring a minimum quality of messages. The message builder 800 leverages data from target member profiles (e.g., candidate profiles), the user's company page, a job description, and statistics on employees in templates to improve message personalization and relevance.

In additional or alternative embodiments, another type of message that may be automatically generated by the message builder 800 is a reminder or follow up email message. For instance, a reminder or follow up message may be built by the message builder 800 and then sent automatically if no response to a previously-sent message is received after a specific period of time. In additional or alternative embodiments, messages may be sent at times which maximize the possibility of response, where the optimal or preferred times to send messages are based upon historical data. For example, if historical data indicates increased response rates to messages sent Tuesday mornings, the message builder 800 may send all messages at 10 am on Tuesdays. In some embodiments, the template not editable by the user and it may appear to come from LinkedIn instead of the user. For instance, the message builder 800 may build, personalize, and then send a message that is worded in the third person, such as, for example, 'Congratulations <candidate name>!<hiring manager name> is interested in hiring you for the role of <job title> at <company name>. Click here to see more about the role.' In this example, the sender (e.g., the hiring manager) would be shown to be a social networking service (e.g., LinkedIn) rather than the <hiring manager name>. Message templates may be edited and saved by a user such as a recruiter or hiring manager. The user may choose from several previously saved templates. Message templates may also be automatically optimized. The user may have several message templates. In some embodiments, a multi-armed bandit (MAB) optimization may be used to send one of several messages each time a message is sent. As a message receives more responses, it will be used more frequently. Message optimization may take into account varying attributes, such as, for example, the country where a user is located, or the role the user is hiring for. A large number of message templates may be used for variety. This remedies issues whereby if members of a social networking service receive the same message from all recruiters, then those messages may begin to decline in effectiveness after the user has already seen the same message. Thus, embodiments having a very large number of message templates, continually introducing new templates, and rotating templates improve effectiveness of messages generated by the message builder 800.

Figure 9:
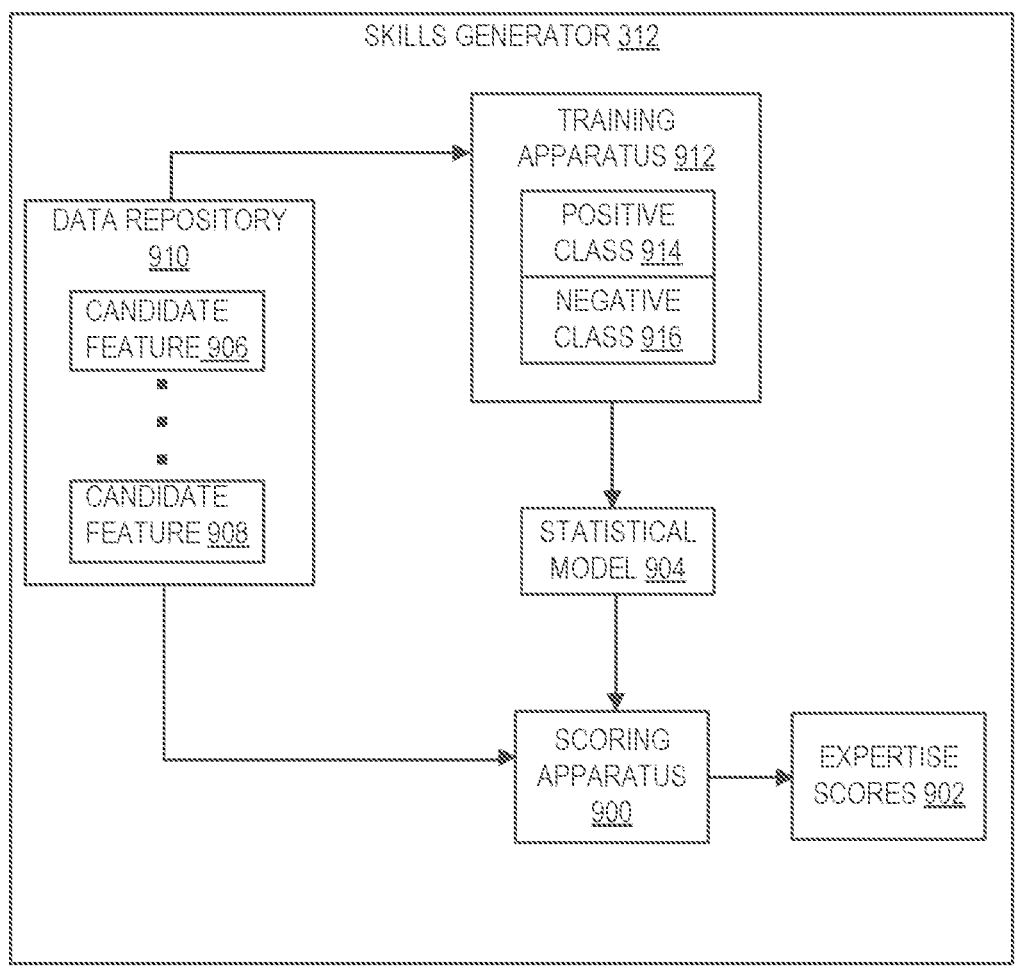
FIG. 9 is a block diagram illustrating a skills generator in more detail, in accordance with an example embodiment.

FIG. 9 is a block diagram illustrating the skills generator 312 in more detail, in accordance with an example embodiment. As shown in FIG. 9, a scoring apparatus 900 may calculate a set of expertise scores 902 using a statistical model 904 and a set of features 906-908 for candidate member profiles. The features 906-908 may be aggregated into a data repository 910 from the member profiles and/or member actions. For example, the features 906-908 may be received from a number of servers and/or data centers associated with websites and/or applications and stored in a relational database for subsequent retrieval and use.

Prior to the scoring apparatus 900 calculating the expertise scores 902 on actual member profiles, a training apparatus 912 may access training data for the statistical model 904, which includes a positive class 914 and a negative class 916. The positive class 914 may include data associated with items of a particular category (e.g., trait, attribute, dimension, etc.), while the negative class 916 may include data associated with items that do not belong in the category.

For example, the statistical model 904 may be a logistic regression model that classifies each member profile as either an expert or a non-expert in a corresponding skill. The positive class 914 may thus include a subset of the features 906-908 associated with members with known expertise in one or more skills. Such 'expert' members may be identified based on publications, speeches, awards, and/or contributions of the members in their respective fields. On the other hand, the negative class 916 may include a subset of the features 906-908 associated with members who are not recognized as experts in their respective fields, such as random members who list a given skill in their profiles. Because far fewer members belong in the positive class 914 than in the negative class 916, the positive class 914 may be oversampled to produce a roughly class-balanced set of training data for the statistical model 904.

Next, the training apparatus 912 may use the positive class 914 and the negative class 916 to train the statistical model 904. For example, the training apparatus 912 may use maximum-likelihood estimation (MLE) and/or another estimation technique to estimate the parameters of a logistic regression model for calculating the expertise scores 902. After training of the logistic regression model is complete, the parameters may be set so that the logistic regression model outputs values close to 1 for training data in the positive class 914 and values close to 0 for training data in the negative class 916.

The trained statistical model 904 may be provided to the scoring apparatus 900, which calculates the expertise scores 902 for member profiles not included in the training data (such as recent hire member profiles supplied by the searcher) by applying the statistical model 904 to features (e.g., features 906-908) for each of the items. For example, a feature vector may be generated for each item from a subset of the features 906-908 in the data repository 910, and the statistical model 904 may be applied to the feature vector to calculate an expertise score 902 for the item with respect to a dimension of the member profile.

The features 906-908 used in the calculation of the expertise scores 902 may include demographic features, social features, and behavioral features. Demographic features may include data related to a member's location, age, experience, education, and/or background; social features may include features related to the behavior of other members with respect to the member; and behavioral features may include features related to the member's actions or behavior with a social networking service and/or related websites or applications. In some embodiments, the social networking service is an online professional network.

Figure 10:
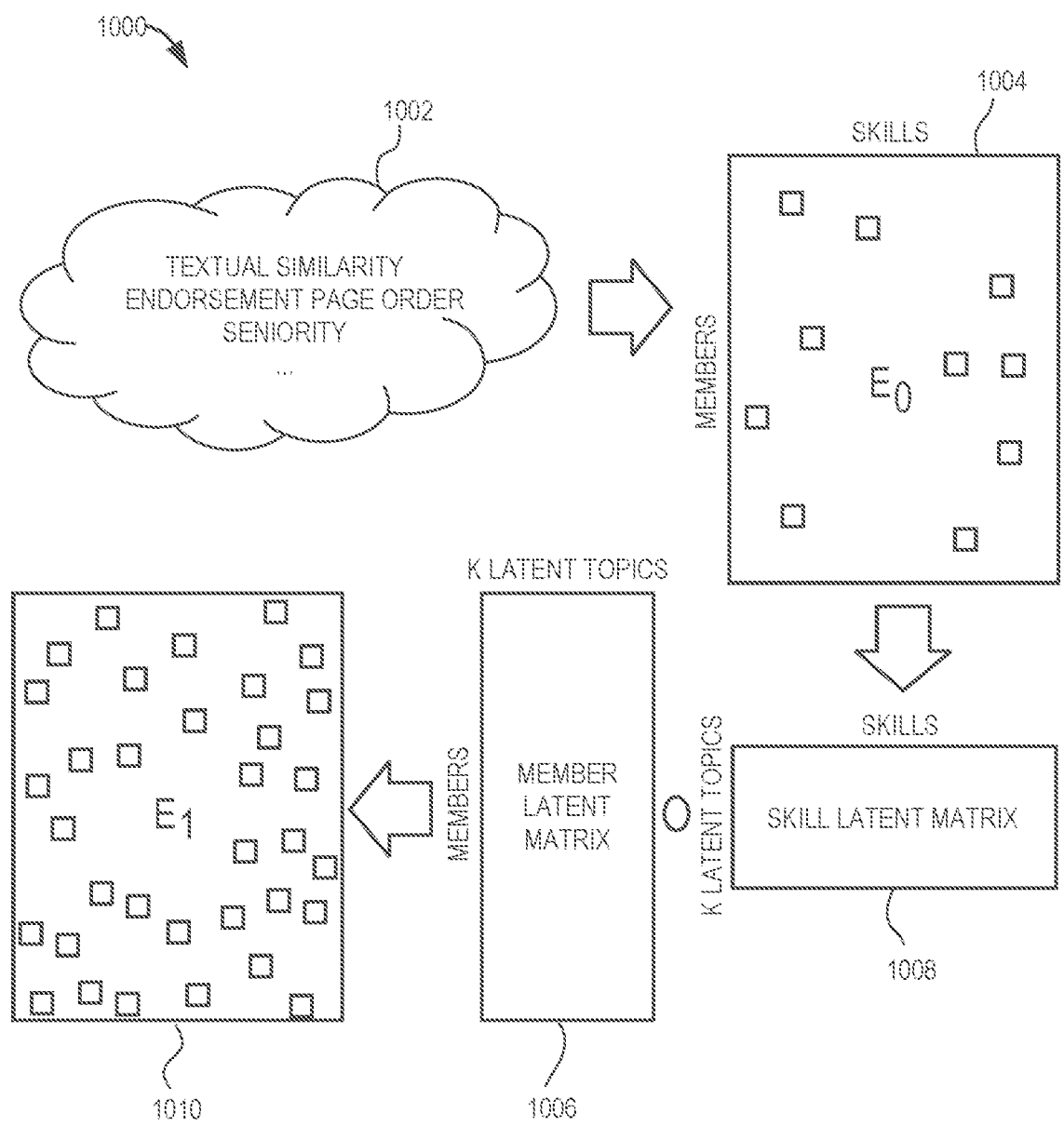
FIG. 10 is a diagram illustrating an offline process to estimate expertise scores, in accordance with another example embodiment.

FIG. 10 is a diagram illustrating an offline process 1000 to estimate expertise scores, in accordance with another example embodiment. A supervised machine learning algorithm combines various signals 1002, such as skill-endorsement graph page order (e.g., skill-endorsement graph page rank), skill-profile textual similarity, job title or position similarity, member seniority, etc., to estimate the expertise score. After this step, a formed expertise matrix 1004 is very sparse since only a small percentage of the pairs can be predicted with any degree of certainty. The formed expertise matrix 1004 may be factorized into a member matrix 1006 and a skill matrix 1008 in K-dimensional latent space. Then; the dot product of the formed expertise matrix 1004 and the skill matrix 1008 is computed to fill in the 'unknown' cells. The intuition is that the more members list two particular skills in their corresponding member profiles (called co-occurrence of skills), the more likely it is that a member only listing one of those skills also has the other skill as a latent skill. Since the dot product results in a large number of non-zero scores for each member listing the skills, the scores can then be thresholded such that if the member's score on a skill is less than a particular threshold, the member is assumed not to know the skill and is assigned a zero expertise score on the skill. Thus, a final expertise matrix 1010 is still sparse, but relatively much denser than the formed expertise matrix 1004.

Referring back to FIG. 3, given a set of input suggested hires (e.g., suggested candidates in a candidate stream), the skills generator 312 can rank the skills for the group of suggested hires. Then, the top AT ranked skills can be selected to represent the suggested hires. Expertise scores of a suggested hire on outlier skills are zero or very low, and thus these skills are unlikely to be selected. Moreover, because skills are summed over all candidates, the skills that many candidates have are boosted, thus representing the commonality of the skill set among all suggested hires.

Turning now to organizations such as related or similar companies, for a particular company, given suggested candidate profiles, the query builder 306 can generate queries based on a set of other companies, outside of the particular company, that are likely to have candidates similar to the particular company's suggested candidates in their suggested candidate profiles. In order to accomplish this, the query builder 306 contains an organization generator 314, which can use collaborative filtering to find organization relationships. The organizations can be companies or other organizations that have been browsed or that candidates have been associated with, such as, for example, corporations, firms, universities, hospitals, government entities, or other organizations. The organizations can be organizations that candidates have worked for or have been under contract to (e.g., as consultants, temporary employees, interns, or contractors). Specifically, an organization browse map using co-viewing relationships (people who view organization or company A and view organization or company B) may be utilized. Intuitively, organizations or companies co-viewed by highly overlapped sets of people are likely to be similar. Thus, activity and/or usage information for searchers/browsers within the social networking service may be retrieved and mined to construct the organization browse map, and this browse map may then be used to find the organization relationships by the organization generator 314. Other information may be used either in conjunction with or in lieu of the organization browse map. For example, the social networking service may keep track of candidates who apply to a given organization or company. Therefore, it may deduce that if a member who applied to organization B also applied to organization A, then organization A and organization B are similar. This similarity relationship may be used as the browse map is used, to generate companies or organizations related to companies or organizations identified in profiles of suggested candidates. Another signal that may be used is organization movement, meaning that if a relatively large number of people who left organization A went to work for organization B, this might imply that organization A and organization B are somewhat similar.

Similar strategies can be used for other facets of a query. For example, title, industry, seniority, years of experience, locations, and schools can all be expanded from those facets in the suggested candidate profiles by finding similar facets using, for example, browse maps or organization movement.

Once the query builder 306 completes generating the query based on the techniques described above, the query may be submitted to a search engine such as, for example, the query processor 308, to return search results. The search results represent candidates who are similar in some ways to the recent hires that have been selected or hired by the searcher, thus alleviating the searcher of the burden of composing the query. Once the results are returned, a search results ordering system 310 may order the search results according to one or more ordering algorithms. A subset of the top-ranked search results may then be displayed to the searcher using a results display component 316. In an example embodiment, the results display component 316 interacts with the client profile search component 302 to facilitate such a display. The number of top-ranked search results displayed may vary based on, for example, current size of a display window, font size, user preferences, etc.

While any ordering algorithms may be used by the search results ordering system 310 to order the search results, in an example embodiment a machine learning algorithm is used to train an ordering model specifically to be used with searches generated by searchers providing recent hires in lieu of text-based keywords. Given the significant difference between a search by recent hires and a traditional query-based search, this algorithm helps provide orderings that accommodate this new type of search.

In some embodiments, stream refinement question-based features may be fed along with scores from a query-based ordering model to a machine learning algorithm that is designed to train a combined ordering model that is capable of determining an ordering score for a search result at runtime. This training may use labels supplied for training data (e.g., training suggested candidates and training search results along with labeled scores for each). The training may involve the machine learning algorithm learning which features/scores are more or less relevant to the ordering scores, and appropriately weighting such features and scores for runtime computations. At runtime, a feature extractor extracts: query-based features from the query, features from stream refinement answers, features from candidate search results, and from suggested candidates. The feature extractor then feeds these extracted features to the combined ordering model, which produces the scores as per its model. An ordering system can then use these ordering scores to order the search results for display to the searcher.

As noted above, machine learning explores the study and construction of algorithms, such as the machine learning algorithm discussed above, that may learn from existing data such as the stream refinement question-based features and make predictions about new data. Such machine-learning algorithms operate by building a model, such as the combined ordering model, from example training data in order to make data-driven predictions or decisions expressed as outputs or assessments, such as the ordering scores output by the combined ordering model. Although example embodiments are presented with respect to a few machine-learning algorithms and models, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job candidate attributes.

It should be noted that since searching based on recent hires is a relatively new concept, it is difficult to generate labeled data directly from a log of previous search systems, as would typically be done to generate labeled data. Instead, in an example embodiment, labeled data is generated from the log of a query-based search. One such log is a log of electronic communications performed after the search. For example, if a searcher sees 20 results to a query-based search for candidates, and sends email communications to eight candidates from the 20 results, then it may be assumed that these eight candidates are similar enough to be considered for the same position or job (e.g., title), and thus if a profile for one or more of those eight candidates had been submitted for a search by recent hire, the other candidates could be considered likely top results. In an example embodiment, other actions taken with respect to previous search results may be logged and similarly used to determine recent hire matches. For example, while communication with a candidate may be considered as strongly indicative of a match for the underlying position (and thus a match with other candidates also emailed for the same position) and assigned a high relevance score, clicking on a candidate (without an email) may be considered to be a partial match and may be assigned a moderate relevance score, while skipped results might be considered a low relevance score. The relevance scores may be used as the labels for the sample data.

Thus, in an example embodiment, communications between searchers and members of the social network service are monitored and logged, and these communications are used to derive a label score for each sample search result/recent hire pair. Such sample search results may simply be the search results presented in response to previous queries. The label score may be generated using various combinations of the metrics described above. For example, if the same searcher communicated with both candidates A and B in response to the same search query, then candidate B is assigned a score of 5 (on a scale of 1 to 5, 5 being most relevant) for a recent hire A and candidate A is assigned a score of 5 for a recent hire B. Actions such as clicking on a candidate that indicate a moderate relevance may be assigned a score of 3, and taking no action may be assigned a score of 1. Scores for various log entries can then be combined and averaged. The result is profile pairs that have been assigned scores of between 1 and 5 based on previous actions or inactions by previous searchers. These label scores may then be used as labels for hypothetical recent hire/search result pairs for those same member profiles.

In an example embodiment, a dynamic weight trainer is used to dynamically alter the weights assigned to the stream refinement question-based features. Specifically, a search query need not be limited to a single query before the search is complete. Often the searcher may interact with the original query and search results to provide additional refinements of the original search. This is not only true with traditional text-based searches but also can be true with recent hire-based searches as well. This may be accomplished by the searcher applying additional filters or making text-based additions to the initial recent hire-based search to refine the results. The result is that the recent hire-based features, which directly measure the similarity between the recent hire(s) and the search results, become less and less important as the search is refined.

At the same time, as the search session continues, the confidence of the remaining attributes (e.g., query-based attributes) increases in usefulness.

The purpose of the dynamic weight trainer is to dynamically alter the weights of the features extracted to favor the query-based features over the stream refinement question-based features over time. This may be performed by applying a decay function, defined on some measure of session length, such as the number of query refinements, to gradually reduce the weights of the stream refinement question-based features and/or increase the weights of the query-based features. This function controls the dynamic balance between the impacts of the input suggested candidates and the query on the result ordering.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide ordering scores to qualify candidates for jobs. That is, the machine-learning algorithm utilizes features for analyzing the data to generate assessments. A feature such as a query-based feature or a stream refinement question-based feature is an individual measurable property of a phenomenon being observed. The concept of feature is related to that of an explanatory variable used in statistical techniques such as linear regression. Choosing informative, discriminating, and independent features is important for effective operation of the machine-learning algorithm in pattern recognition, classification, and regression. Features may be of different types, such as numeric, strings, and graphs.

In one example embodiment, the features may be of different types and may include one or more of candidate features, job features, organization (e.g., company) features, query-based features, stream refinement question-based features, and other features. Candidate features may include one or more of the member profile data in the profile data 218, as described above with reference to FIG. 2, such as educational background (e.g., schools, majors, matriculation and/or graduation dates, etc.), employment history, skills, professional organizations, title, skills, skills endorsements, experience, and the like. Job features may include any data related to the job or position, and organization features may include any data related to a hiring organization (e.g., company). In some example embodiments, other features may be included, such as post data, message data, web data, and the like.

The machine-learning algorithm utilizes training data to find correlations between the identified features and the outcome or assessment (e.g., ordering scores). In some example embodiments, the training data includes known data for one or more identified features and one or more outcomes, such as candidates reviewed by recruiters, jobs searched by members, job suggestions selected for reviews, members changing companies, members adding social connections, members' activities online, etc.

With the training data and the identified features, the machine-learning algorithm is trained. For instance, weights for features can be re-trained by the dynamic weight trainer and passed to the combined ordering model. The machine-learning algorithm appraises the value of the features as they correlate to training data. The result of the training is a trained machine-learning program or model. When a machine-learning program is used to perform an assessment, new data (e.g., new query-based features and new stream refinement question-based features) provided as an input to the trained machine-learning program, and the machine-learning program generates the assessment (e.g., ordering scores) as output. For example, when a recruiter submits query terms for a candidate search, a machine-learning program, trained with social network data, utilizes the member data and the job data, from the job the recruiter wishes to fill, to search for candidates that match the job's requirements (e.g., skills, seniority, and education).

As noted above, example techniques for QTW to weigh query-based features are further described in U.S. patent application Ser. No. 15/845,477 filed on Dec. 18, 2017, entitled "QUERY TERM WEIGHTING", which is incorporated herein by reference in its entirety. The referenced document describes weighting parameters in a query that includes multiple parameters to address the problem of identifying relevant records in a data repository for responding to a search query from a user of a client device. The referenced document also describes a system wherein a server receives, from a client device, a search query for employment candidates, where the search query includes a set of parameters and each parameter in the set of parameters has a weight. The referenced document further describes that the server generates, from a data repository storing records associated with professionals, a first set of search results based on the set of parameters and the weights of the parameters in the set. The server transmits, to the client device, the first set of search results. The server then receives, from the client device, a response to search results from the first set of search results. The search results are associated with a set of factors. The factors in the set may correspond to any parameters, for example, skills, work experience, education, years of experience, seniority, pedigree, and industry. The response indicates a level of interest in the search results. For instance, the response may indicate that the user of the client device is interested in the search results, is not interested in the search results, or has ignored the search results. The server adjusts the parameters in the set of parameters or adjusts the weights of the parameters based on the response to the search result(s). The server provides an output based on the adjusted parameters or the adjusted weights Example Methods Example methods are illustrated in FIGS. 11-16 according to some example embodiments. While the various operations in the flowcharts of FIGS. 11-16 are presented and described sequentially, one of ordinary skill will appreciate that some or all of the operations may be executed in a different order, be combined or omitted, or be executed in parallel. The various operations of the example methods illustrated in FIGS. 11-16, which are described below, may be performed, at least partially, by one or more processors that are temporarily configured (e.g., by software) or permanently configured to perform the relevant operations.

Figure 11:
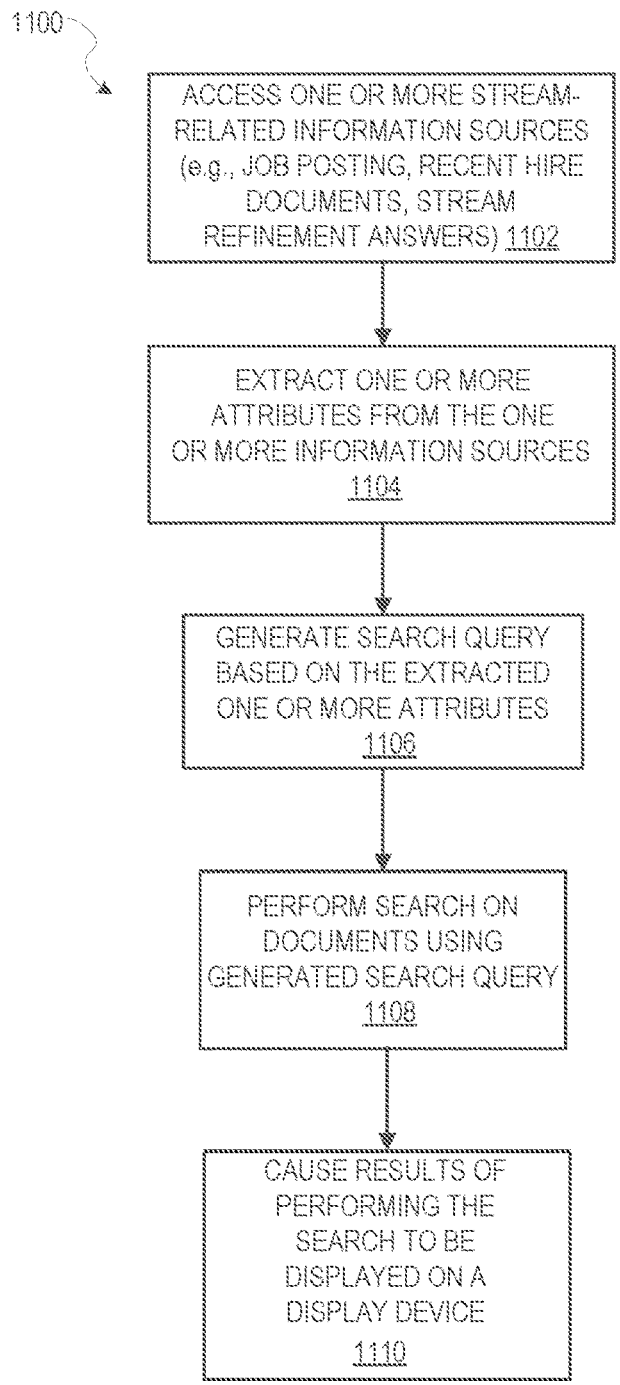
FIG. 11 is a flow diagram illustrating a method for performing a suggested candidate-based search, in accordance with an example embodiment.

FIG. 11 is a flow diagram illustrating a method 1100 for performing a stream refinement question-based search in accordance with an example embodiment. At operation 1102, one or more stream-related information sources may be accessed. In the example of FIG. 11, the information sources may include job postings, recent hire documents (e.g., member profiles for recent hires), stream refinement answers (e.g., user responses to presented stream refinement questions), and other information sources related to a stream. For instance, operation 1102 can comprise accessing or obtaining stream refinement answers. As shown in operation 1102, these stream refinement answers may be related to member profiles of an online system. In an example embodiment, these answers may be related to member profiles in a social networking service. In an embodiment, operation 1102 can include accessing answers related to profiles of suggested candidates for a given title and related titles. Such profiles can be automatically identified based on a particular stream refinement answer (e.g., a particular title) supplied by the searcher. In this example, additional profiles may be automatically identified based on titles that are related to and/or synonymous with the particular title.

The documents and information accessed at operation 1102 can also be automatically identified based at least in part on titles suggested by an intelligent matches system, such as the intelligent matches system 400 described above with reference to FIG. 4. The suggested titles may be automatically identified based on a predicted position (e.g., role, job title) for which a recruiter may be hiring. For example, the documents accessed in operation 1102 may include candidate member profiles that are suggested to the user based on the predicted positions. In an alternative or additional embodiment, the member profiles can be accessed by a searcher specifying the corresponding members and the member profiles retrieved from a database based on the searcher's specified members. However, implementations are possible where the documents accessed are not member profiles.

At operation 1104, one or more attributes are extracted from the one or more stream-related information sources. For example, operation 1104 may comprise extracting attributes from stream refinement answers. Also, for example, operation 1104 can include extracting job titles (e.g., positions), locations (e.g., work locations), and skills from stream-related information sources such as stream refinement answers. Operation 1104 can include mapping the extracted job titles to title identifiers (title IDs) and matching the extracted skills to skill identifiers (skill IDs). In an embodiment, operation 1104 can include mapping the extracted job titles to a predicted position or title used in operation 1102 to access the one or more stream refinement answers.

At operation 1106, a search query is generated based on the extracted attributes. In some embodiments, operation 1106 can comprise completing an offline pipeline for job title (e.g., position) prediction. In alternative embodiments, QTW may be used to weigh terms of the search query.

At operation 1108, a search can be performed on documents using the generated search query, returning one or more result documents. As with the stream refinement answers, the result documents may also be member profiles in a social networking service.

At operation 1110, results of the search performed at operation 1108 are displayed. As shown, operation 1110 may comprise causing the search results (e.g., the result documents accessed at operation 1108) to be displayed on a display device. The search results displayed at operation 1110 may be based at least in part on a suggested title or predicted position used to access candidate documents at operation 1102.

Figure 12:
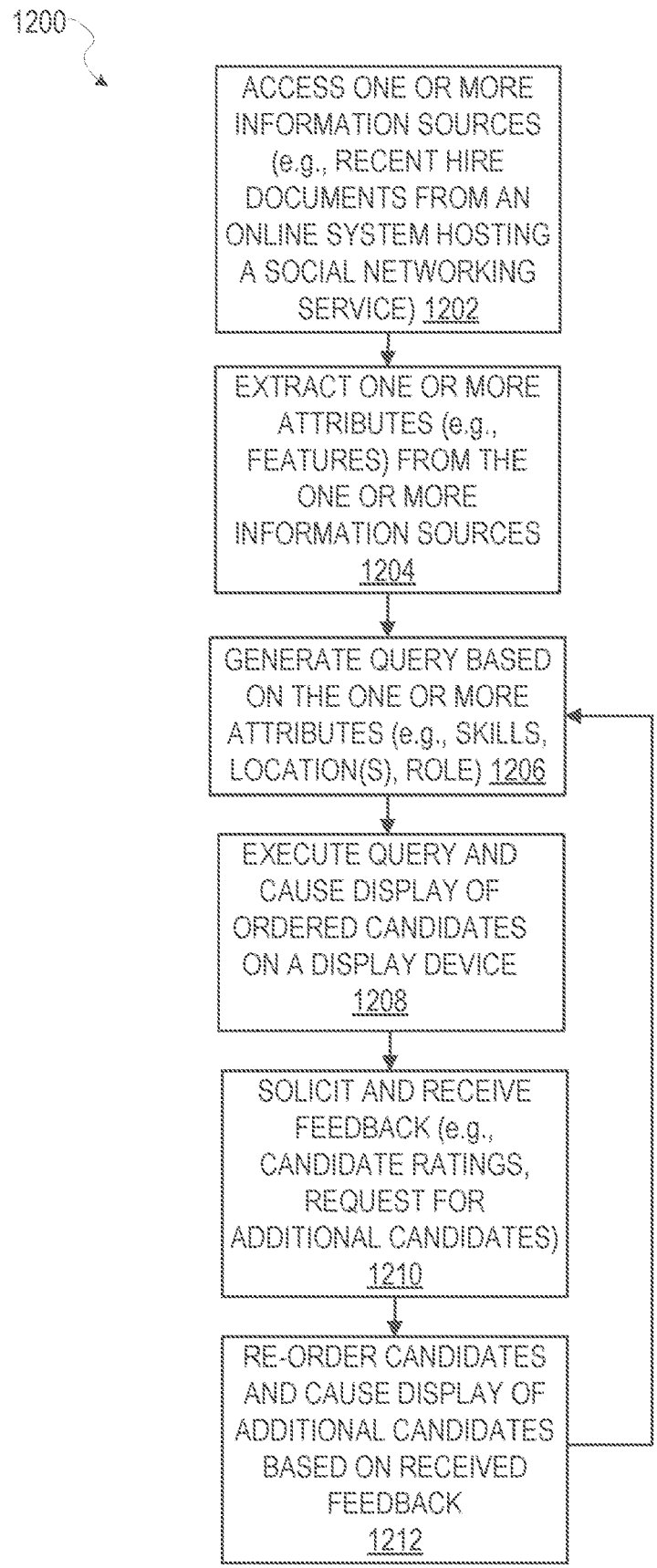
FIG. 12 is a flow diagram illustrating a method for soliciting and using feedback to create and modify a candidate stream, in accordance with an example embodiment.

FIG. 12 is a flow diagram illustrating a method 1200 for soliciting and using feedback to create and modify a candidate stream, in accordance with an example embodiment.

At operation 1202, one or more stream-related information sources may be accessed. In example embodiments, the information sources may include one or more of a job posting, recent hire documents (e.g., member profiles for people recently hired by an organization), stream refinement answers (e.g., user responses to displayed stream refinement questions), hiring organization data, and other information sources related to a candidate stream. Operation 1202 may comprise accessing a combination of stream-related information sources. Such stream-related information sources may include one or more of the member profile data in the profile data 218, as described above with reference to FIG. 2, such as educational background (e.g., schools, majors, matriculation and/or graduation dates, etc.), employment history, skills, professional organizations, title, skills, skills endorsements, experience, and the like. Operation 1202 may access job posting information including any data related to the job or position that is the subject of a job posting, and hiring organization data may include any data related to a hiring organization (e.g., company).

In an example, at operation 1202, stream refinement answers may be accessed or obtained. In an example embodiment, these answers are related to desired attributes of member profiles in a social networking service. For instance, these answers may be provided by a searcher specifying one or more parameters corresponding to desired member attributes (e.g., features such as skills, organizations, education/degrees, and seniority), with the member profiles being accessed from a database based on the searcher's specified answers (e.g., parameters) However, implementations are possible where the stream refinement answers accessed are not related to member profiles. In additional or alternative embodiments, the stream refinement answers are provided by a searcher reviewing member profiles corresponding to a stream of candidates. Initially, the method 1200 can include performing a manual feature selection as part of operation 1202. Such a manual feature selection can include a recruiter user making manual selections of stream refinement answers corresponding to desired seniority and skills for a candidate search.

As shown in FIG. 12, the information sources accessed at operation 1202 may include recent hire documents from an online system (e.g., member profiles for recent hires from an online system that hosts a social networking service). In additional or alternative embodiments, the information sources may include one or more stream-related information sources such as, for example, job postings, stream refinement answers (e.g., user responses to presented stream refinement questions), and other information sources related to a stream. In an example, at operation 1202 one or more recent hire documents may be accessed or obtained. In an example embodiment, these documents are member profiles in a social networking service and correspond to members of the social networking service who have been recently hired by an organization (e.g., a company) seeking to hire additional personnel. The recent hire documents may be accessed or obtained from an online system having a plurality of member profiles.

In an embodiment, information sources such as recent hire documents may be accessed or obtained at operation 1202 by a searcher specifying one or more parameters corresponding to desired member attributes (e.g., features such as skills, organizations, education/degrees, and seniority), for an open position. The recent hire documents may be retrieved from a member profile database based on the searcher's specified parameters. However, implementations are possible where the documents accessed are not member profiles. In additional or alternative embodiments, the recent documents are member profiles used to generate a query for creating a stream of candidates (see, e.g., operations 1204, 1206, and 1208). Initially, the method 1200 can include performing a manual feature selection as part of operation 1202. Such a manual feature selection can include a recruiter user making manual selections of desired seniority and skills for a candidate search based on recent hire documents.

At operation 1204, one or more attributes are extracted from the one or more information sources (e.g., recent hire documents). In some embodiments, the attributes may include skills, job titles, roles, locations, positions, and seniority.

In some embodiments, at operation 1204, attributes (e.g., features) are extracted from the one or more stream-related information sources (e.g., stream refinement answers). According to certain embodiments, the operation 1204 also filters the data set for a candidate count in order to be able to evaluate online updates to the candidate orderings. Some of these embodiments use a certain number of initially ordered candidates as input. In additional or alternative embodiments, filtering can also be performed according to a total number of successful reviews and other feedback measurements. Feature selection can also performed as part of operation 1204. In an embodiment, operation 1204 accesses an informational feature vector for each candidate represented in the stream refinement answers to incorporate into the ordering model.

At operation 1206, a query is generated based on the attributes extracted at operation 1204. As shown, the query may be based on attributes such as, but not limited to, skills identified in the attributes, geographic locations (e.g., work locations of recent hires, office locations for a job posting), and roles. Each role identified in the extracted attributes may include a respective job title, and such job titles can be used in operation 1206 to generate the query. Operation 1206 may comprise identifying skills clusters based on the extracted attributes extracted at operation 1204, and generating, by a query builder, a search query based at least in part on the identified skills clusters.

In an embodiment, at operation 1206, candidates represented by one more stream refinement answers are ordered and evaluated based on the extracted one or more attributes. The initial orderings obtained by performing operation 1206 can be presented to a user as candidate documents (e.g., member profiles or summaries for candidates) in a candidate stream.

At operation 1208, the search query is executed on a plurality of member profiles (e.g., profiles in an online system hosting a social networking service) to return one or more suggested candidate documents. Candidates represented by the one more suggested candidate documents are ordered at operation 1208 based on candidate-based attributes extracted from the suggested candidate documents. The initial orderings obtained by performing operation 1208 can be presented to a user as suggested candidate documents (e.g., member profiles or summaries for candidates) in a candidate stream.

According to certain embodiments; the operation 1208 also filters the data set for a candidate count in order to be able to evaluate online updates to the candidate orders. Some of these embodiments use a certain number of initially ordered candidates as input. In additional or alternative embodiments, filtering can also be performed according to a total number of successful reviews and other feedback measurements. Feature selection can also performed as part of operation 1208. In an embodiment, operation 1208 obtains an informational feature vector for each candidate represented in the suggested candidate documents to incorporate into an ordering model.

As shown, at operation 1208, results of the candidate ordering are displayed. Operation 1208 may comprise causing the ordered candidates results (e.g., the top-ranked candidate documents as ordered) to be displayed on a display device. The ordering results displayed at operation 1208 may be presented in an interactive user interface on a display screen of a computing device.

At operation 1210, feedback regarding presented candidate documents is solicited, received, and measured. As shown, operation 1210 can include accessing or receiving user feedback as ratings of the top-ordered candidate documents displayed at operation 1208. The feedback can be feedback from a user such as a recruiter or hiring manager. Here, the suggested candidate documents may be member profiles in a social networking service. Based on user ratings feedback (acceptance, deferral, or rejection rating, numerical ratings, star ratings) and additional user feedback (e.g. a response to a prompt to display a certain number of additional candidates to improve the stream), the method 1200 can return additional candidates to a user. In some embodiments, operation 1210 considers additional feedback such as, for example, an explicit request to see five additional candidates, an implied or inferred request to see additional candidates similar to positively-rated candidates (e.g., candidates accepted by a user providing candidate ratings).

Operation 1210 can include accessing or receiving explicit and implicit user feedback. The feedback can be feedback from a user such as a recruiter or hiring manager. Here, the stream refinement answers may be member profiles in a social networking service. Based on explicit user feedback (acceptance, deferral, or rejection rating, user-specified job title and location, etc.) and implicit user input and feedback (similar company matching, dwell time, profile sections viewed, and number of revisits to a saved candidate profile, etc.), the method 1200 can return potential candidates to a user such as a recruiter or hiring manager. In some embodiments, operation 1210 considers implicit feedback such as, for example, a similarity between the attributes extracted at operation 1204 and corresponding attributes of positively-rated candidates (e.g., candidates accepted by a user providing explicit feedback), and a similarity between employers (past or present) of suggested candidates and employers of positively-rated candidates.

Feedback received at operation 1210 can include explicit feedback such as acceptance, deferral, or rejection ratings of a presented candidate by a user (e.g., recruiter feedback).

Feedback received at operation 1210 can also include a user's interest in viewing a certain number (e.g., five) of additional candidates. For example, starting with a set of suggested candidates for a title (i.e., suggested candidates for a given job title) specified by the stream, an embodiment prompts a user to review additional candidates when user rejects some of the set of suggested candidates. In an embodiment, the additional candidates may include similar features (e.g., skills, education, experience, roles with job titles, current and past organizations) to positively-rated suggested candidates (e.g., accepted candidates).

Explicit feedback received at operation 1210 can also include a user's interest in member urns and can be used in method 1200 to identify ranking and recall limitations of previously displayed profiles and to devise reformulation schemes for query intent clusters. For example, starting with a set of suggested desired candidates for a title (i.e., suggested candidates for a given job title) specified by the stream, an embodiment represents a candidate profile as a bag of urns. In this example, an urn is an entity type associated with a member profile, where an entity type represents an attribute or feature of the member's profile (e.g., skills, education, experience, current and past organizations). For instance, member profiles can be uniquely identified by urns, where the urns can include urns for skills (e.g., C++ programming experience) and other urns for company or organization names (e.g., names of current and former employers). Implicit feedback received at operation 1210 can include measured metrics such as dwell time, profile sections viewed, and a number of revisits to a saved candidate profile.

At operation 1212, candidates are re-ordered based on the feedback received at operation 1210. The re-ordering of operation 1212 can include performing a cold start of an ordering model with a first candidate and user feedback that the first candidate received (e.g., a rating of the first candidate). In operation 1212, the ordering model can be used to order a pool of candidates (excluding the first candidate since it has already been used). Based on the current ordering of the candidates determined in operation 1208, the method 1200 retrieves additional candidates with the highest orderings. This can be done in the context of an online system that is presenting a candidate to the user based on the feedback it has received thus far at operation 1210. Using the feedback for the current candidate received at operation 1210, and a feature vector representing the candidate to the ordering model, the method 1200 updates the ordering model by performing operation 1212.

In an embodiment, operation 1212 re-orders the pool of candidates that have not yet been used according to the updated model. Then, the method 1200 repeatedly retrieves the candidate with the highest rating until all candidates in the pool have been exhausted.

To judge the effectiveness of the ordering model at selecting favorably rated candidates before unfavorably rated candidates, the method 1200 can include computing ordering metrics measuring precision and candidate feature weights as part of operation 1212.

The method 1200 can include implementing a simulated data flow for ingesting an initial ordering model at operation 1208 and updating it at operation 1212 based on feedback received and measured at operation 1210, and then performing further iterations of the offline experimental simulations by repeating operations 1206, 1208, 1210, and 1212. These offline experimental simulations can employ different models, use a warm-start of models, and utilize different features.

Some embodiments use feedback that is given by recruiter users, rather than other users such as hiring managers. These embodiments can potentially take less domain knowledge into account by not relying on feedback from an organization's hiring manager. Certain embodiments incorporate feedback received at operation 1210 to update candidate orderings offline at operation 1210.

As shown, operations 1206, 1208, 1210, and 1212 can be repeated to perform re-ordering and evaluation based on repeated user feedback received at operation 1210.

Figure 13:
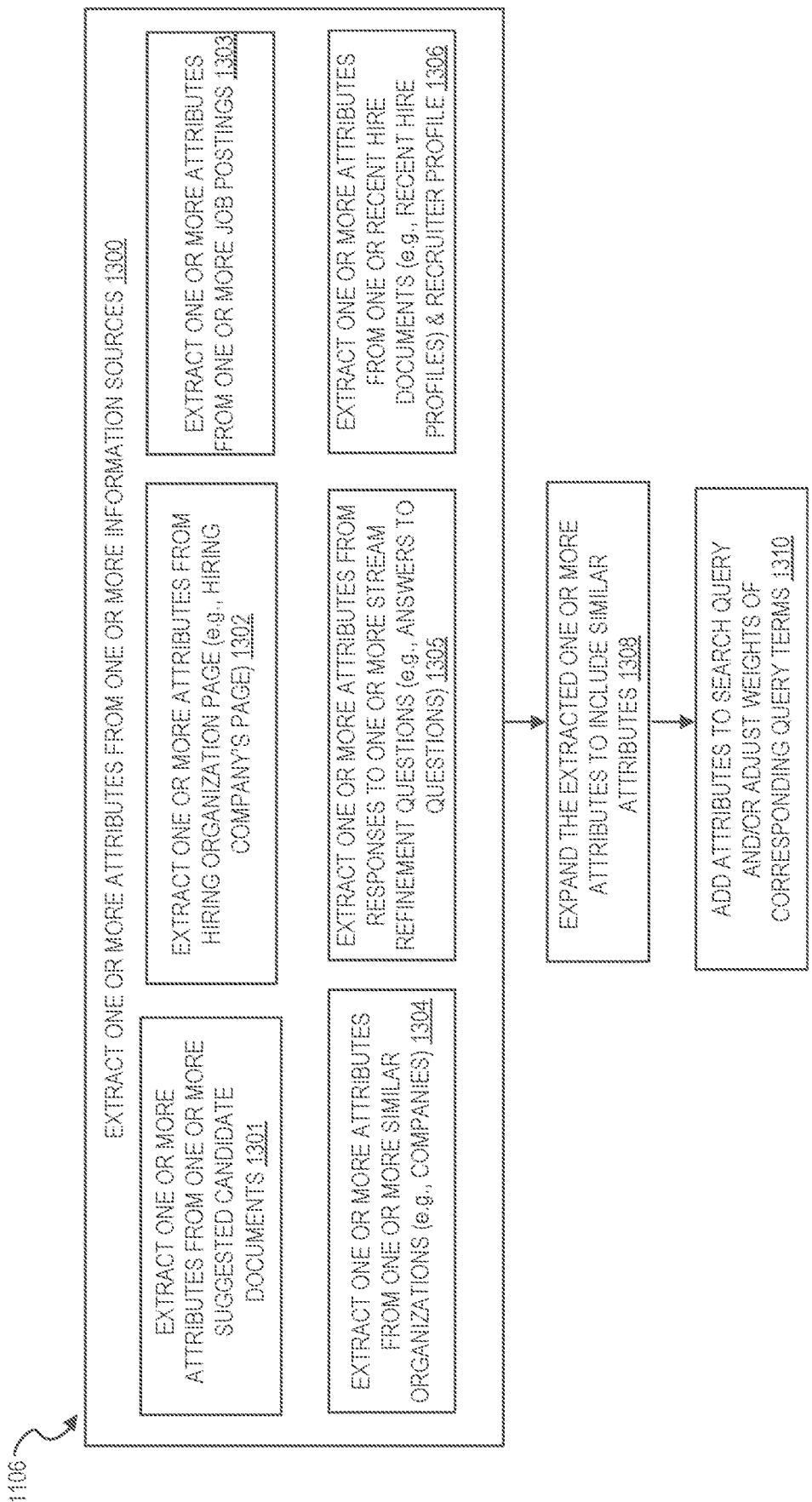
FIG. 13 is a flow diagram illustrating generating a search query based on one or more extracted attributes, in accordance with an example embodiment.

FIG. 13 is a flow diagram illustrating a method of generating a search query based on one or more extracted attributes, in accordance with an example embodiment. FIG. 13 corresponds to operation 1106 of FIG. 11 in more detail.

As shown, attribute extraction operations 1301, 1302, 1303, 1304, 1305 and 1306 may be performed in parallel as part of operation 1300. For example, the attribute extractions of operations 1301, 1302, 1303, 1304, 1305 and 1306 may be performed substantially simultaneously, and the extracted attributes from these operations are then passed to operation 1308. That is, similar attributes may be extracted from each of the information sources shown in operations 1301, 1302, 1303, 1304, 1305 (e.g., stream refinement questions), and 1306.

At operation 1300, one or more attributes are extracted from one or more information sources. In the example of FIG. 13, the information sources may include suggested candidate documents (e.g., member profiles for suggested candidates in a stream), job postings, recent hire documents (e.g., member profiles for recent hires), stream refinement questions (e.g., user responses to presented stream refinement questions). In certain embodiments, attributes may be extracted from combinations and subsets of the information sources shown in FIG. 13. In additional or alternative embodiments, attributes may also be extracted from other information sources related to a candidate stream.

As shown in the non-limiting example of FIG. 13, operation 1300 comprises performing operation 1301 to extract one or more attributes from suggested candidate documents. The one or more attributes extracted at operation 1300 may include titles, such as, for example, job titles, roles, and positions. In an embodiment, operation 1301 may include accessing a plurality of suggested candidate documents and may further include aggregating the extracted one or more attributes across the plurality of suggested candidate documents. In certain embodiments, operation 1301 comprises identifying and selecting top attributes most similar to attributes of all of the one or more suggested candidate documents.

In some embodiments, operation 1300 also includes expanding an extracted title attribute based on a look up table that stores related or synonymous titles and suggested titles based on the title and its related or synonymous titles. For example, the title attribute for a title of 'software developer' may be expanded to the related title of 'software engineer' at operation 1301. In some embodiments related titles may be accessed or obtained from a data store or an algorithm. The related titles need not be synonyms (e.g., software developer and software engineer are synonymous titles), but only need be related (e.g., React developer and JavaScript developer are related titles). The related titles need not be generated ahead of time and stored in the data store (e.g., a database), but can be generated at runtime by an algorithm.

At operation 1302, one or more attributes are extracted from one or more pages of a hiring organization. The one or more attributes extracted at operation 1302 may include attributes indicating office locations. professional certifications and licenses, areas of expert knowledge, and skill endorsements. In an embodiment, operation 1302 may include accessing a plurality of hiring company pages.

In some embodiments, operation 1302 also comprises calculating a set of expertise scores for the extracted attributes using a statistical model and a set of features regarding skills corresponding to the one or more areas of expertise. The statistical model may be a logistic regression model trained using a machine learning algorithm. According to certain embodiments, operation 1302 further comprises using the expertise scores to rank skills of the one or more suggested candidate documents accessed at operation 1300, using the top attributes identified and selected at operation 1300.

At operation 1303, one or more attributes are extracted from one or more job postings. Operation 1303 can comprise extracting attributes from a fully-fledged job posting with a textual description of the job requirements and fields specifying numerous attributes such as industry, full-time vs part-time, salary range, seniority level, and education requirements.

At operation 1304, one or more attributes are extracted from one or more similar organizations. The similar organization may include organizations (e.g., companies, universities, hospitals, government agencies, and other organizations with employees) that are similar to a hiring organization. The one or more attributes extracted at operation 1304 may include attributes of similar organizations such as, for example, job titles, roles, and open positions at the similar organizations. In an embodiment, operation 1304 may include accessing a plurality of similar organizations (e.g., similar companies) and may further include aggregating the extracted one or more attributes across the plurality of similar organizations.

At operation 1305, one or more attributes are extracted from one or more stream refinement questions. Operation 1305 can comprise extracting attributes from user-provided answers to stream refinement questions such as, for example, questions regarding ideal candidates, organizations and companies, areas of expertise and skills, and keywords. In certain embodiments, there are four types of stream refinement questions that may be asked, and attributes may be extracted from answers to these questions. The first type of stream refinement question that may be asked is regarding areas of expertise (e.g., what skill sets are most important?). An area of expertise is typically higher level than individual skills. For example, skills might be CSS, HTML, and JavaScript, whereas the corresponding area of expertise might be web development. A second type of refinement question that may be asked is regarding a user's ideal candidate (e.g., do you know someone that would be a good fit for this job so that similar people can be found?). A third type of refinement question that may be asked is regarding organizations (e.g., what types of companies would you like to hire from?). A fourth type of refinement question that may be asked is regarding keywords (e.g., are there any keywords that are relevant to this job?). Operation 1305 may comprise extracting attributes from answers to one or more of these types of stream refinement questions.

Operating 1305 can comprise extracting one or more attributes from one or more areas of expertise. The one or more attributes extracted at operation 1305 may include attributes indicating areas of expertise such as, for example, job skills, professional certifications and licenses, areas of expert knowledge, and skill endorsements. In an embodiment, operation 1305 may include accessing a plurality, of areas of expertise and may further include aggregating the extracted one or more attributes across these areas of expertise. For example, operation 1305 can comprise getting the areas of expertise by asking the user a stream refinement question (e.g., which area of expertise is most important to you?).

At operation 1306, one or more attributes are extracted from one or more recent hire documents. Operation 1306 can comprise extracting attributes from member profiles for recent hires. As shown in FIG. 13, operation 1306 can also comprise extracting attributes from a recruiter's profile (e.g., the recruiter's LinkedIn profile).

At operation 1308, the extracted attributes from operations 1300, 1302, 1303, 1304, 1305 and 1306 are expanded to include similar attributes. In example embodiments, the attributes for titles may be expanded at operation 1306 to include job titles, roles, and positions that are similar to the titles extracted at operation 1300.

At operation 1308 attributes are added to a search query. As shown, in some embodiments, operation 1308 can optionally include adjusting weights of query terms in the search query. In an example, operation 1308 comprises adding or more top-ranked skills from operation 1302 to the search query.

Figure 14:
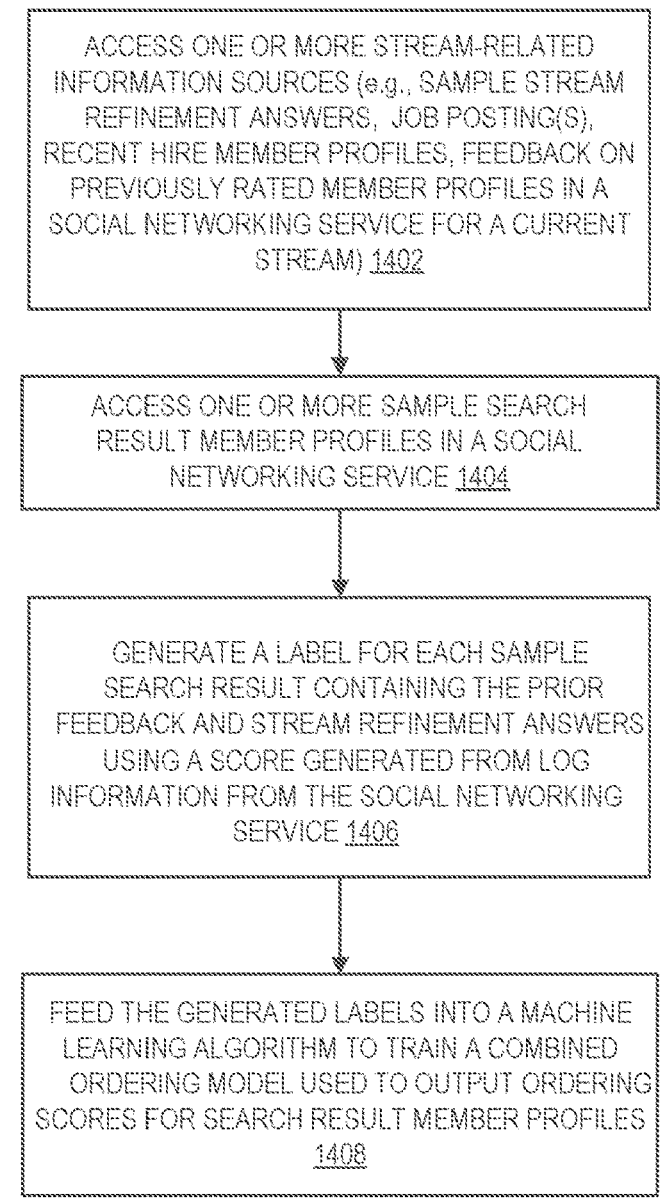
FIG. 14 is a flow diagram illustrating a method for generating labels for sample suggested candidate member profiles in accordance with an example embodiment.

FIG. 14 is a flow diagram illustrating a method 1400 for generating labels for sample suggested candidate member profiles, in accordance with an example embodiment. At operation 1402, one or more stream-related information sources are accessed. As shown in FIG. 14, operation 1402 may comprise accessing one or more of job postings and recent hire member profiles in a social networking service. The stream-related information sources accessed at operation 1402 can also include sample stream refinement answers in the social networking service as well as feedback on previously rated member profiles in the social networking service for a current stream.

At operation 1404, one or more sample search result member profiles in a social networking service are accessed. Operation 1404 can include obtaining sample suggested candidate profiles that are retrieved as the result of a candidate search query.

At operation 1406, for each sample search result containing the prior feedback and stream refinement answers, a label is generated using a score generated from log information of the social networking service. The log information includes records of communications between a searcher and members of the social networking service, the score being higher if the searcher communicated with both the member corresponding to the sample suggested candidate member profile and the member corresponding to the sample search result member profile in a same search session.

The log information may further include records of user input by the searcher, the user input causing interaction with member profiles in the social networking service but not resulting in communications between the searcher and the members of the social networking service corresponding to both the sample suggested candidate member profile and the sample search result member profile in the same search session. An example would include the searcher clicking on member profiles and viewing the member profiles but not emailing the corresponding members. A search session may be defined in a number of different ways. In one example embodiment, a search session is the same as a browsing session (e.g., as long as the searcher is logged in to the social networking service). In another example embodiment, the search session is limited to a period of time between a searcher initiating a search and the searcher submitting an unrelated search or logging off the social networking service.

At operation 1408, the generated labels are fed into a machine learning algorithm to train a combined ordering model used to output ordering scores for search result member profiles. In some embodiments, the machine learning algorithm used at operation 1408.

Figure 15:
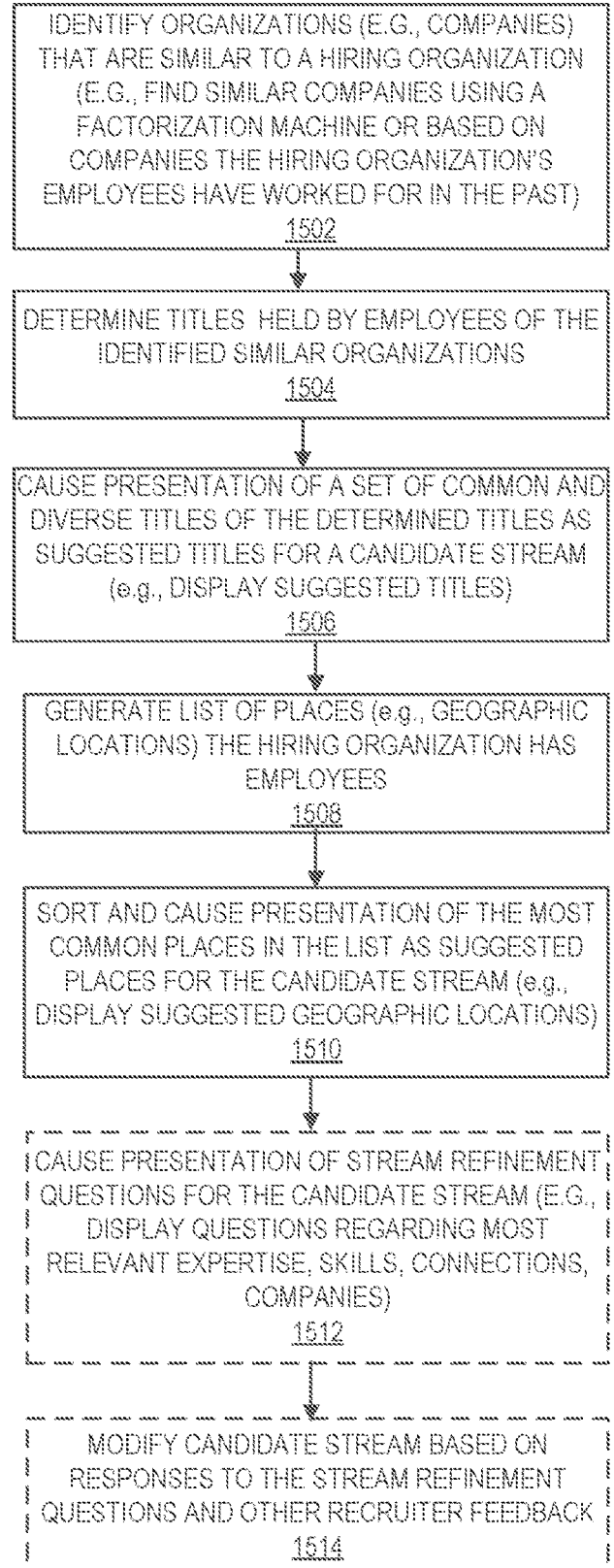
FIG. 15 is a flow diagram illustrating a method of generating suggested streams in accordance with an example embodiment.

FIG. 15 is a flow diagram illustrating an example method 1500 of generating suggested streams in accordance with an example embodiment. Optional and/or additional blocks are indicated in the flow diagram by dashed lines.

In some embodiments, prior to operation 1502, the method 1500 defines a candidate stream based on obtained user responses. For example, the user may provide a minimal set of stream definition answers comprising a title, and optionally a geographic location (e.g., a city or metropolitan area and a hiring organization (e.g., a company seeking to hire someone to fill a position with the given title in the given location).

According to certain embodiments, as a starting point for the method 1500, the user may also provide a fully-fledged job posting with a textual description of the job requirements and fields specifying numerous attributes such as industty, vs part-time, salary range, seniority level, and education requirements.

At operation 1502, organizations (e.g., companies) that are similar to a hiring organization are identified. In the example of FIG. 15, operation 1502 may comprise finding similar companies using a factorization machine. In an additional or alternative embodiment depicted in FIG. 15, operation 1502 may comprise finding similar companies based on companies the hiring organization's employees have worked for in the past.

At operation 1504, titles held by employees of the similar organizations are determined. Operation 1504 comprises gathering titles of employees of the similar organizations (e.g., companies, government agencies, universities, and other similar organizations) identified at operation 1502.

At operation 1506, a set of common and diverse titles of the determined titles is caused to be presented as suggested titles for a candidate stream. In an embodiment, operation 1506 may comprise one or more processors of a computing device causing presentation of the suggested titles on a display device of the computing device to a user (e.g., a recruiter) of the computing device. In an additional or alternative embodiment, operation 1506 can comprise displaying suggested titles in a user interface of a recruiting tool.

At operation 1508, a list of places the hiring organization has employees is generated. As shown in FIG. 15, operation 1508 can comprise generating a list of geographic locations, such as, for example, cities, metropolitan areas, counties, provinces, postal codes, counties, provinces, states, and other geographic areas, where the hiring organization (e.g., company) already has employees.

At operation 1510, the list of places generated at operation 1508 is sorted and displayed. As depicted in FIG. 15, operation 1510 can comprise causing presentation of the most common places in the list as suggested places for the candidate stream. In an embodiment, operation 1510 may comprise one or more processors of a computing device causing presentation of the suggested places on a display device of the computing device to a user (e.g., a recruiter) of the computing device. In an additional or alternative embodiment, operation 1510 can comprise displaying suggested places in a user interface of a recruiting tool. As with operation 1508, the suggested places presented at operation 1510 may be geographic locations, such as, for example, cities, metropolitan areas, counties, provinces, postal codes, counties, provinces, states, and other geographic areas.

In some embodiments, the method 1500 optionally includes one or both of operations 1512 and 1514, which are described below.

At optional operation 1512, stream refinement questions for the candidate stream may be presented. In the example embodiment of FIG. 15, operation 1512 comprises displaying questions regarding the most relevant expertise, skills, connections, and organizations (e.g., companies) so that the current candidate stream can be refined. In an embodiment, operation 1512 may comprise one or more processors of a computing device causing presentation of the stream refinement questions on a display device of the computing device to a user (e.g., a recruiter) of the computing device. In an additional or alternative embodiment, operation 1512 can comprise displaying the stream refinement questions in a user interface of a recruiting tool.

Optional operation 1512 may comprise presenting stream refinement questions prompting for additional input if the candidate stream is underspecified (i.e., too few quality candidates) or if additional information would improve results by modifying the stream to include a greater proportion of quality candidates. In an example where a user seeks to hire an accountant, the stream refinement questions presented in operation 1512 may include 'is it a requirement that the candidate be a CPA?.'

According to some embodiments, optional operation 1512 may include presenting questions to a user asking the user to provide the most relevant area of expertise. For example, if the title "Software Engineer" was a title determined in operation 1504 and presented as a suggested title in operation 1506, the stream refinement questions presented in operation 1512 may include questions asking a user whether one or more of the titles "Frontend Development", "Backend Development", or "Machine Learning" is most relevant to the role being filled. Additionally, operation 1512 may also present the user with the option of entering an area of expertise not mentioned. In some embodiments, operation 1512 may comprise presenting a stream refinement question asking the user what type of organization (e.g., company) the user would most like to hire from. For instance, operation 1512 may also comprise prompting the user with three example companies (e.g., similar companies identified at operation 1502) and present the user with the option of choosing a company not listed. Some embodiments, operation 1512 may comprise prompting the user to indicate which of their connections on a professional network would be the best fit for the role being filled.

In some embodiments, optional operation 1512, presents stream refinement question asking the user for additional information beyond presenting a stream of candidates and prompting the user to indicate whether a suggested candidate is a good match for a position. For instance, the stream refinement questions in operation 1512 go beyond asking the user to review suggested candidates and indicating which of the candidates represents an ideal candidate. In embodiments, the stream refinement questions presented in operation 1512 include questions asking the user to select areas of expertise relevant to the job, to select the types of organizations (e.g., companies) they would like to hire from, and prompts to provide relevant keywords. Operation 1512 can also include presenting prompts for responses to stream refinement questions that are based on suggested candidates included in the current candidate stream.

At optional operation 1514, the candidate stream may be modified based on responses to the stream refinement questions presented at operation 1512 and other recruiter feedback. In an embodiment, operation 1514 comprises obtaining responses to the stream refinement questions and recruiter feedback (e.g., feedback on a suggested candidate), and then dynamically tuning the candidate stream in accordance with the responses. For example, responsive to receiving a response to a stream refinement question, operation 1514 can alter a candidate stream so that candidates that more-closely match the response are presented to a user (e.g., a recruiter). Also, for instance, if the recruiter modifies their job posting (e.g., by changing required skills, desired education, and/or desired seniority), operation 1514 can comprise updating the stream accordingly in line with the recruiter's modifications to the job posting. That is, the set of candidates returned in the stream can be updated at operation 1514 every time any new information from a stream-related information source is received (such as the stream-related information sources depicted in FIGS. 3 and 13), not just stream refinement questions.

Figure 16:
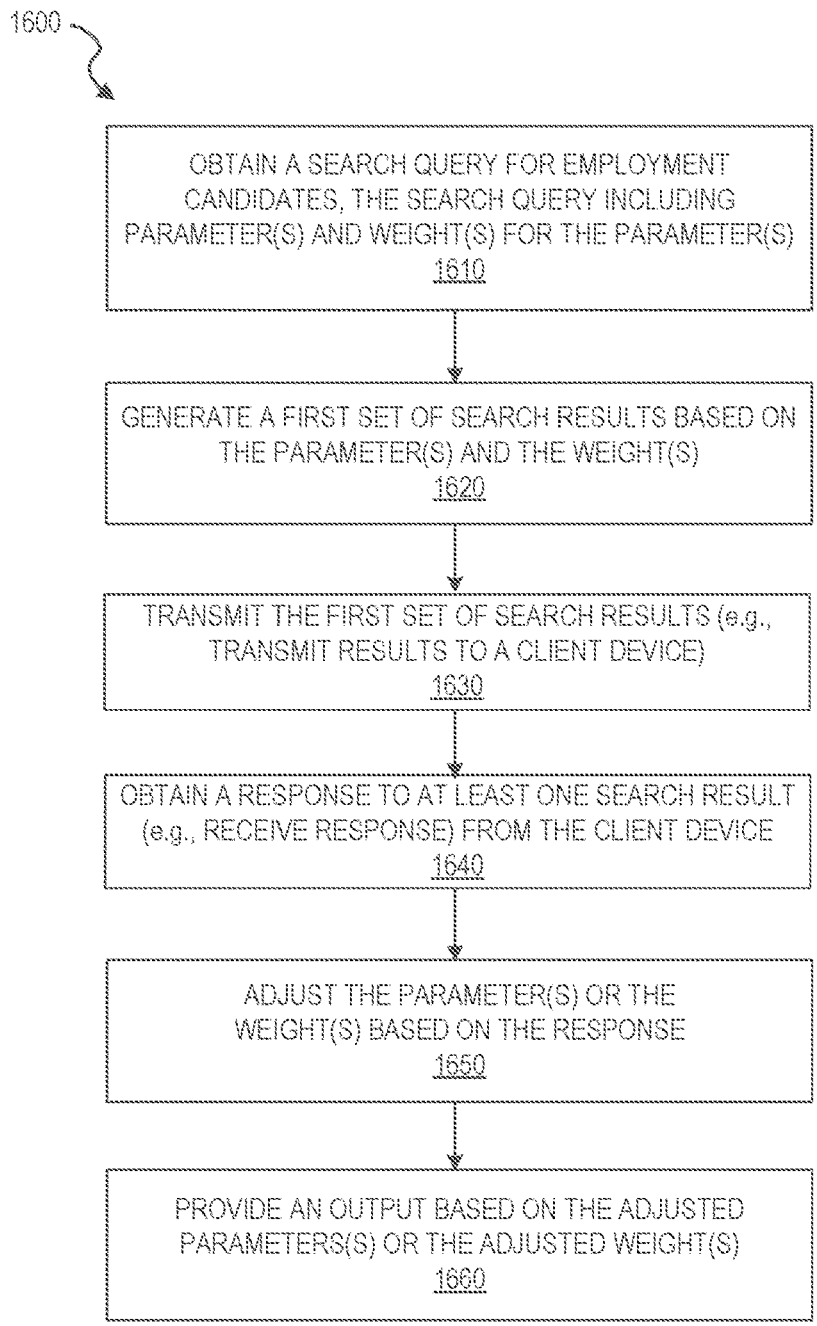
FIG. 16 is a flow chart illustrating a method for query term weighting, in accordance with an example embodiment.

FIG. 16 is a flow chart illustrating an example method 1600 for query term weighting (QTW), in accordance with some embodiments. The method 1600 is described here as being implemented within the client-server system 100 of FIG. 1. However, the operations of the method 1600 may also be implemented in other systems with different machines from those shown in FIG. 1.

At operation 1610, a search query for employment candidates is obtained. In an embodiment, operation 1610 comprises the application server 118 receiving the search query from the client machine 110. The search query includes a set of parameters, for example, "programmer," "Java," "C++," and "San Francisco." Each parameter may be associated with a weight. For example, each of the parameters may have a weight of 165, indicating that each parameter is equally important. The parameters may include one or more of: skills (e.g., "real estate sales," "article editing"), prior or current work experience (e.g., "five years of experience as a real estate broker"), prior or current education (e.g., "Bachelor's Degree," "Ivy League"), years of experience, seniority, pedigree, and industry. In some aspects, the current work experience and/or the current education may be weighted more than the prior work experience and/or the prior education.

At operation 1620, the application server 118 generates, from the database 126 storing records associated with professionals, a first set of search results based on the set of parameters and the weights of the parameters in the set. For example, the first set of search results may include professional records 112 related to programmers from San Francisco who have the skills "Java" or "C++."

At operation 1630, the first set of search results are transmitted. As shown in the example of FIG. 16, operation 1630 may be accomplished by the application server 118 transmitting, to the client machine 110 (or client machine 112), the first set of search results.

At operation 1640, a response to search result(s) is obtained. In an example embodiment depicted in FIG. 16, operation 1640 can comprise the application server 118 receiving, from the client machine 110 (or client machine 112), the response to search result(s). The search result(s) are associated with a set of factors. The factor(s) in the set may correspond to any parameters, for example, skills, work experience, education, years of experience, seniority, pedigree, and industry. The response indicates a level of interest in the search result(s). For example, the response may indicate that the user of the client machine 110 (or client machine 112) is interested in the search result(s) (e.g., a positive response), is not interested in the search result(s) (e.g., a negative response), or has ignored the search result(s) (e.g., a neutral response).

A positive response may include communication, to the application server 118, that any positive action in hiring a candidate associated with a search result (e.g., corresponding to the professional record 112 of the search result) has taken place. Examples of positive responses include: selecting a link for more information about the search result, obtaining contact information for a candidate associated with the search result, noting that the candidate has been invited to interview, noting that the candidate has received an offer, noting that the candidate has accepted the offer, noting that the candidate has started work at a business associated with the user of the client machine 110 (or client machine 112), and noting that the candidate received good reviews from the business. A negative response may include communication, to the application server 118, that any negative action in hiring the candidate has taken place. Examples of negative responses include: indicating disinterest in the search result, indicating a decision not to proceed with the candidate's application for the job (e.g., before or after an interview), or receiving an indication that the candidate started work at the business but was not a good fit.

At operation 1650, the application server 118 adjusts the parameters in the set of parameters or adjusts the weights of the parameters based on the response to the search result(s). For example, if the user of the client machine 110 (or client machine 112) indicates interest in multiple search results that have the skill "Java" and indicates disinterest in search results that lack the skill "Java," the weight of the skill "Java" may be increased. Conversely, if the user's interest is determined to be independent of the skill "C++" (e.g., 60% of the search results have the skill "C++," and the same percentage of the search results in which the user is interested have that skill), the weight of the skill "C++" may be decreased or the parameter "C++" may be removed from the search query.

In some examples, the application server 118 determines that the response to the search result(s) is a positive response (e.g., an indication of interest). The application server 118 increases a weight of a parameter based on the response to the search result(s) being associated with the parameter and based on multiple other search results in the first set of search results not being associated with the parameter. In some examples, the application server 118 determines that the response to the search result(s) is a negative response (e.g., an indication of disinterest). The application server 118 decreases a weight of a parameter based on the response to the search result(s) being associated with the parameter and based on multiple other search results in the first set of search results not being associated with the parameter.

In some cases, the search result(s) include multiple search results having a positive response and multiple search results having a negative response or a neutral response. To adjust the parameters in the set of parameters or adjust the weights of the parameters based on the response to the search result(s), the application server 118 determines that a first parameter appears in a higher ratio in the multiple search results having the positive response than in the multiple search results having the negative response or the neutral response. The application server 118 increases a weight of the first parameter based on the higher ratio.

In some cases, the search result(s) include multiple search results having a positive response and multiple search results having a negative response or a neutral response. To adjust the parameters in the set of parameters or adjust the weights of the parameters based on the response to the search result(s), the application server 118 determines that a second parameter appears in a lower ratio in the multiple search results having the positive response than in the multiple search results having the negative response or the neutral response. The server decreases a weight of the second parameter based on the lower ratio.

According to some examples, the search result has a positive response. To implement operation 1650, the application server 118 computes, for a first parameter that appears in the search result, a numerical statistic based on a number of search results associated with the first parameter that had a positive response, a negative response, and a neutral response, a total number of search results, and an average number of parameters associated with each search result. The application server 118 increases a weight of the first parameter based on the numerical statistic. For example, if the search query was for professional records associated with the skill "real estate sales," and search result(s) with positive response(s) included the job title "Realtor®," while search result(s) with neutral or negative response(s) did not include this job title, the weight for the parameter <job title is "Realtor®"> may be increased.

According to some examples, the search result has a negative response. To implement operation 1650, the application server 118 computes, for a first parameter that appears in the search result, a numerical statistic based on a number of search results associated with the first parameter that had a positive response, a negative response, and a neutral response, a total number of search results, and an average number of parameters associated with each search result. The application server 118 decreases a weight of the first parameter based on the numerical statistic. For example, if the search query was for professional records associated with the skill "software development," and search results) with negative response(s) included the job title "front end developer," while search result(s) with positive response(s) did not include this job title, the weight for the parameter <job title is "front end developer"> may be decreased (as it is likely that the user is searching for someone who is skilled in software development but is not a front end developer, e.g., someone who is a back end developer).

The numerical statistic may correspond to a term frequency-inverse document frequency (TF-IDF). TF-IDF is a numerical statistic is intended to reflect how important a word is to a document in a collection or corpus. It is often used as a weighting factor in searches of information retrieval, text mining, and user modeling. The TF-IDF value may increase proportionally to the number of times a word appears in the document. In some cases, the TF-IDF is offset by the frequency of the word in the corpus, which helps to adjust for the fact that some words appear more frequently in general.

The TF-IDF is the product of two statistics—the term frequency (TF) and the inverse document frequency (IDF). The TF may correspond to the raw count of a term in a document—the number of times a term t occurs in a document d. The document d may correspond to a profile in a professional networking service, and the term t may be a parameter from the search query, for example "patent lawyer." The IDF measures whether the term is common across all documents (e.g., all profiles in the professional networking service) or only appears in a small subset of the documents. The IDF may correspond to a logarithmically scaled inverse fraction of the documents that contain the term, obtained by dividing the total number of documents by the number of documents containing the term, and then taking the logarithm of that quotient.

In some cases, the user of the client machine 110 (or client machine 112) may be prompted to specify why he/she provided a positive or negative response to a search result. For example, the user may specify that she provided a negative response to a search result due to an industry associated with the search result being "banking" rather than "software," In this case, the search parameter "industry—software" may be added to the search query, and search results associated with "industry software" may be boosted.

The parameters and weights may further be adjusted based on business records or the search records stored in the database 126. For example, if searches associated with the business for which the user of the client machine 110 (or client machine 112) is searching typically had higher weights for the skill "Java," the weight for the skill "Java" may be increased.

At operation 1660, an output is provided, the output being based on the adjusted parameters or the adjusted weights. In an embodiment, operation 1660 may comprise providing, by the application server 118 an output (e.g., to the client machine 110 or to the client machine 112) based on the adjusted parameters or the adjusted weights. The output may include the adjusted parameters or the adjusted weights themselves, which may be presented for approval by the user of the client machine 110 (or client machine 112). Alternatively, the output may include a second set of search results. The second set of search results is generated based on the adjusted set of parameters or the adjusted weights, for example, by searching the database 126 (e.g., professional data repository). In some examples, the output includes the first set of search results of the original search (from operation 1620) reordered based on the adjusted parameters or the adjusted weights.

Figure 17:
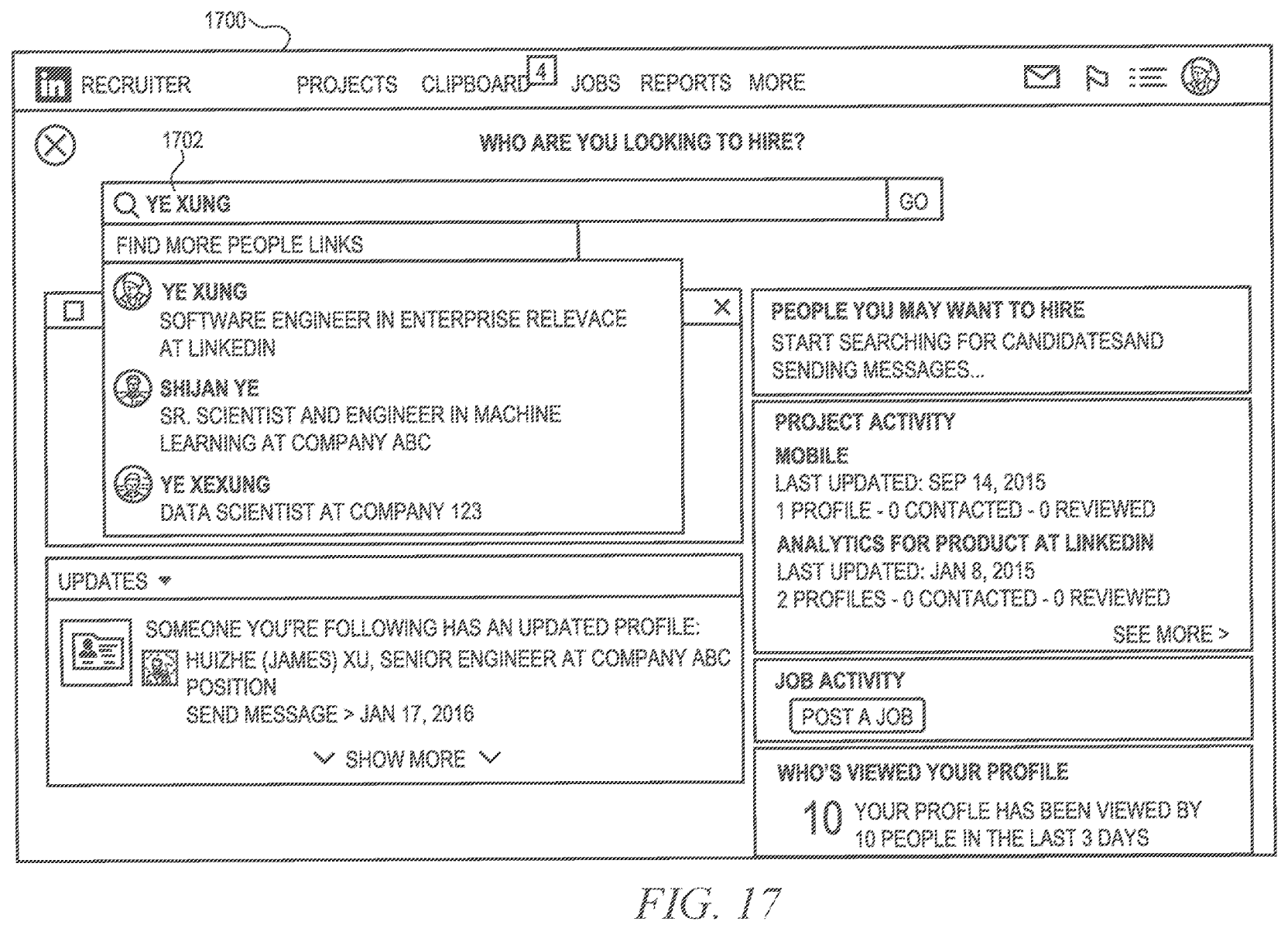

FIG. 17 is a screen capture illustrating a first screen 1700 of a user interface for performing a stream refinement question-based search for candidates in accordance with an example embodiment. The first screen 1700 includes an area 1702 where a searcher can review one or more suggested candidates for the search. As shown, area 1702 can display attributes of the suggested candidates such as the candidates' names and job titles (e.g., positions).

Figure 18:
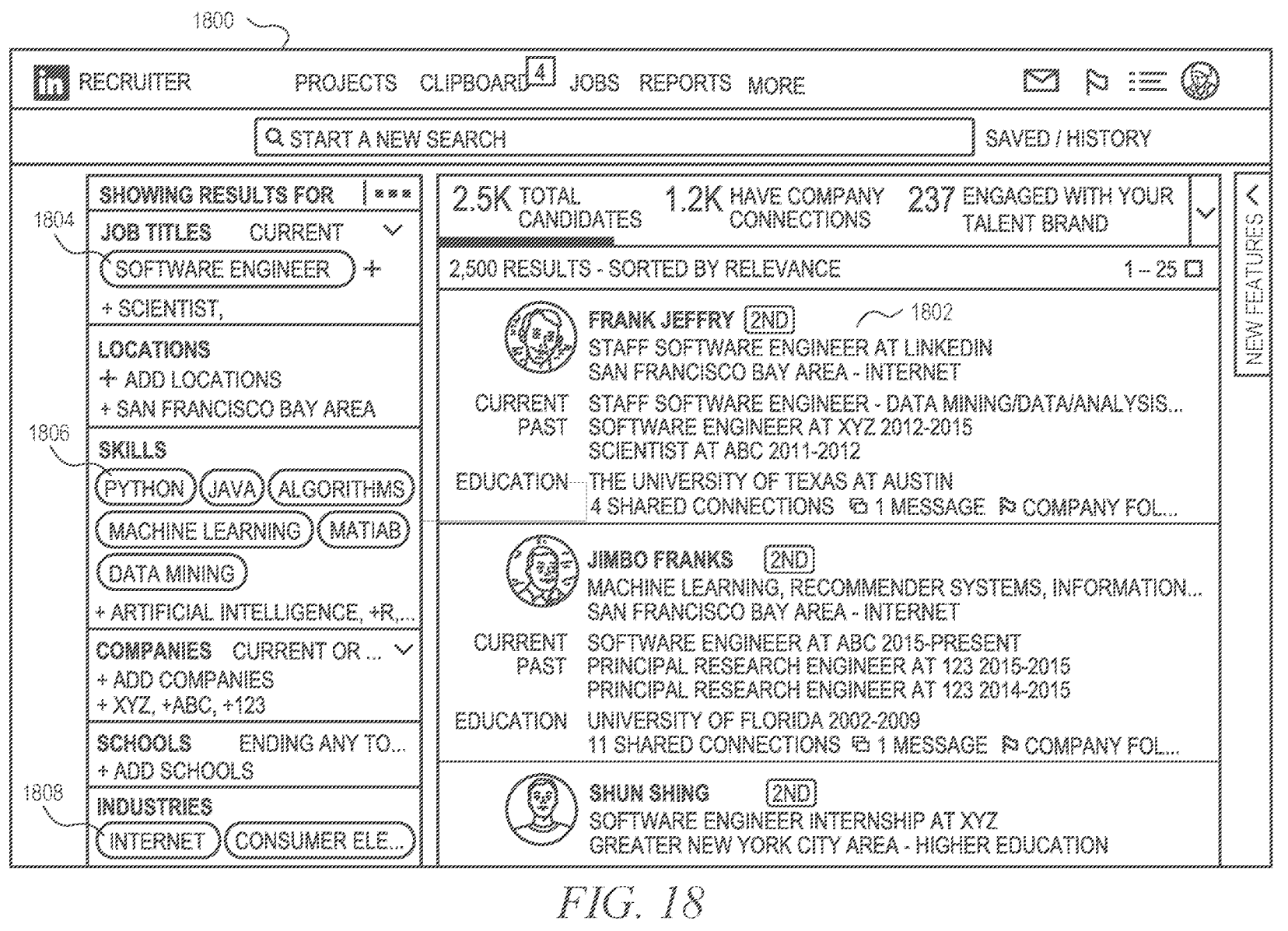

FIG. 18 is a screen capture illustrating a second screen 1800 of the user interface for performing a stream refinement question-based candidate search, in accordance with an example embodiment. The second screen 1800 presents results 1802 of the search, as well as displaying the query generated using the specified suggested candidates. For example, the query terms 1804, 1806, and 1808 used for the search are displayed in the second screen 1800. The query may be displayed by highlighting terms of the query in various categories. In the example of FIG. 18, a job title 1804 indicates that 'software engineer' is a job title term that was generated for the query, a skill 1806 indicates that 'python' is a skill term that was generated for the query, and an industry 1808 indicates that 'Internet' is an industry term that was generated for the query. The searcher can then easily modify the query by adding additional terms to the query and/or removing some of the identified terms that had been previously generated.

Blocks, Components, and Logic

Certain embodiments are described herein as including logic or a number of components, blocks, modules, or mechanisms. Blocks may constitute machine components implemented as a combination of software modules (e.g., code embodied on a machine-readable medium) and hardware modules. A 'hardware module' is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC), A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and user interfaces described in conjunction with FIGS. 1-18 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the internet of things (IoT), while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 19:
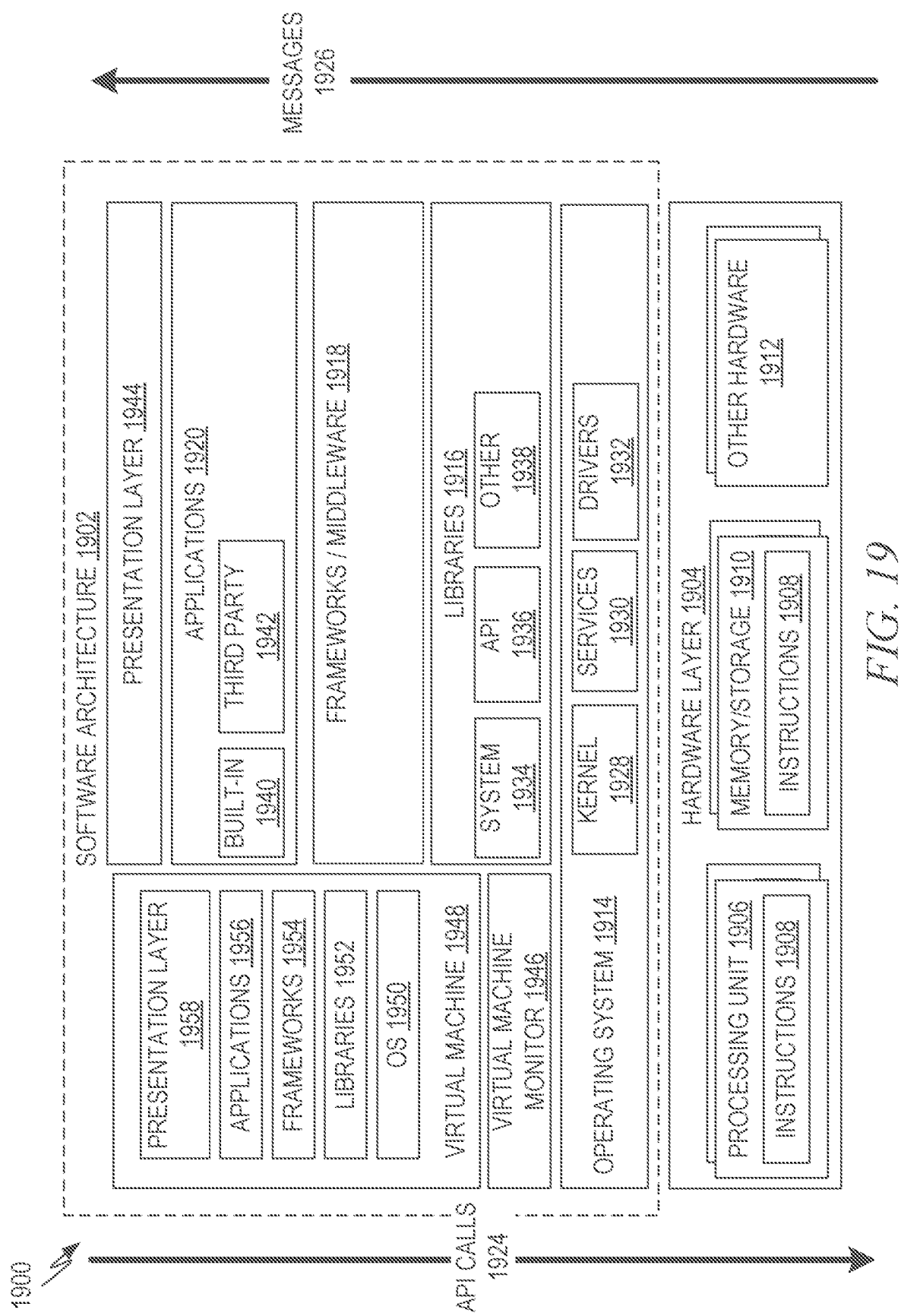
FIG. 19 is a block diagram illustrating a representative software architecture, which may be used in conjunction with various hardware architectures herein described.

FIG. 19 is a block diagram 1900 illustrating a representative software architecture 1902, which may be used in conjunction with various hardware architectures herein described. FIG. 19 is merely a non-limiting example of a software architecture, and it will be appreciated that many other architectures may be implemented to facilitate the functionality described herein. The software architecture 1902 may be executing on hardware such as a machine 2000 of FIG. 20 that includes, among other things, processors 2010, memorylstorage 2030, and I/O components 2050. A representative hardware layer 1904 is illustrated and can represent, for example, the machine 2000 of FIG. 20. The representative hardware layer 1904 comprises one or more processing units 1906 having associated executable instructions 1908. The executable instructions 1908 represent the executable instructions of the software architecture 1902, including implementation of the methods, blocks, modules, user interfaces, and so forth of FIGS. 1-18. The hardware layer 1904 also includes memory and/or storage modules 1910, which also have the executable instructions 1908. The hardware layer 1904 may also comprise other hardware 1912, which represents any other hardware of the hardware layer 1904, such as the other hardware illustrated as part of the machine 1900.

In the example architecture of FIG. 19, the software architecture 1902 may be conceptualized as a stack of layers where each layer provides particular functionality. For example, the software architecture 1902 may include layers such as an operating system 1914, libraries 1916, frameworks/middleware 1918, applications 1920, and a presentation layer 1944. Operationally, the applications 1920 and/or other components within the layers may invoke API calls 1924 through the software stack and receive responses, returned values, and so forth, illustrated as messages 1926, in response to the API calls 1924, The layers illustrated are representative in nature and not all software architectures have all layers. For example, some mobile or special-purpose operating systems may not provide a layer of frameworks/middleware 1918, while others may provide such a layer. Other software architectures may include additional or different layers.

The operating system 1914 may manage hardware resources and provide common services. The operating system 1914 may include, for example, a kernel 1928, services 1930, and drivers 1932. The kernel 1928 may act as an abstraction layer between the hardware and the other software layers. For example, the kernel 1928 may be responsible for memory management, processor management (e.g., scheduling), component management, networking, security settings, and so on. The services 1930 may provide other common services for the other software layers. The drivers 1932 may be responsible for controlling or interfacing with the underlying hardware. For instance, the drivers 1932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1916 may provide a common infrastructure that may be utilized by the applications 1920 and/or other components and/or layers. The libraries 1916 typically provide functionality that allows other software modules to perform tasks in an easier fashion than by interfacing directly with the underlying operating system 1914 functionality (e.g., kernel 1928, services 1930, and/or drivers 1932). The libraries 1916 may include system libraries 1934 (e.g., C standard library) that may provide functions such as memory allocation functions, string manipulation functions, mathematic functions, and the like. In addition, the libraries 1916 may include API libraries 1936 such as media libraries (e.g., libraries to support presentation and manipulation of various media formats such as MPEG4, H.264, MP3, AAC, AMR, JPG, PNG), graphics libraries (e.g., an OpenGI, framework that may be used to render 2D and 3D graphic content on a display), database libraries (e.g., SQLite that may provide various relational database functions), web libraries (e.g., WebKit that may provide web browsing functionality), and the like. The libraries 1916 may also include a wide variety of other libraries 1938 to provide many other APIs to the applications 1920 and other software components/modules.

The frameworks 1918 (also sometimes referred to as middleware) may provide a higher-level common infrastructure that may be utilized by the applications 1920 and/or other software components/modules. For example, the frameworks 1918 may provide various graphic user interface (GUI) functions, high-level resource management, high-level location services, and so forth. The frameworks 1918 may provide a broad spectrum of other APIs that may be utilized by the applications 1920 and/or other software components/modules, some of which may be specific to a particular operating system or platform.

The applications 1920 include built-in applications 1940 and/or third-party applications 1942. Examples of representative built-in applications 1940 may include, but are not limited to, a contacts application, a browser application, a book reader application, a location application, a media application, a messaging application, and/or a game application. The third-party applications 1942 may include any of the built-in applications 1940 as well as a broad assortment of other applications. In a specific example, the third-party application 1942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1942 may invoke the API calls 1924 provided by the mobile operating system such as the operating system 1914 to facilitate functionality described herein.

The applications 1920 may utilize built-in operating system 1914 functions (e.g., kernel 1928, services 1930, and/or drivers 1932), libraries 1916 (e.g., system libraries 1934, API libraries 1936, and other libraries 1938), and frameworkshniddleware 1918 to create user interfaces to interact with users of the system. Alternatively, or additionally, in some systems, interactions with a user may occur through a presentation layer, such as the presentation layer 1944. In these systems, the application/module 'logic' can be separated from the aspects of the application/module that interact with a user.

Some software architectures utilize virtual machines. In the example of FIG. 19, this is illustrated by a virtual machine 1948. A virtual machine creates a software environment where applications/modules can execute as if they were executing on a hardware machine (such as the machine 1900 of FIG. 19, for example). A virtual machine is hosted by a host operating system (e.g., operating system 1914 in FIG. 19) and typically, although not always, has a virtual machine monitor 1946, which manages the operation of the virtual machine 1948 as well as the interface with the host operating system (e.g., operating system 1914). A software architecture executes within the virtual machine 1948, such as an operating system 1950, libraries 1952, frameworkshniddleware 1954, applications 1956, and/or a presentation layer 1958. These layers of software architecture executing within the virtual machine 1948 can be the same as corresponding layers previously described or may be different.

Example Architecture and Machine-Readable Medium

Figure 20:
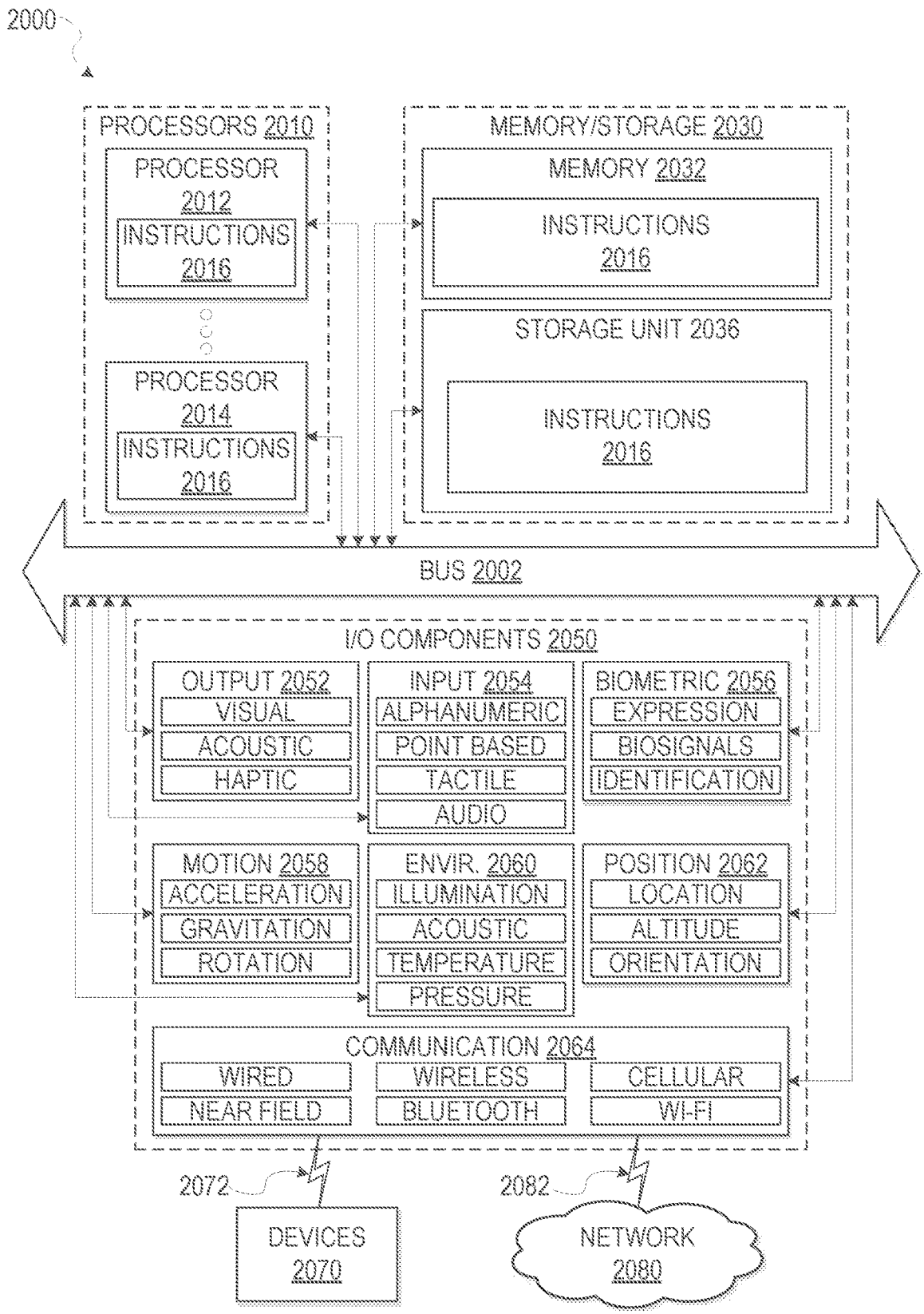
FIG. 20 is a block diagram illustrating components of a machine, according to some example embodiments, able to read instructions from a machine-readable medium (e.g., a machine-readable storage medium) and perform any one or more of the methodologies discussed herein.

FIG. 20 is a block diagram illustrating components of a machine 2000, according to some example embodiments, able to read instructions from a machine-readable medium (e.g., a machine-readable storage medium or a machine-readable storage device) and perform any one or more of the methodologies discussed herein. Specifically, FIG. 20 shows a diagrammatic representation of the machine 2000 in the example form of a computer system, within which instructions 2016 (e.g., software, a program, an application, an apples, an app, or other executable code) for causing the machine 2000 to perform any one or more of the methodologies discussed herein may be executed. The instructions 2016 transform the general, non-programmed machine into a particular machine programmed to carry out the described and illustrated functions in the manner described. In alternative embodiments, the machine 2000 operates as a stand-alone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2016, sequentially or otherwise, that specify actions to be taken by the machine 2000. Further, while only a single machine 2000 is illustrated, the term 'machine' shall also be taken to include a collection of machines 2000 that individually or jointly execute the instructions 2016 to perform any one or more of the methodologies discussed herein.

The machine 2000 may include processors 2010, memory/storage 2030, and I/O components 2050, which may be configured to communicate with each other such as via a bus 2002. In an example embodiment, the processors 2010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2012 and a processor 2014 that may execute the instructions 2016. The term 'processor' is intended to include multi-core processors that may comprise two or more independent processors (sometimes referred to as 'cores') that may execute instructions contemporaneously. Although 20 shows multiple processors 2010, the machine 2000 may include a single processor with a single core, a single processor with multiple cores (e.g., a multi-core processor), multiple processors with a single core, multiple processors with multiples cores, or any combination thereof.

The memorylstorage 2030 may include a memory 2032, such as a main memory, or other memory storage, and a storage unit 2036, both accessible to the processors 2010 such as via the bus 2002. The storage unit 2036 and memory 2032 store the instructions 2016 embodying any one or more of the methodologies or functions described herein. The instructions 2016 may also reside, completely or partially, within the memory 2032, within the storage unit 2036 (e.g., within a storage device), within at least one of the processors 2010 (e.g., within the processor's cache memory), or any suitable combination thereof, during execution thereof by the machine 2000. Accordingly, the memory 2032, the storage unit 2036, and the memory of the processors 2010 are examples of machine-readable media.

As used herein, 'machine-readable medium' means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term 'machine-readable medium' should be taken to include a single medium or multiple media (e.g., a centralized or distributed database, or associated caches and servers) able to store the instructions 2016. The term machine-readable medium' shall also be taken to include any medium, or combination of multiple media, that is capable of storing instructions (e.g., instructions 2016) for execution by a machine (e.g., machine 2000), such that the instructions, when executed by one or more processors of the machine (e.g., processors 2010), cause the machine to perform any one or more of the methodologies described herein. Accordingly, a 'machine-readable medium' refers to a single storage apparatus or device, as well as 'cloud-based' storage systems or storage networks that include multiple storage apparatus or devices. The term 'machine-readable medium' excludes signals per se.

The I/O components 2050 may include a wide variety of components to receive input, provide output, produce output, transmit information, exchange information, capture measurements, and so on. The specific I/O components 2050 that are included in a particular machine will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054.

The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2050 may include biometric components 2056, motion components 2058, environmental components 2060, or position components 2062, among a wide array of other components. For example, the biometric components 2056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2058 may include acceleration sensor components (e.g., accelerometer), gravitation sensor components, rotation sensor components (e.g., gyroscope), and so forth.

The environmental components 2060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The 170 components 2050 may include communication components 2064 operable to couple the machine 2000 to a network 2080 or devices 2070 via a coupling 2082 and a coupling 2072, respectively. For example, the communication components 2064 may include a network interface component or other suitable device to interface with the network 2080. In further examples, the communication components 2064 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 2070 may be another machine or any of a wide variety of peripheral devices (e.g., a peripheral device coupled via a USB).

Moreover, the communication components 2064 may detect identifiers or include components operable to detect identifiers. For example, the communication components 2064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra. Code, UCC RSS-2D bar code, and other optical codes), or acoustic detection components (e.g., microphones to identify tagged audio signals). In addition, a variety of information may be derived via the communication components 2064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet. Access (HSPA), Worldwide Interoperability for Microwave Access (WiMAX), Long-Term Evolution (LTE) standard, others defined by various standard-setting organizations, other long-range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., HTTP). Similarly, the instructions 2016 may be transmitted or received using a transmission medium via the coupling 2072 (e.g., a peer-to-peer coupling) to the devices 2070. The term 'transmission medium' shall be taken to include any intangible medium that is capable of storing, encoding, or carrying the instructions 2016 for execution by the machine 2000, and includes digital or analog communications signals or other intangible media to facilitate communication of such software.

Language

Throughout this specification, plural in stances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term 'invention' merely for convenience and without intending to voluntarily liar-t the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term 'or' may be construed in either an inclusive or an exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
   one or more processors; and
   a non-transitory computer readable storage medium storing instructions that when executed by the one or more processors cause the computer system to perform operations comprising:
   accessing a candidate stream definition comprising a role, the role including a title;
   accessing, based on the candidate stream definition, one or more stream-related information sources;
   extracting one or more attributes from the one or more stream-related information sources;
   inputting the one or more attributes to a combined ordering model, the combined ordering model trained by a machine learning algorithm to output an ordering score for each of one or more member profiles of members of an online system, the combined ordering model including weights assigned to each of the one or more attributes;
   ordering, based on the ordering scores, the one or more member profiles;
   causing presentation, on a display device, of one or more top-ordered member profiles;
   accessing feedback regarding the one or more top-ordered member profiles; and
   dynamically training the weights assigned to each of the one or more attributes to alter the weights assigned to each of the one or more attributes based on the feedback.

2. The computer system of claim 1, wherein:
   the online system hosts a social networking service; and
   the candidate stream definition further includes a geographic location and an organization.

3. The computer system of claim 1, the operations further comprising:
repeating the ordering based on the altered weights;
updating the presentation of the one or more top-ordered member profiles on the display device, the updating being based on the repeating;
accessing additional feedback regarding the updated display of the one or more top-ordered member profiles; and
dynamically re-training the weights assigned to each of the one or more attributes to alter the weights assigned to each of the one or more attributes based on the additional feedback.

4. The computer system of claim 1, wherein the feedback includes explicit feedback from a user interacting with the presentation of the one or more top-ordered member profiles.

5. The computer system of claim 4, wherein the explicit feedback includes positive or negative feedback regarding one or more of:
a role;
a title;
a location;
a degree;
an educational institution;
a major;
an industry;
an organization;
a seniority level;
a number of years of experience;
acceptance, deferral, or rejection of one of the one or more top-ordered member profiles;
similarity between attributes of a positively-rated candidate and attributes of one of the or more top-ordered member profiles; and
similarity between an employer of a positively-rated candidate and an employer of one of the one or more top-ordered member profiles.

6. The computer system of claim 1, wherein the feedback includes feedback from a user interacting with the presentation of the one or more top-ordered member profiles.

7. The computer system of claim 6, wherein the feedback from the user interacting with the presentation of the one or more top-ordered member profiles includes one or more of:
dwell time on the one or more top-ordered member profiles;
profile sections viewed of the one or more top-ordered member profiles; and
a number of revisits to the one or more top-ordered member profiles.

8. The computer system of claim 1, wherein extracting the one or more attributes comprises one or more of:
extracting a location from the one or more stream-related information sources;
extracting a degree from the one or more stream-related information sources;
extracting a major from the one or more stream-related information sources;
extracting a title from the one or more stream-related information sources and accessing titles related to the title from a data store or algorithm that maps titles to their related titles; and
extracting skills from the one or more stream-related information sources and mapping the extracted skills to skill identifiers.

9. A computer-implemented method, comprising:
accessing a candidate stream definition comprising a role, the role including a title;
accessing, based on the candidate stream definition, one or more stream-related information sources;
extracting one or more attributes from the one or more stream-related information sources;
inputting the one or more attributes to a combined ordering model, the combined ordering model trained by a machine learning algorithm to output an ordering score for each of one or more member profiles of members of an online system, the combined ordering model including weights assigned to each of the one or more attributes;
ordering, based on the ordering scores, the one or more member profiles;
causing presentation, on a display device, of one or more top-ordered member profiles;
accessing feedback regarding the one or more top-ordered member profiles; and
dynamically training the weights assigned to each of the one or more attributes to alter the weights assigned to each of the one or more attributes based on the feedback.

10. The computer-implemented method of claim 9, further comprising:
repeating the ordering based on the altered weights;
updating the presentation of the one or more top-ordered member profiles on the display device, the updating being based on the repeating;
accessing additional feedback regarding the updated display of the one or more top-ordered member profiles; and
dynamically re-training the weights assigned to each of the one or more attributes to alter the weights assigned to each of the one or more attributes based on the additional feedback.

11. The computer-implemented method of claim 9, wherein the feedback includes explicit feedback obtained from a user interacting with the presentation of the one or more top-ordered member profiles.

12. The computer-implemented method of claim 11, wherein the explicit feedback includes positive or negative feedback regarding one or more of:
a role;
a title;
a location;
a degree;
an educational institution;
a major;
an industry;
an organization;
a seniority level;
a number of years of experience;
acceptance, deferral, or rejection of one of the one or more top-ordered member profiles;
similarity between attributes of a positively-rated candidate and attributes of one of the or more top-ordered member profiles; and
similarity between an employer of a positively-rated candidate and an employer of one of the one or more top-ordered member profiles.

13. The computer-implemented method of claim 9, wherein the feedback includes feedback from a user interacting with the presentation of the one or more top-ordered member profiles.

14. The computer-implemented method of claim 13, wherein the feedback from the user interacting with the presentation of the one or more top-ordered member profiles includes one or more of:
- dwell time on the one or more top-ordered member profiles;
- profile sections viewed of the one or more top-ordered member profiles; and
- a number of revisits to the one or more top-ordered member profiles.

15. A non-transitory machine-readable storage medium comprising instructions that, when executed by one or more processors of a machine, cause the machine to perform operations comprising:
- accessing a candidate stream definition comprising a role, the role including a title;
- accessing, based on the candidate stream definition, one or more stream-related information sources;
- extracting one or more attributes from the one or more stream-related information sources;
- inputting the one or more attributes to a combined ordering model, the combined ordering model trained by a machine learning algorithm to output an ordering score for each of one or more member profiles of members of an online system, the combined ordering model including weights assigned to each of the one or more attributes;
- ordering, based on the ordering scores, the one or more member profiles;
- causing presentation, on a display device, of one or more top-ordered member profiles;
- accessing feedback regarding the one or more top-ordered member profiles; and
- dynamically training the weights assigned to each of the one or more attributes to alter the weights assigned to each of the one or more attributes based on the feedback.

16. The non-transitory machine-readable storage medium of claim 15, the operations further comprising:
- repeating the ordering based on the altered weights;
- updating the presentation of the one or more top-ordered member profiles on the display device, the updating being based on the repeating;
- accessing additional feedback regarding the updated display of the one or more top-ordered member profiles; and
- dynamically re-training the weights assigned to each of the one or more attributes to alter the weights assigned to each of the one or more attributes based on the additional feedback.

17. The non-transitory machine-readable storage medium of claim 15, wherein the feedback includes explicit feedback from a user interacting with the presentation of the one or more top-ordered member profiles.

18. The non-transitory machine-readable storage medium of claim 17, wherein the explicit feedback includes positive or negative feedback regarding one or more of:
- a role;
- a title;
- a location;
- a degree;
- an educational institution;
- a major;
- an industry;
- an organization;
- a seniority level;
- a number of years of experience;
- acceptance, deferral, or rejection of one of the one or more top-ordered member profiles;
- similarity between attributes of a positively-rated candidate and attributes of one of the or more top-ordered member profiles; and
- similarity between an employer of a positively-rated candidate and an employer of one of the one or more top-ordered member profiles.

19. The non-transitory machine-readable storage medium of claim 15, wherein the feedback includes feedback from a user interacting with the presentation of the one or more top-ordered member profiles.

20. The non-transitory machine-readable storage medium of claim 19, wherein the feedback from the user interacting with the presentation of the one or more top-ordered member profiles includes one or more of:
- dwell time on the one or more top-ordered member profiles;
- profile sections viewed of the one or more top-ordered member profiles; and
- a number of revisits to the one or more top-ordered member profiles.

\* \* \* \* \*